US006990627B2

(12) United States Patent
Uesugi et al.

(10) Patent No.: US 6,990,627 B2
(45) Date of Patent: Jan. 24, 2006

(54) DIGITAL RADIO COMMUNICATION SYSTEM FOR COMMUNICATING M-ARY MODULATED ERROR DETECTION UNITS

(75) Inventors: Mitsuru Uesugi, Yokosuka (JP); Kenichi Miyoshi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 417 days.

(21) Appl. No.: 10/257,359

(22) PCT Filed: Feb. 26, 2002

(86) PCT No.: PCT/JP02/01692

§ 371 (c)(1),
(2), (4) Date: Oct. 11, 2002

(87) PCT Pub. No.: WO02/069593

PCT Pub. Date: Sep. 6, 2002

(65) Prior Publication Data

US 2003/0138056 A1 Jul. 24, 2003

(30) Foreign Application Priority Data

Feb. 27, 2001 (JP) ............................. 2001-106494
May 22, 2001 (JP) ............................. 2001-153098
Jun. 11, 2001 (JP) ............................. 2001-176368

(51) Int. Cl.
*H04L 1/18* (2006.01)
*H03M 13/03* (2006.01)
*H03L 27/06* (2006.01)

(52) U.S. Cl. ...................... 714/794; 714/748; 375/262; 375/283

(58) Field of Classification Search ................ 714/794, 714/786, 748; 375/262, 283
See application file for complete search history.

(56) References Cited

U.S. PATENT DOCUMENTS 5,319,650 A * 6/1994 Mizutani et al. ............ 714/789
5,414,737 A * 5/1995 Uesugi et al. .............. 375/340

(Continued)

FOREIGN PATENT DOCUMENTS

JP 03097373 4/1991

(Continued)

OTHER PUBLICATIONS

M. Uesugi, et al.; "A Multi Path Interference Canceller using Bit Separated Error Detection Coding (BSC-MPIC)", Bit-mai Kobetsu Ayamari Kenshutsu o Mochiita Multi Path Canceller, The Institute of Electronics, Information and Communication Engineers Gijutsu Kenkyu Hokoku RCS 2001-79-94, vol. 101, No. 197, Jul. 2001, pp. 43-48 w/English Abstract.

(Continued)

*Primary Examiner*—Albert Decady
*Assistant Examiner*—Esaw Abraham
(74) *Attorney, Agent, or Firm*—Stevens, Davis, Miller & Mosher, LLP

(57) ABSTRACT

A coding section 101 performs error detection coding of data for each predetermined error detection unit, and an M-ary modulation section 102 arranges data belonging to a plurality of error detection units in one transmission unit, and transmits that data. A first decoding section 114 decodes a received signal, and performs error detection on the decoding result for each error detection unit. A second demodulation section 115 modifies the likelihood of each bit based on the result of error detection in the first decoding section 114. By this means, it is possible to improve the error correction capability of a signal that has undergone M-ary modulation using high-precision likelihoods, and to improve transmission quality.

26 Claims, 70 Drawing Sheets

U.S. PATENT DOCUMENTS

| | | | |
|---|---|---|---|
| 5,425,037 A * | 6/1995 | Uesugi et al. | 714/794 |
| 5,430,743 A * | 7/1995 | Marturano et al. | 714/708 |
| 5,942,003 A * | 8/1999 | Ivry | 714/762 |
| 6,002,727 A * | 12/1999 | Uesugi | 375/346 |
| 6,731,700 B1 * | 5/2004 | Yakhnich et al. | 375/341 |
| 6,738,941 B1 * | 5/2004 | Todoroki | 714/755 |

FOREIGN PATENT DOCUMENTS

| | | |
|---|---|---|
| JP | 05175940 | 7/1993 |
| JP | 06006399 | 1/1994 |
| JP | 06006400 | 1/1994 |
| JP | 06069971 | 3/1994 |
| JP | 06284018 | 10/1994 |
| JP | 07336400 | 12/1995 |
| JP | 08116341 | 5/1996 |
| JP | 09153918 | 6/1997 |
| JP | 11266184 | 9/1999 |
| JP | 2000 031944 | 1/2000 |
| JP | 2000 201132 | 7/2000 |
| JP | 2000 216835 | 8/2000 |
| JP | 2001 127829 | 5/2001 |
| JP | 2002 084329 | 3/2002 |

OTHER PUBLICATIONS

O. Kato, et al.; "A Study on a New ARQ Scheme with the Estimate and Report of Error Pattern (EREP-ARQ) for High-Speed Wireless Multimedia Communications", "Kosoku Musen Multi Media Tsushin ni okeru Ayamari Suitei ARQ Hoshiki no Kento", The Institute of Electronics, Information and Communication Engineers Gijutsu Kenkyu Hokoku SSE98-11~23, vol. 98, No. 19, Apr. 1998, pp. 21-27 w/English Abstract.

M. Uesugi, et al.; "A Layered Demodulation Scheme for Adaptive Modulation", "Tekio Hencho ni taisuru Kaisoteki Fukucho Hoho ni tsuite", 2000nen The Institute of Electronics, Information and Communication Engineers Tsushin Society Taikai Koen Ronbunshi 1 B-5-32, vol. 2000, Sep. 2000, p. 320 with English translation.

* cited by examiner

DIGITAL RADIO COMMUNICATION SYSTEM FOR COMMUNICATING M-ARY MODULATED ERROR DETECTION UNITS

TECHNICAL FIELD

The present invention relates to a digital radio communication system that uses M-ary modulation, and more particularly to a digital radio communication system that enables the demodulation characteristics of a signal modulated by M-ary modulation to be improved.

BACKGROUND ART

With the recent diversification of services, a demand has arisen for greater volumes of data to be transmitted in a downlink. To meet this demand, M-ary modulation is used, in which a plurality of bits are arranged in one symbol. M-ary modulation is a modulation method whereby a plurality of bits are arranged in one symbol. Widely-known M-ary modulation methods include QPSK, in which 2 bits are arranged in one symbol, 8PSK, in which 3 bits are arranged in one symbol, and 16QAM, in which 4 bits are arranged in one symbol.

However, with M-ary modulation there is a problem in that the greater the number of bits arranged in one symbol, the smaller is the signal point interval in the signal space diagram, making reception signal point determination and likelihood calculation difficult, and resulting in deterioration of reception characteristics.

DISCLOSURE OF INVENTION

It is an object of the present invention to provide a digital radio communication system in which error correction capability can be improved by calculating likelihoods with high precision, and an improvement in reception characteristics can be achieved.

This object is achieved by having a transmitting apparatus perform transmission with data error-correction-coded as a plurality of independent error detection units arranged in one transmission unit, and having a receiving apparatus perform error detection on decoded data for each independent error detection unit, and modify the likelihood of each bit according to the error detection result.

BEST MODE FOR CARRYING OUT THE INVENTION

The present inventors arrived at the present invention by noting the per-bit mapping state in an M-ary modulation signal space diagram, and finding that, if an error is detected for a specific bit of a signal point, the likelihood of other bits can be obtained with high precision by determining bits for which that error was not detected.

That is to say, the essence of the present invention is to have a transmitting apparatus perform transmission with data error-correction-coded as a plurality of independent error detection units arranged in one transmission unit, and to have a receiving apparatus perform error detection on decoded data for each independent error detection unit, and modify the likelihood of each bit according to the error detection result.

It may happen that a likelihood once calculated by a receiving apparatus according to an embodiment is modified, and a new likelihood is obtained. This pre-modification likelihood is called "a candidate likelihood".

With reference now to the accompanying drawings, embodiments of the present invention will be explained in detail below.

(Embodiment 1)

Figure 1:
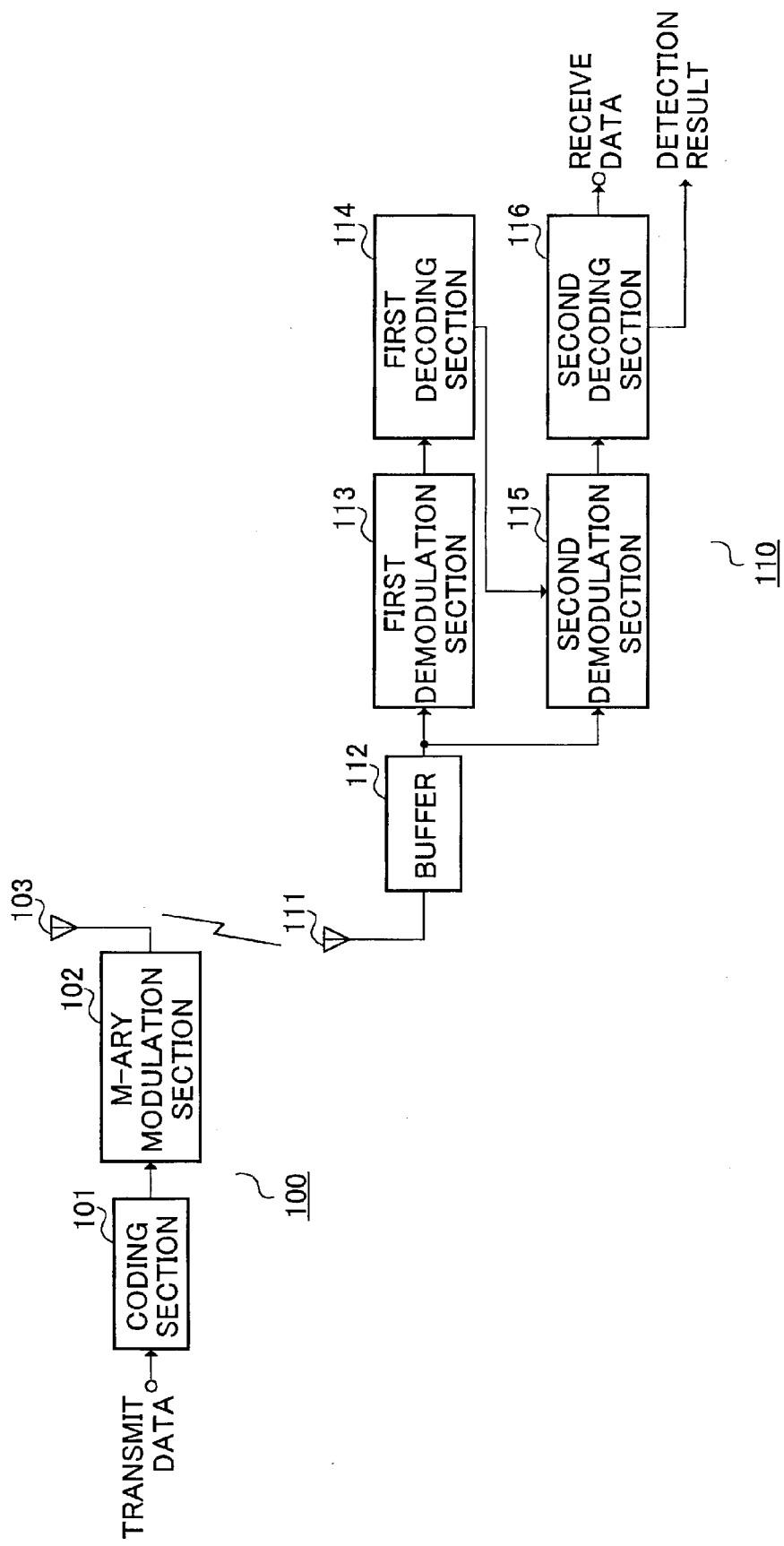
FIG. 1 is a block diagram showing the configuration of a radio communication system according to Embodiment 1 of the present invention.

FIG. 1 is a block diagram showing the configuration of a radio communication system according to Embodiment 1 of the present invention. In the radio communication system shown in FIG. 1, radio communications are performed between a transmitting apparatus 100 and receiving apparatus 110. Unless indicated otherwise, in the following embodiments a case in which 8PSK is performed will be described by way of example.

In the transmitting apparatus 100, a coding section 101 performs error detection coding of transmit data for each predetermined error detection unit, and performs error correction coding for each predetermined error correction unit. An M-ary modulation section 102 performs M-ary modulation of the output signal from the coding section 101, and performs radio transmission of this signal from an antenna 103.

In the receiving apparatus 110, a signal received from an antenna 111 is first stored in a buffer 112, and then output to a first demodulation section 113 and a second demodulation section 115 for each predetermined transmission unit. Here, a transmission unit is a unit on which one modulation processing operation and demodulation processing operation are performed. Normally, modulation processing and demodulation processing are performed on a symbol-by-symbol basis. In this embodiment, the following description will assume that modulation processing and demodulation processing are performed on a symbol-by-symbol basis.

The first demodulation section 113 demodulates the received signal and outputs the result of demodulation to a first decoding section 114. The first decoding section 114 performs error correction decoding of the received signal, and also performs error detection on the result of demodulation. The result of this error detection is output to the second demodulation section 115. The second demodulation section 115 refers to the result of error detection by the first decoding section 114 and demodulates the received signal again, and outputs the result of demodulation to a second decoding section 116. The second decoding section 116 performs error correction decoding on the result of demodulation by the second demodulation section 115, and obtains receive data.

Figure 2:
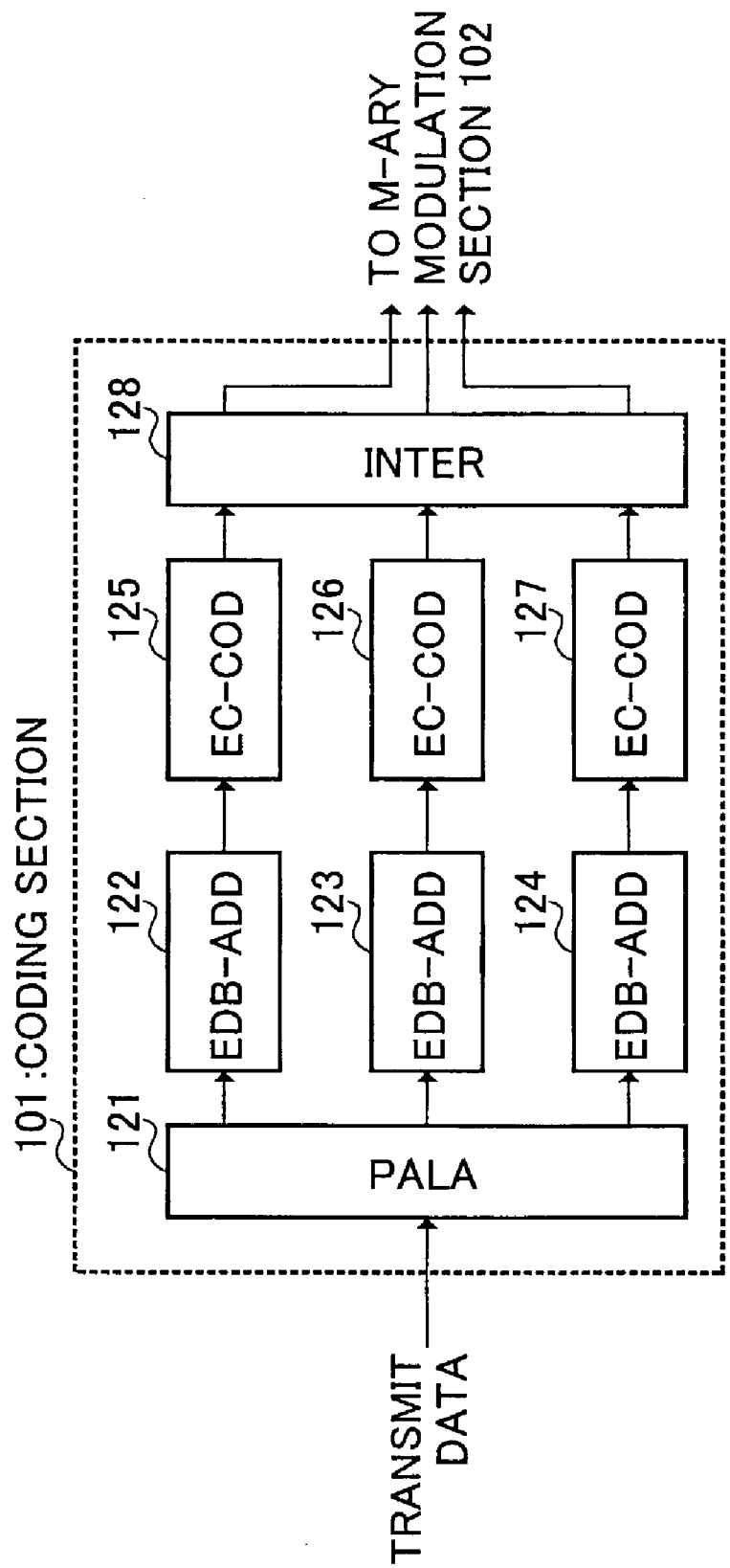
FIG. 2 is a block diagram showing the internal configuration of the coding section of the transmitting apparatus shown in FIG. 1.

FIG. 2 is a block diagram showing the internal configuration of the coding section 101 of the transmitting apparatus 100 shown in FIG. 1. In FIG. 2, transmit data is first input to a parallelization circuit (PALA) 121. The parallelization circuit 121 parallelizes the transmit data into 3 sequences, and outputs the parallelized transmit data to error detection bit adding circuits (EDB-ADD) 122 through 124.

Error detection bit adding circuits 122 through 124 add error detection bits to input bits parallelized into 3 sequences from the parallelization circuit 121 for each predetermined error detection unit. By this means, the transmit data is distributed into 3 independent kinds of error detection units.

Error correction coding circuits (EC-COD) 125 through 127 perform error correction coding of the coded bit strings for each predetermined error correction unit, and output the resulting bit strings to an interleaving circuit (INTER) 128. The interleaving circuit 128 permutes the error-correction-coded coded bit strings in accordance with a predetermined rule, and outputs the resulting bit strings to the M-ary modulation section 102.

Transmit data that has undergone error detection coding on a sequence-by-sequence basis in this way has its data order modified, and is then arranged in one symbol every 3 bits. Therefore, bits belonging to independent error detection units are mixed in one symbol. In other words, the M-ary modulation section 102 arranges error-detection-coded data in one transmission unit (symbol).

Figure 3:
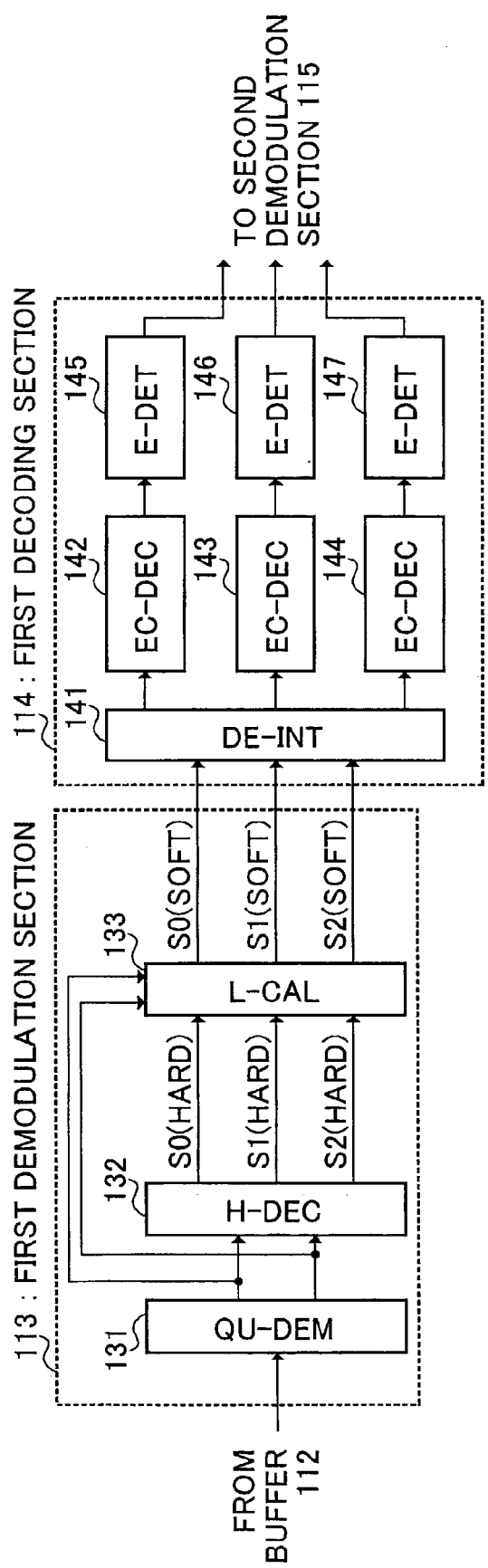
FIG. 3 is a block diagram showing the internal configuration of the first demodulation section and first decoding section of the receiving apparatus shown in FIG. 1.
Figure 4:
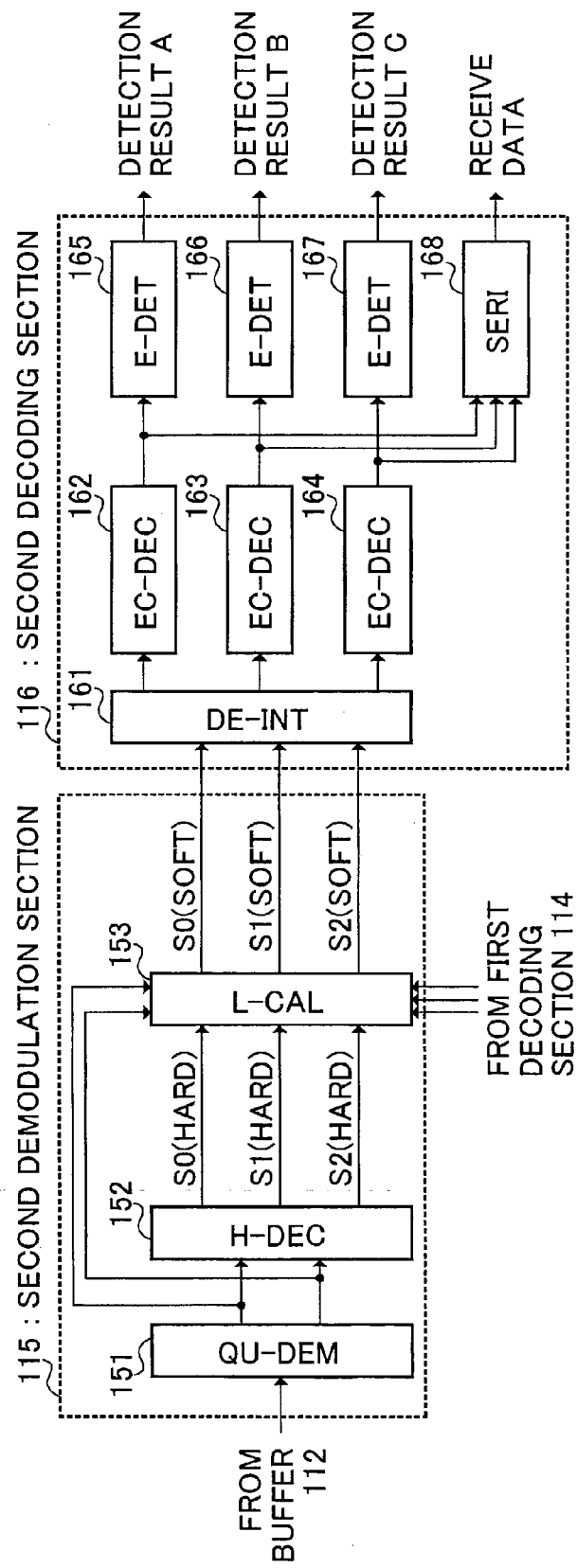
FIG. 4 is a block diagram showing the internal configuration of the second demodulation section and second decoding section of the receiving apparatus shown in FIG. 1.

FIG. 3 is a block diagram showing the internal configuration of the first demodulation section 113 and first decoding section 114 of the receiving apparatus 110 shown in FIG. 1. FIG. 4 is a block diagram showing the internal configuration of the second demodulation section 115 and second decoding section 116 of the receiving apparatus 110 shown in FIG. 1.

First, the configuration of the first demodulation section 113 will be described in detail.

A quadrature demodulation circuit (QU-DEM) 131 separates a received signal for one symbol output from the buffer 112 into an I signal and Q signal, and outputs these to a hard decision circuit (H-DEC) 132 and likelihood calculation circuit (L-CAL) 133. The hard decision circuit 132 performs hard decision processing on the received signal and calculates a hard decision value for each bit. The likelihood calculation circuit 133 calculates a likelihood (soft decision value) for each bit based on the hard decision value output from the hard decision circuit 132 and the received signal output from the quadrature demodulation circuit 131. The likelihood calculation circuit 133 may determine a likelihood by calculating the distance from a received signal point to the nearest identifying axis, for example. A likelihood obtained by such calculation is output to a de-interleaving circuit (DE-INT) 141 provided in the first decoding section 114.

Next, the configuration of the first decoding section 114 will be described in detail.

The de-interleaving circuit 141 permutes likelihoods (soft decision values) output from the likelihood calculation circuit 133 in accordance with a predetermined rule corresponding to the permutation rule in the interleaving circuit 128 provided in the transmitting apparatus 100, and restores the data to its original order. Error correction decoding circuits (EC-DEC) 142 through 144 perform error correction decoding of the individual soft decision values independently, and output the results of decoding to error detection circuits (E-DET) 145 through 147. Error detection circuits 145 through 147 perform error detection independently, and output the results of detection to a likelihood calculation section 153 provided in the second demodulation section 115.

Next, the configuration of the second demodulation section 115 will be described in detail.

A quadrature demodulation circuit (QU-DEM) 151 separates a received signal for one symbol output from the buffer 112 into an I signal and Q signal, and outputs these to a hard decision circuit (H-DEC) 152 and likelihood calculation circuit (L-CAL) 153. The hard decision circuit 152 performs hard decision processing on the received signal and calculates a hard decision value for each bit. The calculated hard decision values are output to the likelihood calculation circuit 153. The likelihood calculation circuit 153 first calculates candidate likelihoods in the same way as likelihood calculation circuit 133, and modifies the calculated candidate likelihoods with reference to the error detection results output from the first decoding section 114. In other words, the likelihood calculation circuit 153 recalculates the likelihood of a bit contained in an error detection unit in which an error was detected. Post-modification likelihoods obtained by means of recalculation are output to a de-interleaving circuit (DE-INT) 161 provided in the second decoding section 116.

Next, the configuration of the second decoding section 116 will be described in detail.

De-interleaving circuit 161 permutes likelihoods (soft decision values) output from likelihood calculation circuit 153 in accordance with a predetermined rule corresponding to the permutation rule in the interleaving circuit 128 provided in the transmitting apparatus 100, and restores the data to its original order. Error correction decoding circuits (EC-DEC) 162 through 164 perform error correction decoding of the individual soft decision values independently, based on likelihoods recalculated by likelihood calculation circuit 153, and output the results of decoding to error detection circuits (E-DET) 165 through 167 and a serialization circuit (SERI) 168. Error detection circuits 165 through 167 perform error detection for the respective error correction decoding results. The detection results are used to detect the presence or absence of an error in the receive data. The detection results are also transmitted to the transmitting apparatus and used in Automatic Repeat Request (ARQ) processing. The serialization circuit 168 serializes the error correction decoding results and obtains receive data.

Figure 5:
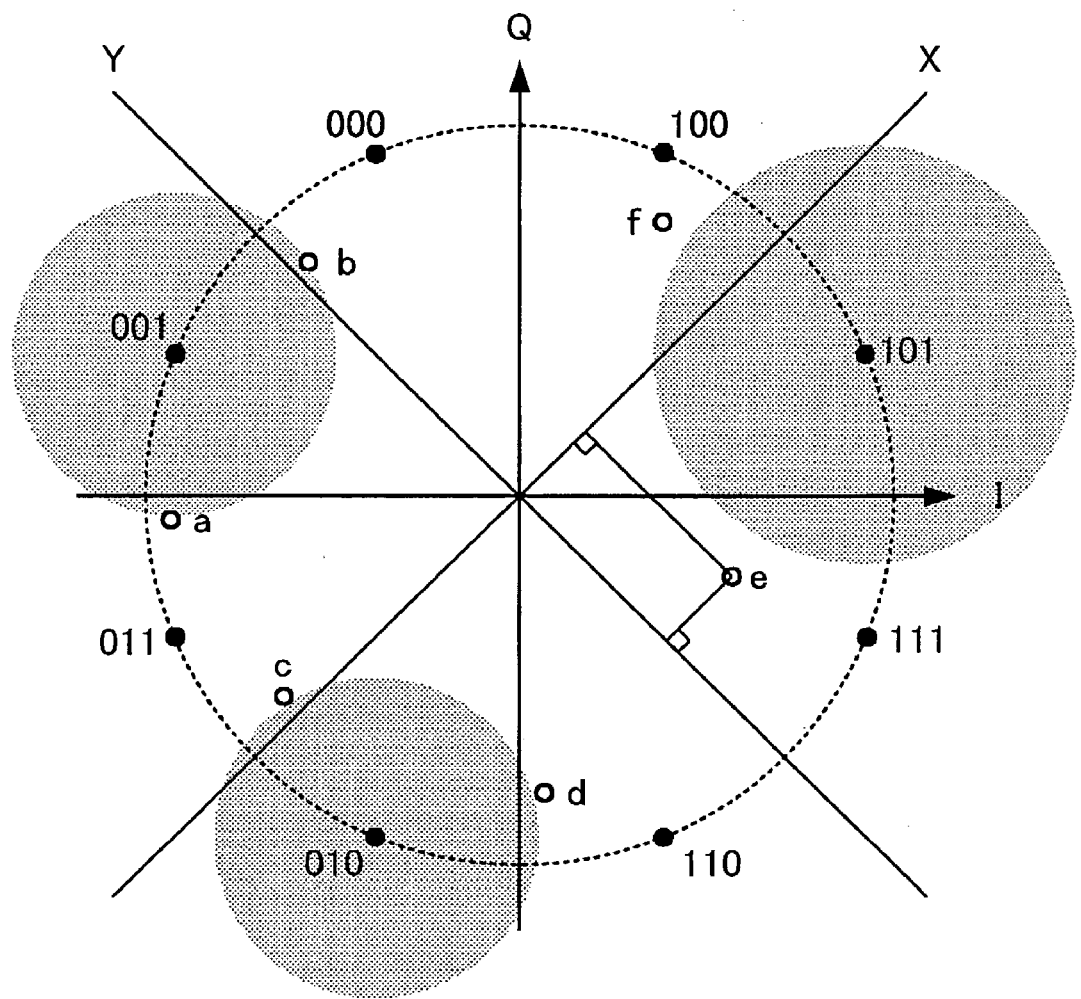
FIG. 5 is a drawing for explaining an 8PSK signal space diagram.

Likelihood calculation in likelihood calculation circuit 153 will now be described in detail with reference to FIG. 5. FIG. 5 is a drawing for explaining an 8PSK signal space diagram. As shown in this drawing, in 8PSK, 8 signal points are arranged at equal intervals ($\pi/8$ intervals) on a circle with the origin of the I-axis and Q-axis as its center. The 8 signal points are assigned values 000 through 111 as shown in FIG. 5. In this embodiment, the 3-bit values assigned to the signal points are designated "S0", "S1", and "S2" in order from the left side looking at the drawing. For example, for the signal point indicating "101", S0=1, S1=0, and S2=1; and for the signal point indicating "100", S0=1, S1=0, and S2=0. Also, in this embodiment, the leftmost bit of the bits of each signal point is referred to as the most significant bit. That is to say, "S0" is the most significant bit, "S1" is the second most significant bit, and "S2" is the third most significant bit. "S2" can also be referred to as the least significant bit.

Here, by way of example, a case will be described in which, with regard to likelihood calculation when a received signal is observed at the point e position, bits belonging to 3 kinds of error detection units are arranged in a received symbol, and the most significant 2 bits (that is, "S0" and "S1") are determined to be error-free by the first decoding section 114. When an error is not detected for the most significant 2 bits, it is confirmed that the most significant 2 bits are "10" (that is, S0=1 and S1=0), and therefore the received signal is "101" or "100". It is assumed that, when the received signal is observed at point e, S1 was erroneous but the error has been corrected by error correction decoding in the first decoding section 114, and an error has not been detected.

With a normal phase modulation method such as 8PSK, likelihood is determined by calculating the distance from the received signal point (here, point e) to the nearest identifying axis (here, the Y-axis), but by referring to the error detection results for the most significant 2 bits it is seen that the received signal is "101" or "100", and therefore the identifying axis is changed to the x-axis, which identifies these values "101" and "100", and the distance from point e to the X-axis is taken as the likelihood. By this means, the likelihood can be calculated more accurately for least significant bit S2.

The operation of a radio communication system that has the above configuration will now be described.

First, in the transmitting apparatus 100, transmit data is parallelized by the parallelization circuit 121, and error detection bits are added by error detection bit adding circuits 122 through 124 for each predetermined error detection unit. Then error correction coding is performed by error correction coding circuits 125 through 127 for each predetermined error correction unit, the data order is modified by the interleaving circuit 128 in accordance with a predetermined rule, 8PSK modulation is performed by the M-ary modulation section 102, and the resulting signal is output to the antenna 103.

In the receiving apparatus, a received signal is output from the buffer 112 to the first demodulation section 113 and second demodulation section 115. The received signal undergoes quadrature modulation by the first demodulation section 113, after which likelihood calculation is performed and the signal undergoes decoding and error detection based on the likelihoods in the first decoding section 114. That is to say, the received signal is separated into an I signal and Q signal by quadrature demodulation circuit 131, and is subjected to hard decision processing by hard decision circuit 132. In likelihood calculation circuit 133, received signal soft decision values (likelihoods) are calculated based on the hard decision results and the received signal following quadrature demodulation, and the calculated likelihoods are output to de-interleaving circuit 141. The soft decision values are permuted by de-interleaving circuit 141 in accordance with a predetermined rule, and undergo error correction decoding by error correction decoding circuits 142 through 144 and error detection decoding by error detection circuits 145 through 147. The results of error detection decoding are output to likelihood calculation section 153.

Furthermore, the received signal undergoes quadrature modulation in the second demodulation section 115, after which likelihoods are recalculated, and decoding and error detection are performed based on the recalculated likelihoods in the second decoding section 116. That is to say, the received signal is separated into an I signal and Q signal by quadrature demodulation circuit 151, and subjected to hard decision processing by hard decision circuit 152. The I signal and Q signal separated by quadrature demodulation circuit 151, and the hard decision values obtained by hard decision circuit 152, are output to likelihood calculation circuit 153. In likelihood calculation circuit 153, likelihoods are recalculated based on the input I signal, Q signal, hard decision values, and error detection results. Recalculated likelihoods are output together with non-recalculated likelihoods to de-interleaving circuit 161.

In de-interleaving circuit 161, the data order is restored to what it was prior to interleaving. In error correction decoding circuits 162 through 164, error correction decoding is performed using the recalculated likelihoods. The demodulation results are independently subjected to individual error correction decoding by error detection circuits 165 through 167. Furthermore, the demodulation results are serialized by the serialization circuit 168, and this serialized data is obtained as receive data.

Thus, according to this embodiment, transmission is performed with data error-correction-coded as a plurality of independent error detection units arranged in one transmission unit, and in the receiving apparatus, error detection is performed on decoded data for each independent error detection unit, and the likelihood of each bit is modified according to the error detection result, as a result of which error correction capability is improved and the probability of demodulation results being error-free is increased. Moreover, when a radio communication system according to this embodiment is combined with ARQ, error-free communication is achieved with fewer retransmissions, enabling the number of retransmissions to be reduced, and thereby improving transmission efficiency.

Furthermore, in this embodiment, when the error detection unit and the error correction unit are made the same, it is not necessary for error correction decoding to be performed again by the second decoding section 116 for bits contained in a unit for which an error was not detected in the first decoding section 114, thus enabling the amount of computation to be reduced. Also, making the error detection unit and the error correction unit the same facilitates combination with hybrid ARQ that combines an error correction code with ARQ.

In this embodiment, 3 kinds of independent error detection units are provided by distributing transmit data into 3 sequences that are subjected to error detection coding individually, but a plurality of independent error detection units may also be provided. That is to say, a transmitting apparatus according to the present invention may arrange bits belonging to an independent plurality of error detection units in one symbol. For example, bits belonging to 2 kinds of error detection units may be arranged in one symbol by means of M-ary modulation, orbits belonging to 4 kinds of error detection units may be arranged in one symbol by means of M-ary modulation. Moreover, the number of error detection units contained in one symbol may be modified as appropriate for each modulation unit (that is, on a symbol-by-symbol basis).

(Embodiment 2)

Embodiment 2 of the present invention is a variant of Embodiment 1, and describes a case in which a plurality of error detection units are taken together as one error correction unit.

Figure 6:
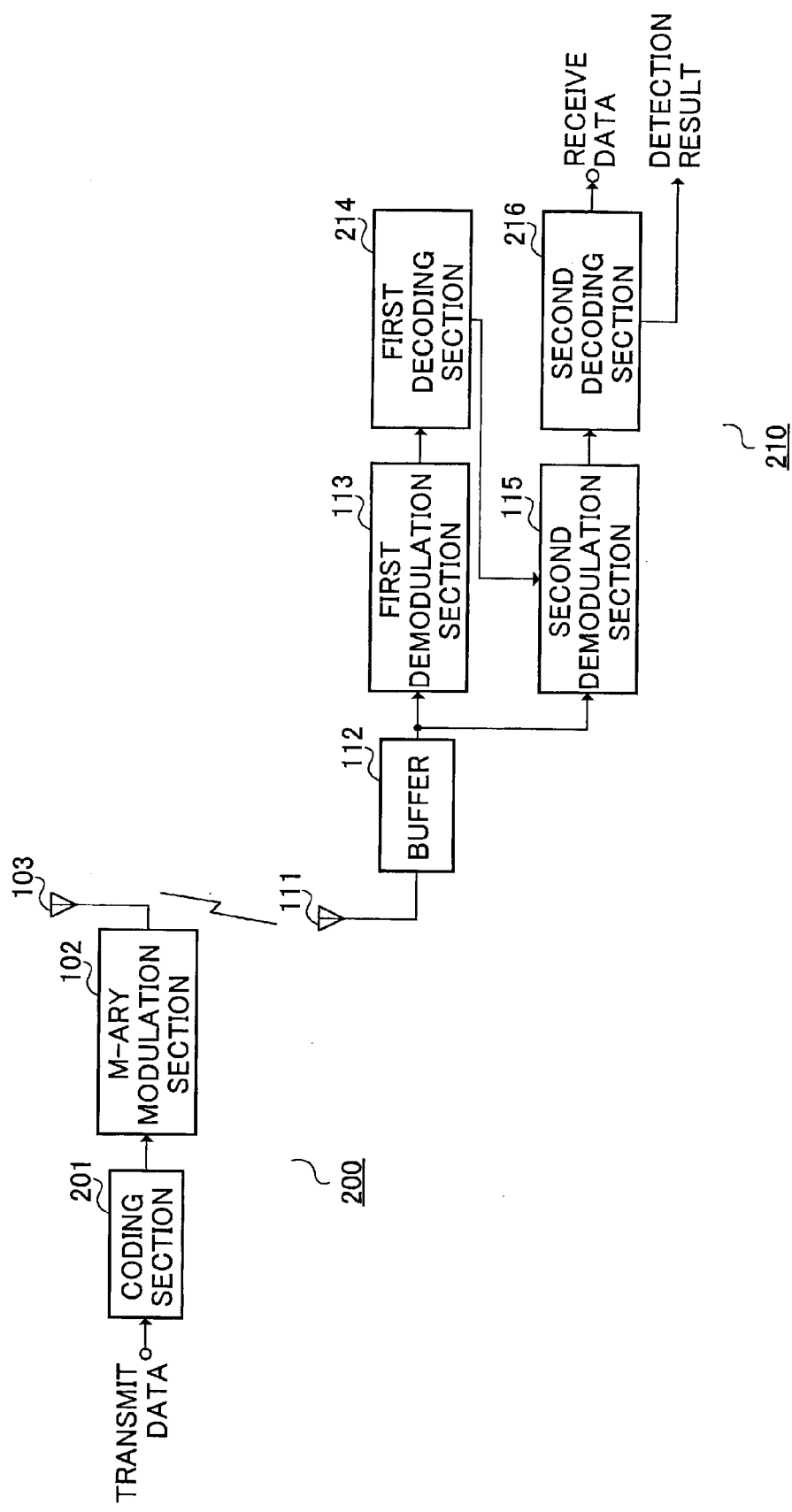
FIG. 6 is a block diagram showing the configuration of a radio communication system according to Embodiment 2 of the present invention.

FIG. 6 is a block diagram showing the configuration of a radio communication system according to Embodiment 2 of the present invention. In the radio communication system shown in FIG. 6, radio communications are performed between a transmitting apparatus 200 and receiving apparatus 210. In the transmitting apparatus 200, the configuration of the coding section 201 differs from that of the coding section 101 shown in FIG. 1, and in the receiving apparatus 210, the first decoding section 214 and second decoding section 216 differ from the first decoding section 114 and second decoding section 116 shown in FIG. 1.

Figure 7:
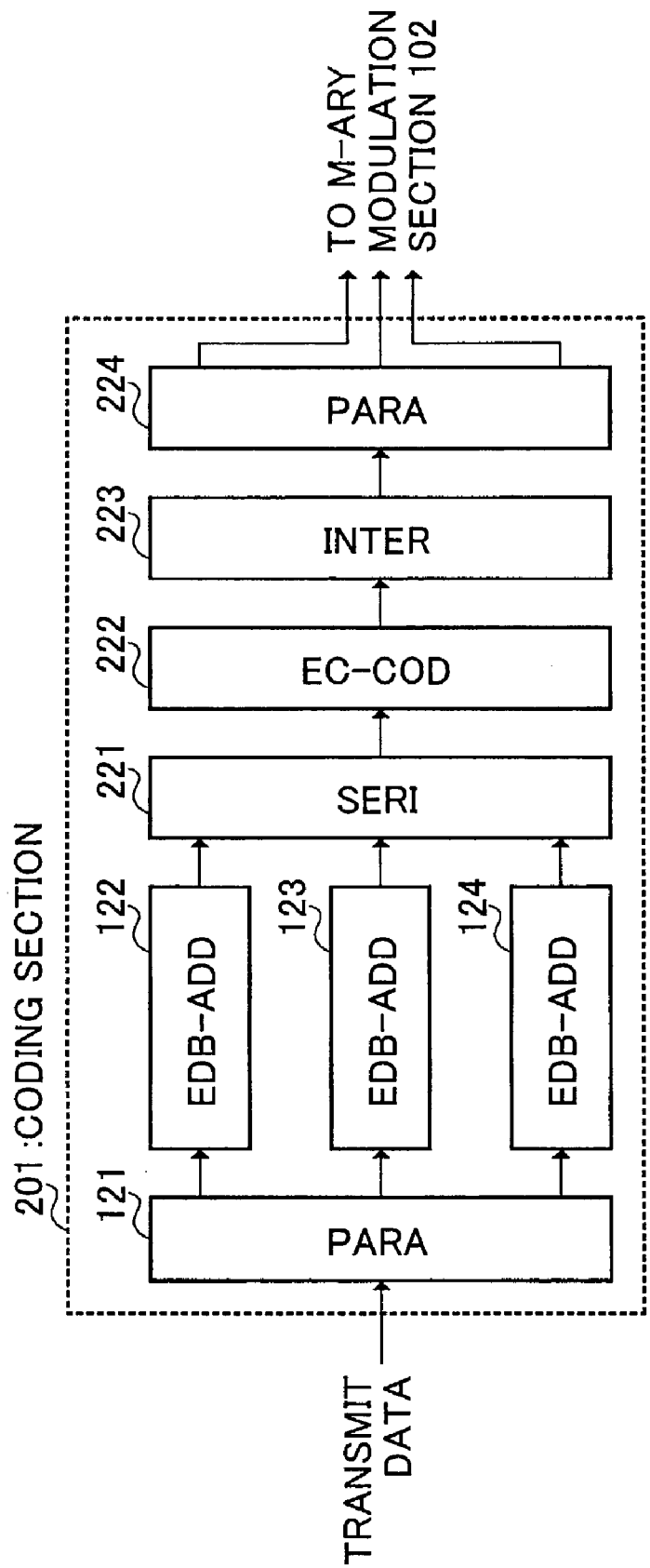
FIG. 7 is a block diagram showing the internal configuration of the coding section of the transmitting apparatus shown in FIG. 6.

FIG. 7 is a block diagram showing the internal configuration of the coding section 201 of the transmitting apparatus 200 shown in FIG. 6. Parts in FIG. 7 identical to those in FIG. 2 are assigned the same codes as in FIG. 2 and their detailed explanations are omitted. In the coding section 201 shown in FIG. 7, transmit data to which error detection bits have been added by error detection bit adding circuits 122 through 124 is serialized by a serialization circuit 221, undergoes error correction coding by an error correction coding circuit 222, has its data order modified by a de-interleaving circuit 223 in accordance with a predetermined rule, is parallelized into 3 sequences by a parallelization circuit 224, and is output to an M-ary modulation section 102.

Figure 8:
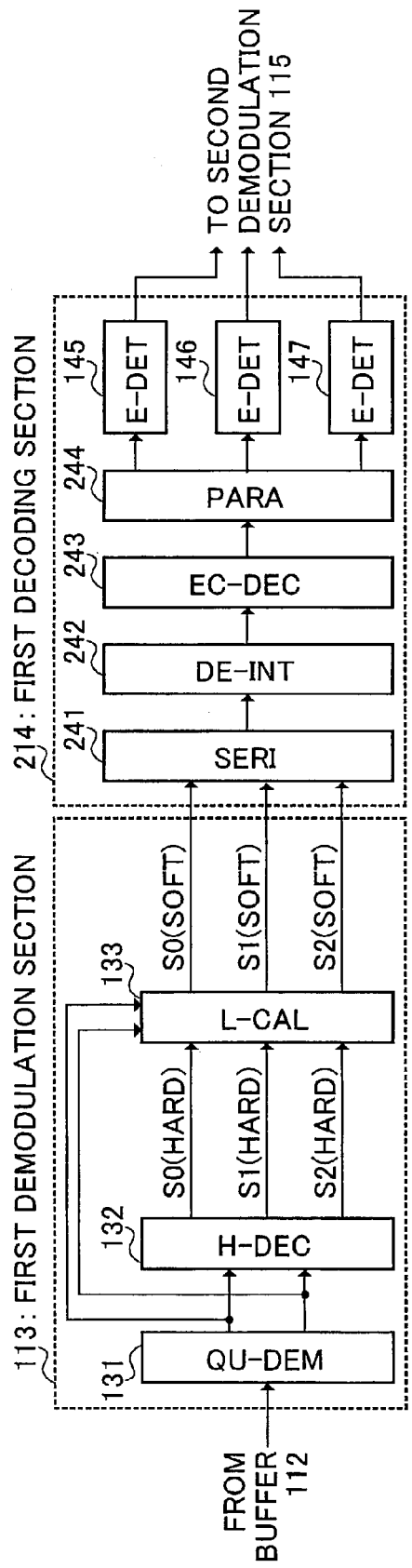
FIG. 8 is a block diagram showing the internal configuration of the first demodulation section and first decoding section of the receiving apparatus shown in FIG. 6.
Figure 9:
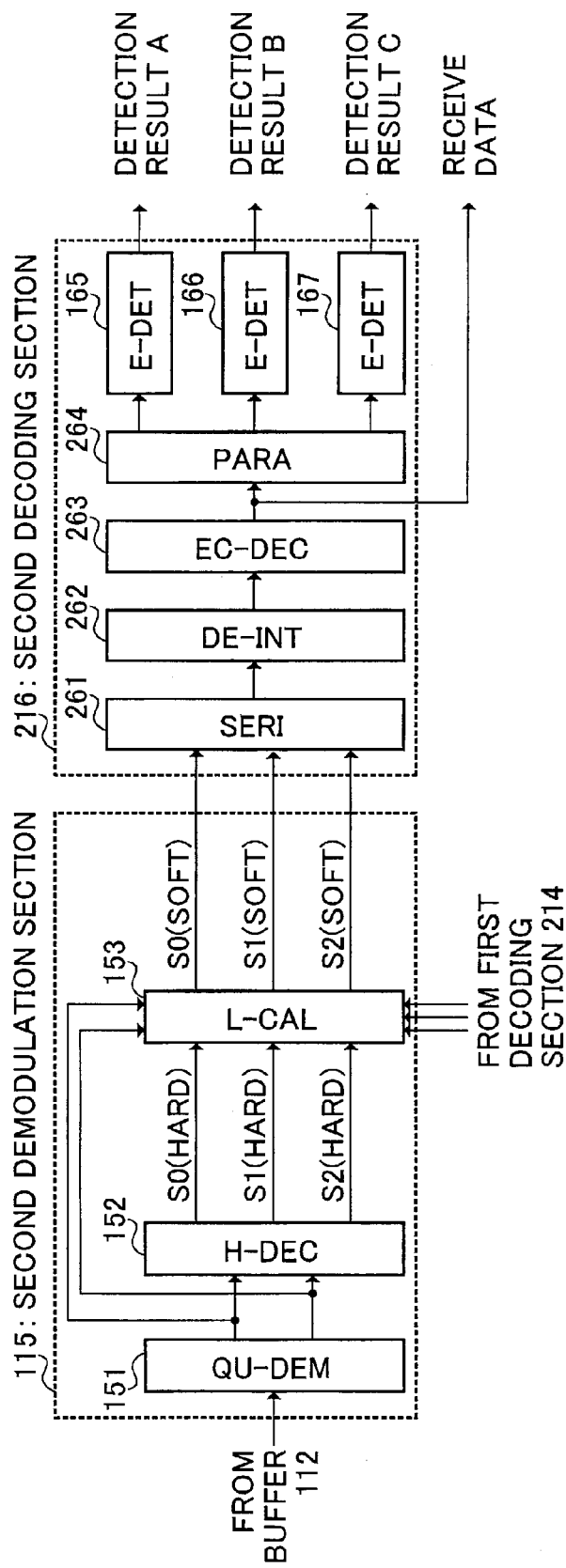
FIG. 9 is a block diagram showing the internal configuration of the second demodulation section and second decoding section of the receiving apparatus shown in FIG. 6.

FIG. 8 is a block diagram showing the internal configuration of the first demodulation section 113 and first decoding section 214 of the receiving apparatus 210 shown in FIG. 6. FIG. 9 is a block diagram showing the internal configuration of the second demodulation section 115 and second decoding section 216 of the receiving apparatus 210 shown in FIG. 6. Parts in FIG. 8 and FIG. 9 identical to those in FIG. 3 or FIG. 4 are assigned the same codes as in FIG. 3 or FIG. 4 and their detailed explanations are omitted.

Soft decision values (likelihoods) obtained on a bit-by-bit basis by a likelihood calculation circuit 133 in the first demodulation section 113 are serialized by a serialization circuit 241, and are permuted in a de-interleaving circuit 242 in accordance with a predetermined rule corresponding to the permutation rule in the interleaving circuit 223 provided in the transmitting apparatus 200. An error correction decoding circuit 243 performs error correction decoding using likelihoods output from this de-interleaving circuit 242. Decoding results are parallelized into 3 sequences by a parallelization circuit 244, and the parallelized decoding results are output to error detection circuits 145 through 147 respectively.

In the second demodulation section 115, likelihoods are recalculated with reference to the error detection results output from the first decoding section 214, and the recalculated likelihoods are output to a serialization circuit 261. The recalculated likelihoods (soft decision values) are serialized by serialization circuit 261, and are permuted in a de-interleaving circuit 262 in accordance with a predetermined rule corresponding to the permutation rule in the interleaving circuit 223 provided in the transmitting apparatus 200. An error correction decoding circuit 263 performs error correction decoding using the likelihoods output from this de-interleaving circuit 262. Decoding results are parallelized into 3 sequences by a parallelization circuit 264, and the parallelized decoding results are output to error detection circuits 165 through 167 respectively.

Thus, according to this embodiment, in the error correction coding circuit 222 bit strings belonging to a plurality of error detection units are made into one error correction unit, and error correction coding is performed on this error correction unit, so that the error correction unit is larger than when error correction coding is performed independently for each error detection unit. As error correction decoding circuits 243 and 263 perform error correction decoding using this large error correction unit, error correction capability can be improved. A particularly marked improvement in error correction capability is evident when a turbo code is used as the error correction code.

In this embodiment, error correction coding is performed after 3 kinds of error correction units have all been gathered together into one error correction unit, but the present invention is not limited to this, and it is also possible for error correction coding to be performed using an error correction unit into which a plurality of error correction units have been gathered together.

(Embodiment 3)

Embodiment 3 of the present invention is a variant of Embodiment 1, and describes a case in which the number of independent error detection units contained in one symbol is made identical to the number of bits arranged in one symbol by providing error detection units that differ according to the bit position, and performing interleaving for each error detection unit.

Figure 10:
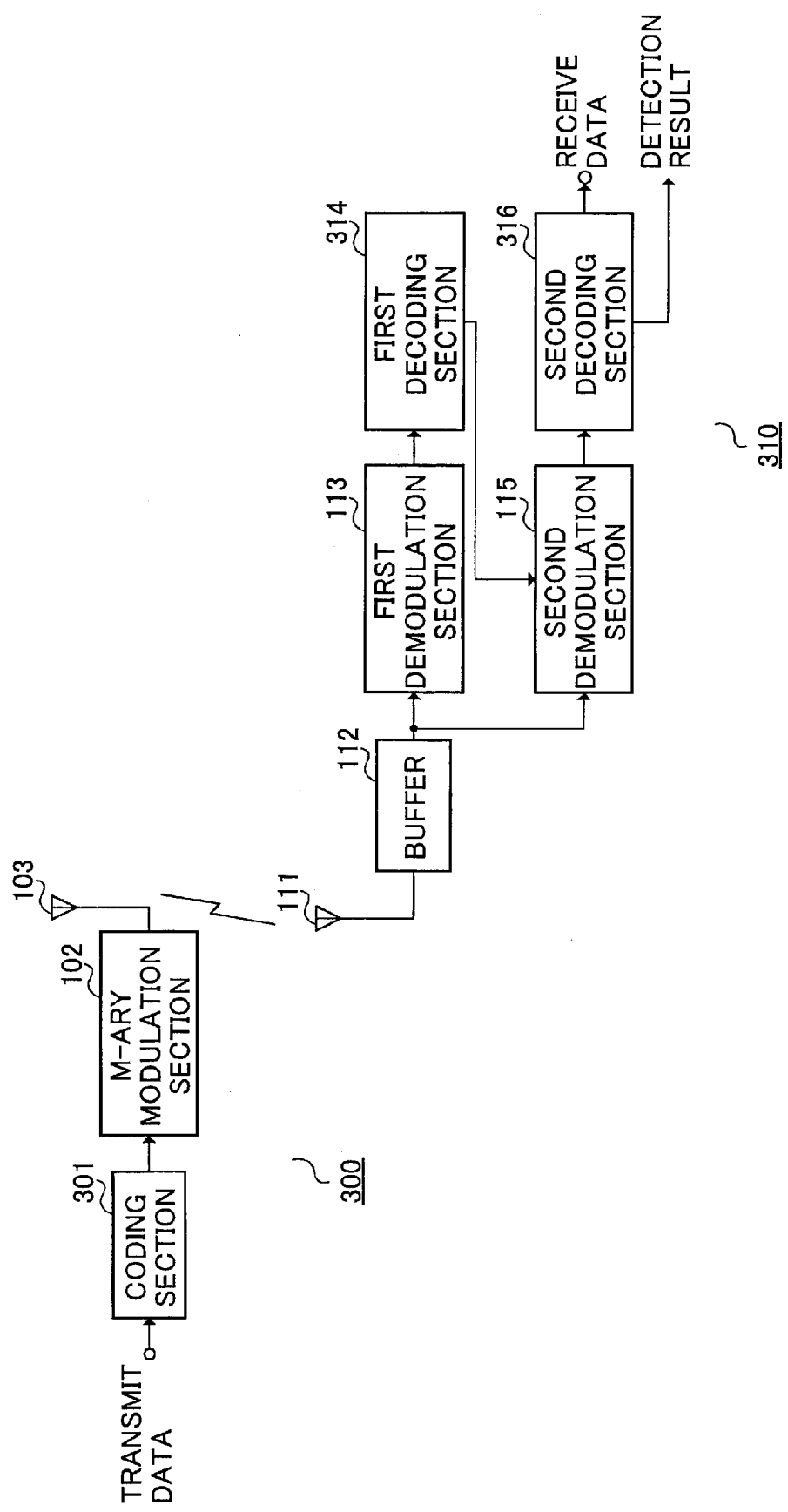
FIG. 10 is a block diagram showing the configuration of a radio communication system according to Embodiment 3 of the present invention.

FIG. 10 is a block diagram showing the configuration of a radio communication system according to Embodiment 3 of the present invention. In the radio communication system shown in FIG. 10, radio communications are performed between a transmitting apparatus 300 and receiving apparatus 310. In the transmitting apparatus 300, the configuration of the coding section 301 differs from that of the coding section 101 shown in FIG. 1, and in the receiving apparatus 310, the first decoding section 314 and second decoding section 316 differ from the first decoding section 114 and second decoding section 116 shown in FIG. 1.

Figure 11:
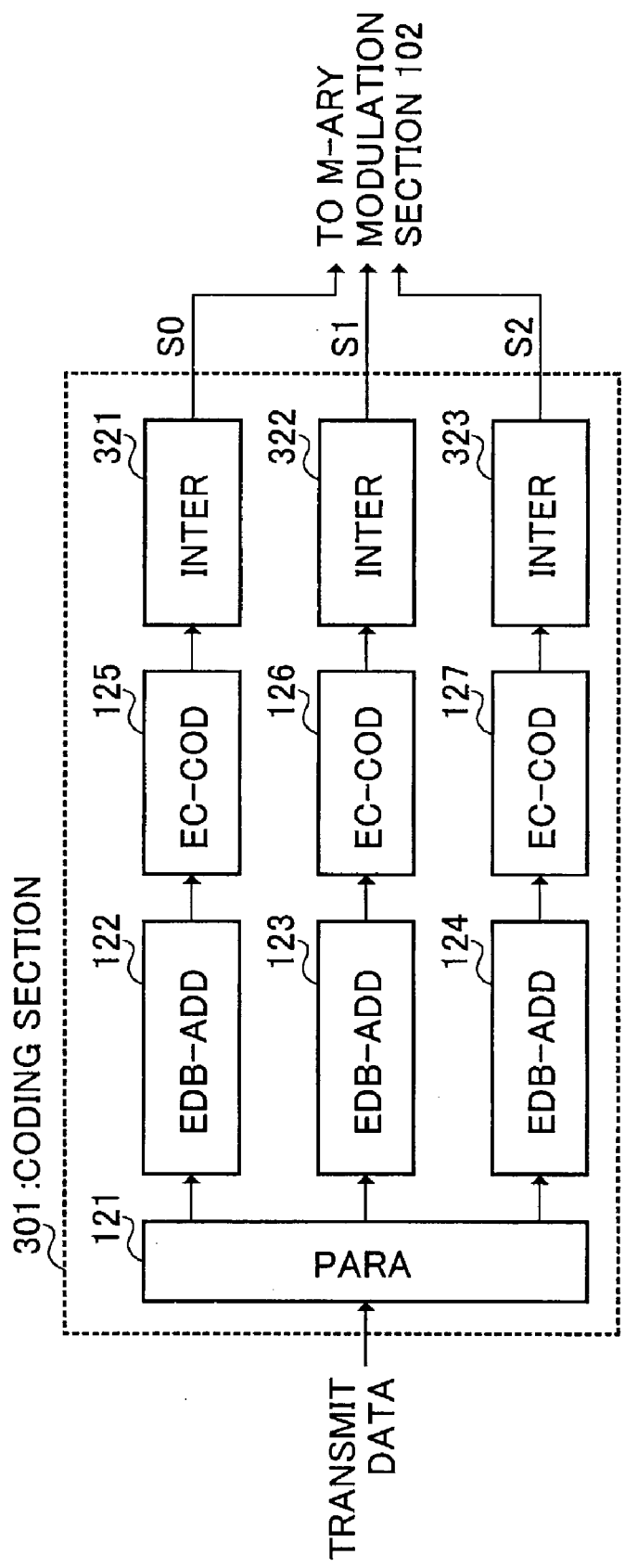
FIG. 11 is a block diagram showing the internal configuration of the coding section of the transmitting apparatus shown in FIG. 10.

FIG. 11 is a block diagram showing the internal configuration of the coding section 301 of the transmitting apparatus shown in FIG. 10. Parts in FIG. 11 identical to those in FIG. 2 are assigned the same codes as in FIG. 2 and their detailed explanations are omitted. In FIG. 11, a parallelization circuit 121 parallelizes transmit data and outputs this parallelized transmit data to error detection bit adding circuits 122 through 124. It is here assumed that bit S0 output to error detection bit adding circuit 122 is positioned as the most significant bit by an M-ary modulation section 102. It is also assumed that bit S1 output to error detection bit adding circuit 123 is positioned as the second most significant bit by the M-ary modulation section 102, and that bit S2 output to error detection bit adding circuit 124 is positioned as the third most significant bit by the M-ary modulation section 102. That is to say, S0, S1, and S2 belong to different error detection units. For the sake of explanation, hereinafter in this Description the error detection unit to which S0 belongs will be designated error detection unit A, the error detection unit to which S1 belongs will be designated error detection unit B, and the error detection unit to which S3 belongs will be designated error detection unit C.

Error detection bit adding circuits 122 through 124 perform error detection coding of bits S0 through S2 output from the parallelization circuit 121 for each predetermined error detection unit. Specifically, error detection bit adding circuit 122 adds an error detection bit to input bit S0 for each predetermined error detection unit, and obtains a coded bit string P0; error detection bit adding circuit 123 adds an error detection bit to input bit S1 for each predetermined error detection unit, and obtains a coded bit string P1; and error detection bit adding circuit 124 adds an error detection bit to input bit S2 for each predetermined error detection unit, and obtains a coded bit string P2. Coded bit strings P0 through P2 are output to corresponding error correction coding circuits 125 through 127 respectively.

Error correction coding circuits 125 through 127 perform, for each predetermined error correction unit, error correction coding of P0 through P2 output from corresponding error detection bit adding circuits 122 through 124, and output the error-correction-coded data to corresponding interleaving circuits 321 through 323 respectively. Interleaving circuits 321 through 323 permute the respective input coded bit strings in accordance with a predetermined rule, and output the permuted data to the M-ary modulation section 102. The M-ary modulation section 102 performs 8PSK modulation, taking the bit output from interleaving circuit 321 as most significant bit S0, the bit output from interleaving circuit 322 as second most significant bit S1, and the bit output from interleaving circuit 323 as third most significant bit S2.

Figure 12:
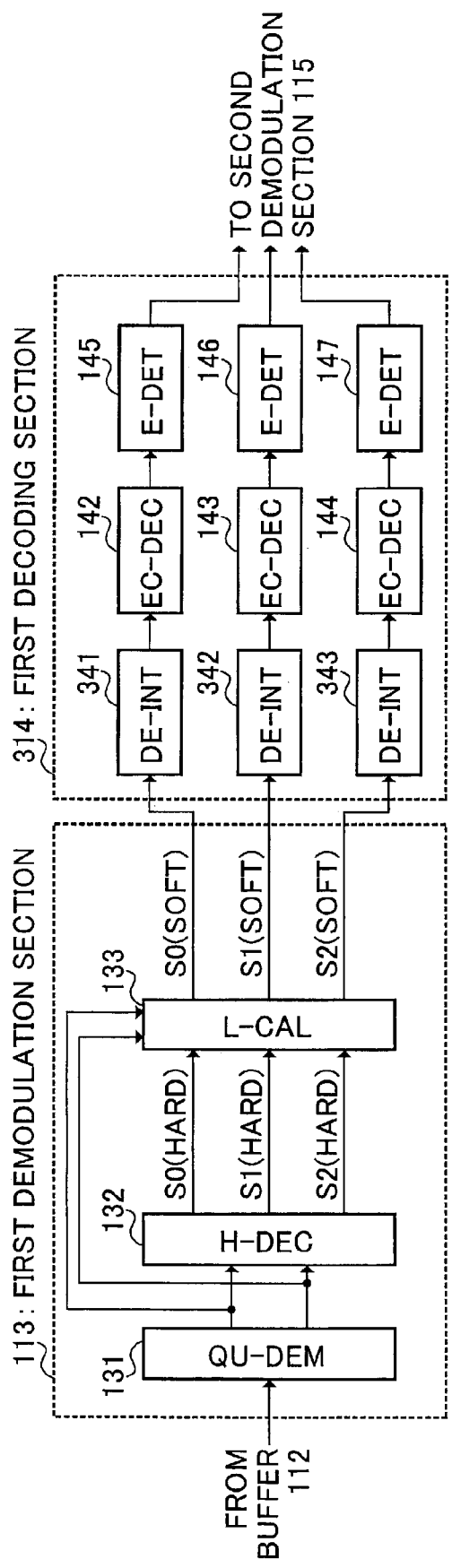
FIG. 12 is a block diagram showing the internal configuration of the first demodulation section and first decoding section of the receiving apparatus shown in FIG. 10.
Figure 13:
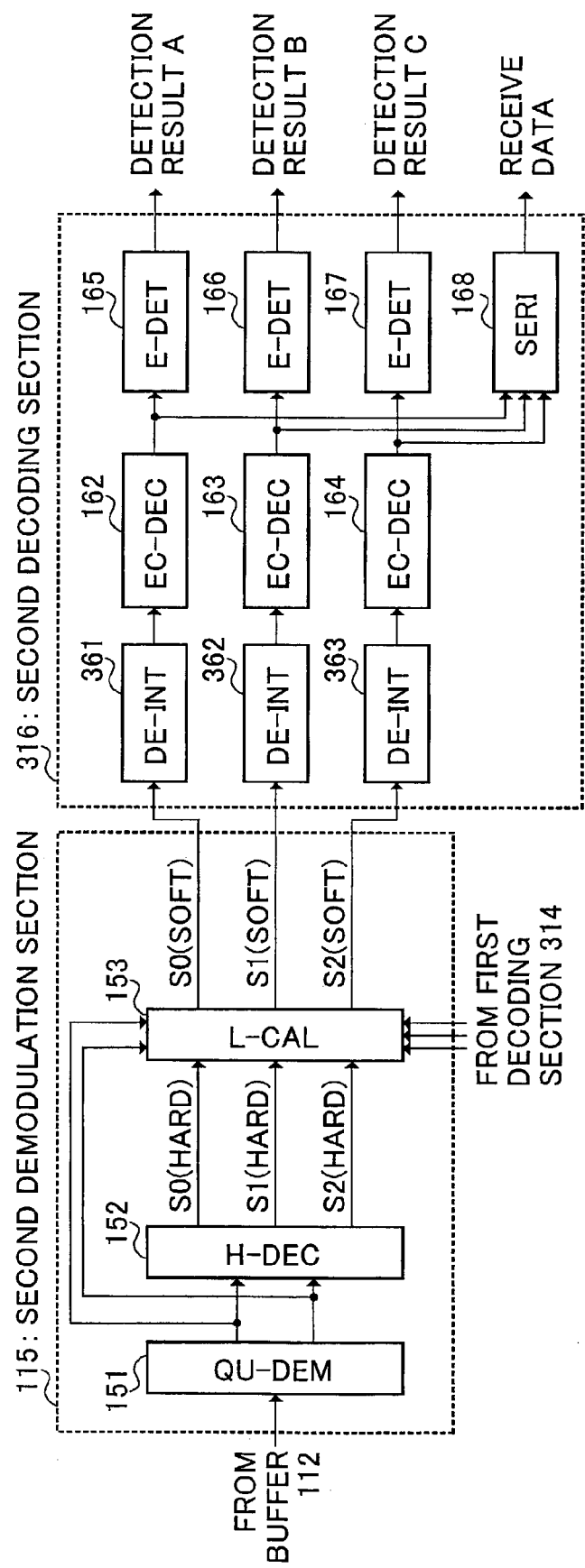
FIG. 13 is a block diagram showing the internal configuration of the second demodulation section and second decoding section of the receiving apparatus shown in FIG. 10.

FIG. 12 is a block diagram showing the internal configuration of the first demodulation section 113 and first decoding section 314 of the receiving apparatus 310 shown in FIG. 10. FIG. 13 is a block diagram showing the internal configuration of the second demodulation section 115 and second decoding section 316 of the receiving apparatus 310 shown in FIG. 10. Parts in FIG. 12 and FIG. 13 identical to those in FIG. 3 or FIG. 4 are assigned the same codes as in FIG. 3 or FIG. 4 and their detailed explanations are omitted.

In the likelihood calculation circuit 133 in the first demodulation section 113, received signal likelihoods (soft decision values) are calculated for S0 through S2. The S0 likelihood (soft decision value) is output to a de-interleaving circuit 341, the S1 likelihood is output to a de-interleaving circuit 342, and the S2 likelihood is output to a de-interleaving circuit 343.

De-interleaving circuit 341 permutes the input bit string in accordance with the rule corresponding to interleaving circuit 321, and outputs the permuted bit string to a corresponding error correction decoding circuit 142. De-interleaving circuit 342 permutes the input bit string in accordance with the rule corresponding to interleaving circuit 322, and outputs the permuted bit string to a corresponding error correction decoding circuit 143. De-interleaving circuit 343 permutes the input bit string in accordance with the rule corresponding to interleaving circuit 323, and outputs the permuted bit string to a corresponding error correction decoding circuit 144. Error correction decoding circuits 142 through 144 perform error correction decoding on the respective input bit strings.

In the second demodulation section 115, likelihoods are recalculated with reference to error detection results output from the first decoding section 314. For example, if an error is not detected in S0 or S1 by error detection circuit 145 and error detection circuit 146, and an error is detected only in S2 by error detection circuit 147, signal points are limited to 2 points according to the S0 and S1 hard decision values obtained by hard decision circuit 152, and likelihoods of S0 through S2 are recalculated using the identifying axis that identifies these limited signal points.

Received signal likelihoods (soft decision values) recalculated in this way are output to corresponding de-interleaving circuits 361 through 363. That is to say, the recalculated S0 likelihood is output to de-interleaving circuit 361, the recalculated S1 likelihood is output to de-interleaving circuit 362, and the recalculated S2 likelihood is output to de-interleaving circuit 363.

De-interleaving circuit 361 permutes the input bit string in accordance with the rule corresponding to interleaving circuit 321, and outputs the permuted bit string to a corresponding error correction decoding circuit 162. De-interleaving circuit 362 permutes the input bit string in accordance with the rule corresponding to interleaving circuit 322, and outputs the permuted bit string to a corresponding error correction decoding circuit 163. De-interleaving circuit 363 permutes the input bit string in accordance with the rule corresponding to interleaving circuit 323, and outputs the permuted bit string to a corresponding error correction decoding circuit 164. Error correction decoding circuits 162 through 164 perform error correction decoding on the respective input bit strings.

Thus, according to this embodiment, when using 8PSK modulation whereby 3 bits are arranged in one symbol, transmit data is parallelized into 3 sequences, and an error detection code is added on a sequence-by-sequence basis by error detection bit adding circuits 122 through 124. As a result, the number of bits arranged in one symbol and the number of independent error detection units are the same. Also, data is permuted on a sequence-by-sequence basis (that is, for each independent error detection unit) by interleaving circuits 321 through 323, and 8PSK modulation is performed by the M-ary modulation section 102, taking the bit output from interleaving circuit 321 as the most significant bit, the bit output from interleaving circuit 322 as the second most significant bit, and the bit output from interleaving circuit 323 as the third most significant bit. Therefore, bits contained in 3 kinds of independent error correction units are arranged in one symbol. That is to say, in each of the symbols generated sequentially by modulation processing, the number of independent error detection units contained in one symbol and the number of bits arranged in one symbol are the same.

Consequently, when even one of the independent error detection units is determined to be error-free in error detection circuits 145 through 147, likelihoods are recalculated by likelihood calculation circuit 153 with signal points limited according to bits that are error-free, enabling likelihoods to be calculated more accurately.

Also, with 8PSK, the error tolerance of the most significant 2 bits is better than the error tolerance of the third most significant bit, and therefore the most significant 2 bits may be received correctly even if reception conditions degrade. In such a case, the probability of an error in the third most significant bit being corrected is increased by having likelihoods recalculated by likelihood calculation circuit 153 using the identifying axis that identifies signal points limited according to correctly received bits, and having error correction decoding performed by error correction decoding circuit 164 using the recalculated, accurate likelihoods.

Furthermore, in this embodiment, since data is transmitted that has been subjected to error detection processing in the transmitting apparatus using error detection units that differ according to bit positions, by performing demodulation processing independently in a receiving apparatus using a different demodulation pattern for each error detection unit, it is possible for demodulation to be carried out in the receiving apparatus without notification of information such as the modulation method. That is to say, in a radio communication system according to this embodiment, it is possible to use the hierarchical demodulation shown in Japanese Patent Application No.2000-189411, whose inventors are the present inventors.

(Embodiment 4)

Embodiment 4 of the present invention is a variant of Embodiment 3, and describes a case in which bit positions in symbols are modified on a symbol-by-symbol basis.

Figure 14:
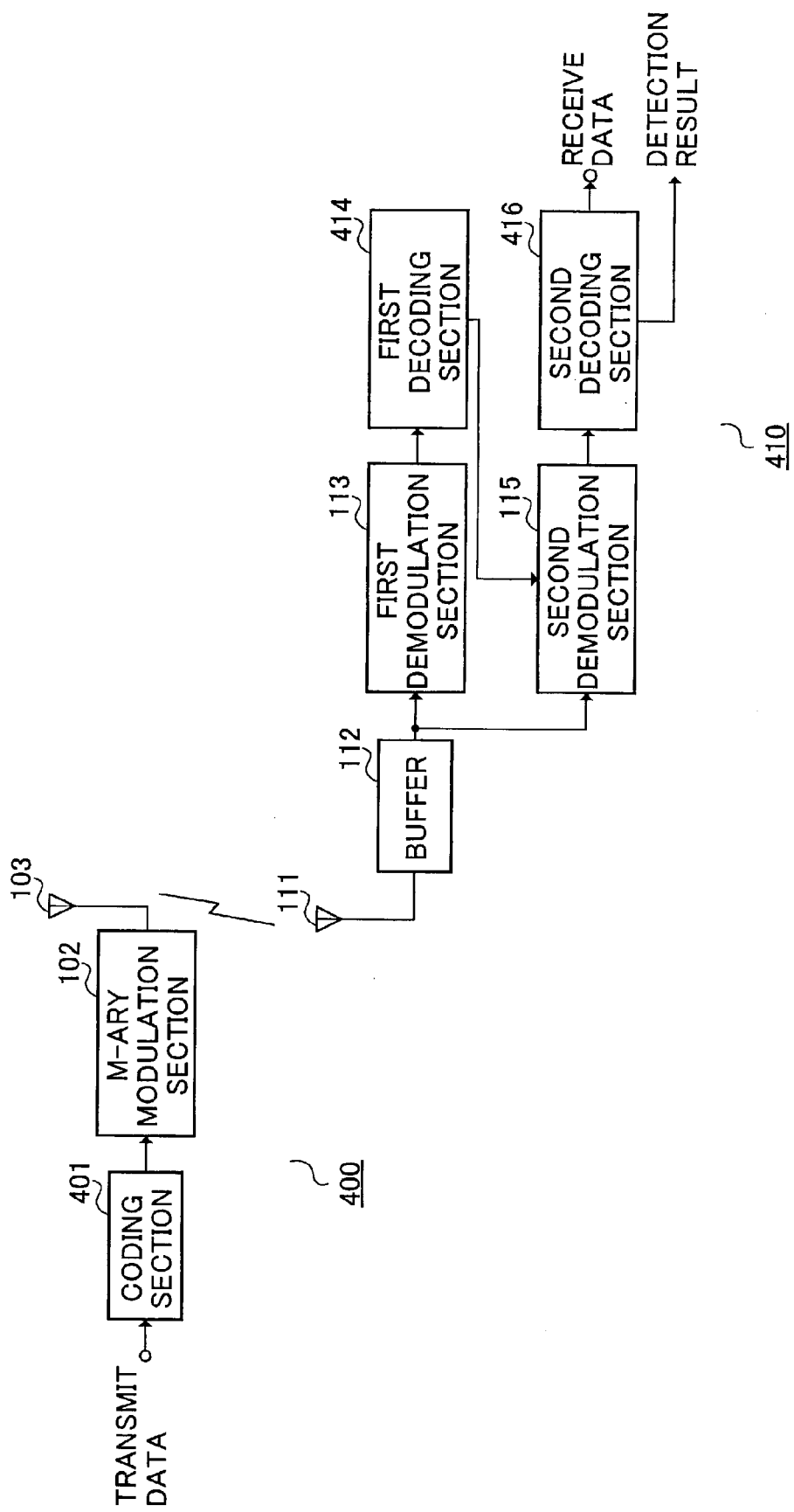
FIG. 14 is a block diagram showing the configuration of a radio communication system according to Embodiment 4 of the present invention.

FIG. 14 is a block diagram showing the configuration of a radio communication system according to Embodiment 4 of the present invention. In the radio communication system shown in FIG. 14, radio communications are performed between a transmitting apparatus 400 and receiving apparatus 410. In the transmitting apparatus 400, the configuration of the coding section 401 differs from that of the coding section 301 shown in FIG. 10, and in the receiving apparatus 410, the first decoding section 414 and second decoding section 416 differ from the first decoding section 314 and second decoding section 316 shown in FIG. 10.

Figure 15:
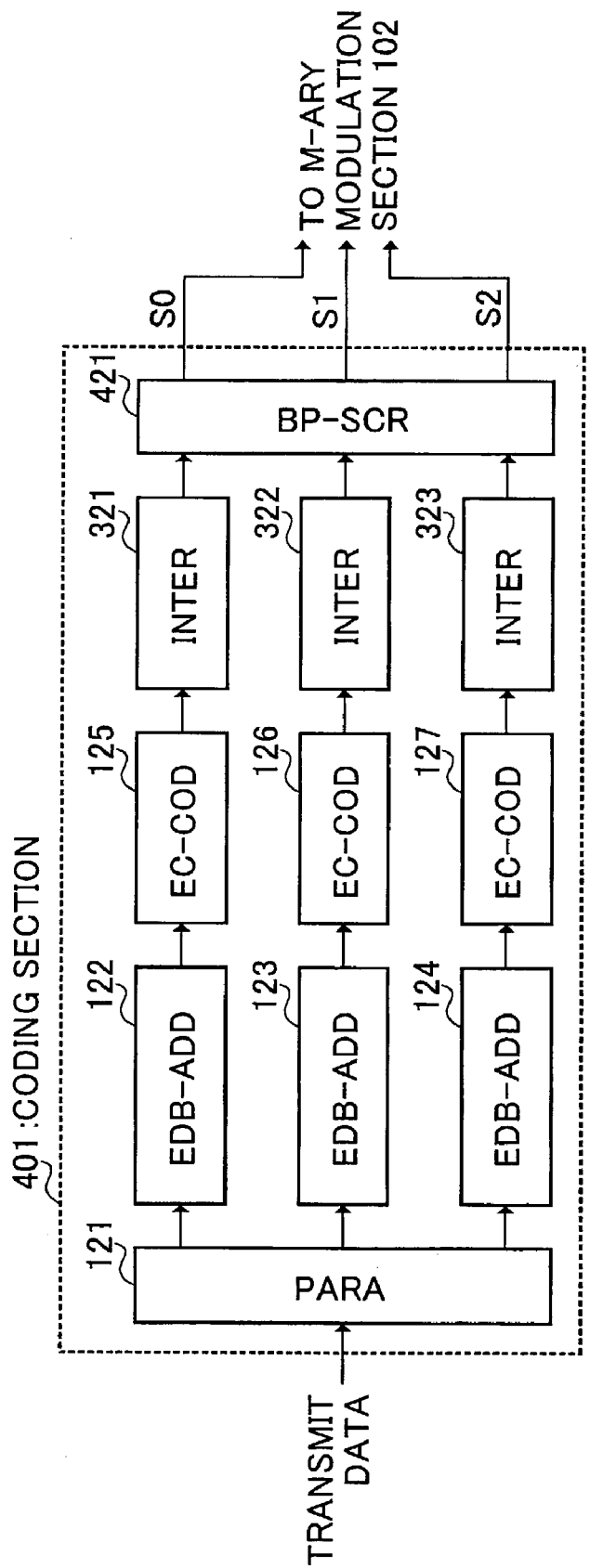
FIG. 15 is a block diagram showing the internal configuration of the coding section of the transmitting apparatus shown in FIG. 14.

FIG. 15 is a block diagram showing the internal configuration of the coding section 401 of the transmitting apparatus shown in FIG. 14. Parts in FIG. 15 identical to those in FIG. 11 are assigned the same codes as in FIG. 11 and their detailed explanations are omitted. In FIG. 15, interleaving circuits 321 through 323 permute bit strings belonging to error detection units corresponding to the respective sequences. Specifically, interleaving circuit 321 permutes a bit string belonging to error detection unit A, interleaving circuit 322 permutes a bit string belonging to error detection unit B, and interleaving circuit 323 permutes a bit string belonging to error detection unit C. Bits S0 through S2 belonging to error detection units A through C are output to a bit position scrambler (BP-SCR) 421.

The bit position scrambler 421 modifies the bit positions of S0 through S2 in accordance with a predetermined rule, and outputs S0 through S2 with modified bit positions to an M-ary modulation section 102. For example, the bit position scrambler 421 may modify bit position assignments "S0: most significant bit, S1: second most significant bit, S2: third most significant bit" in symbol K to "S0: second most significant bit, S1: third most significant bit, S2: most significant bit" in following symbol K+1. Such bit position modifications are made on a symbol-by-symbol basis.

The M-ary modulation section 102 performs 8PSK modulation with S0 through S2 output by the bit position scrambler 421 assigned to their modified positions.

Figure 16:
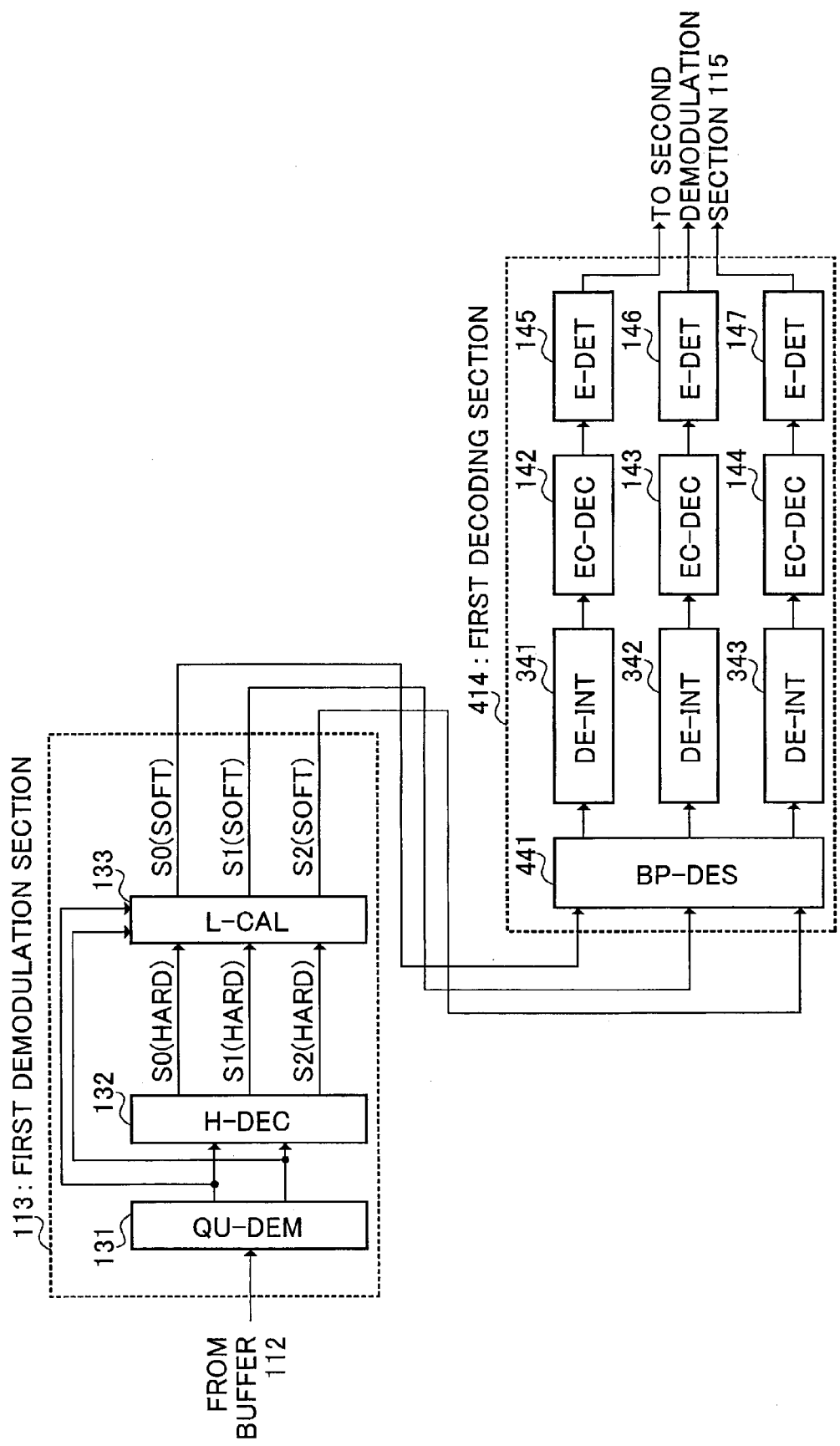
FIG. 16 is a block diagram showing the internal configuration of the first demodulation section and first decoding section of the receiving apparatus shown in FIG. 14.
Figure 17:
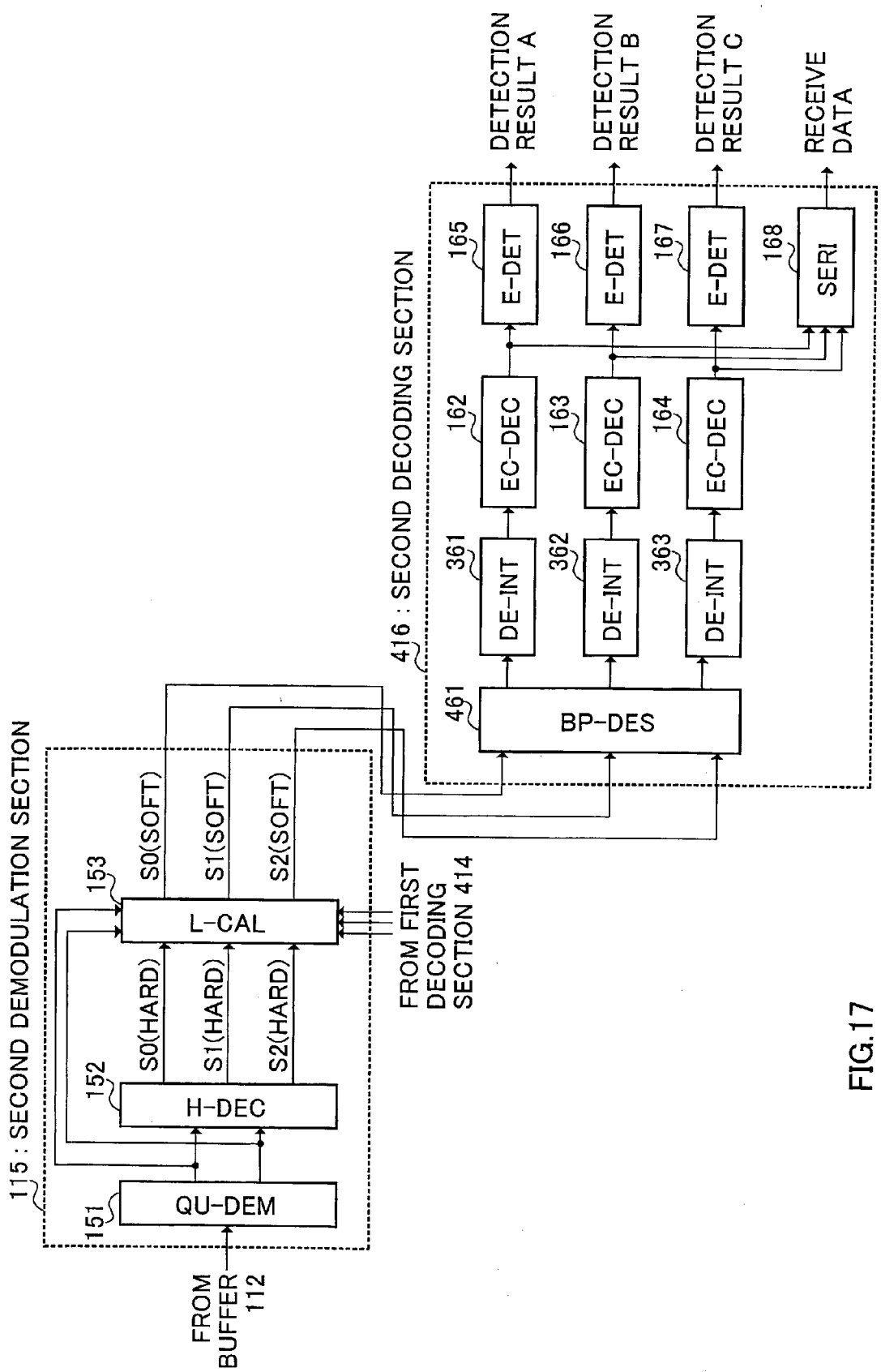
FIG. 17 is a block diagram showing the internal configuration of the second demodulation section and second decoding section of the receiving apparatus shown in FIG. 14.

FIG. 16 is a block diagram showing the internal configuration of the first demodulation section 113 and first decoding section 414 of the receiving apparatus 410 shown in FIG. 14. FIG. 17 is a block diagram showing the internal configuration of the second demodulation section 115 and second decoding section 416 of the receiving apparatus 410 shown in FIG. 14. Parts in FIG. 16 and FIG. 17 identical to those in FIG. 12 or FIG. 13 are assigned the same codes as in FIG. 12 or FIG. 13 and their detailed explanations are omitted.

In the likelihood calculation circuit 133 in the first demodulation section 113, received signal likelihoods (soft decision values) are calculated for S0 through S2. The S0, S1, and S2 likelihoods (soft decision values) are output to a bit position descrambler (BP-DES) 441.

The bit position descrambler 441 modifies the bit positions of the likelihoods output from likelihood calculation circuit 133 in accordance with a predetermined rule, and outputs likelihoods to de-interleaving circuits 341 through 343 corresponding to the modified bit positions. This predetermined rule corresponds to the rule of the bit position scrambler 421 in the transmitting apparatus. For example, when the likelihoods of symbol K+1 referred to in the above description of the bit position scrambler 421 in the transmitting apparatus are calculated, the bit position descrambler 441 outputs the S2 likelihood as the likelihood of the most significant bit, the S0 likelihood as the likelihood of the second most significant bit, and the S1 likelihood as the likelihood of the third most significant bit. The bit position descrambler 441 permutes the likelihoods of the bit positions input in this way, and outputs S0 to de-interleaving circuit 341, S1 to de-interleaving circuit 342, and S2 to de-interleaving circuit 343.

Also, a bit position descrambler 461 modifies the bit positions of likelihoods recalculated by likelihood calculation circuit 153 in accordance with a predetermined rule, and outputs likelihoods to de-interleaving circuits 361 through 363 corresponding to the modified bit positions.

Thus, according to this embodiment, the same kind of effect is obtained as with Embodiment 3, and the advantageous effect described below is also obtained. Namely, by modifying the bit positions of bits S0 through S2 belonging to error correction units A through C in the bit position scrambler 421, it is possible to scramble the error tolerances of bits S0 through S2 belonging to the respective error detection units. That is to say, S2, which is normally assigned to the least significant bit, is modulated after being assigned to the most significant bit or second most significant bit in a predetermined symbol. Also, S0, which is normally assigned to the most significant bit, is assigned to the second most significant bit or least significant bit. A similar pattern also applies to S1, which is normally assigned to the second most significant bit. By this means, the error tolerances of bits belonging to respective error detection units are made uniform, and an improvement in overall reception characteristics can be expected.

(Embodiment 5)

Embodiment 5 of the present invention is a variant of Embodiment 3, and describes a case in which a signal that has undergone error correction decoding is recoded in a receiving apparatus, and candidate likelihoods are modified using this.

Figure 18:
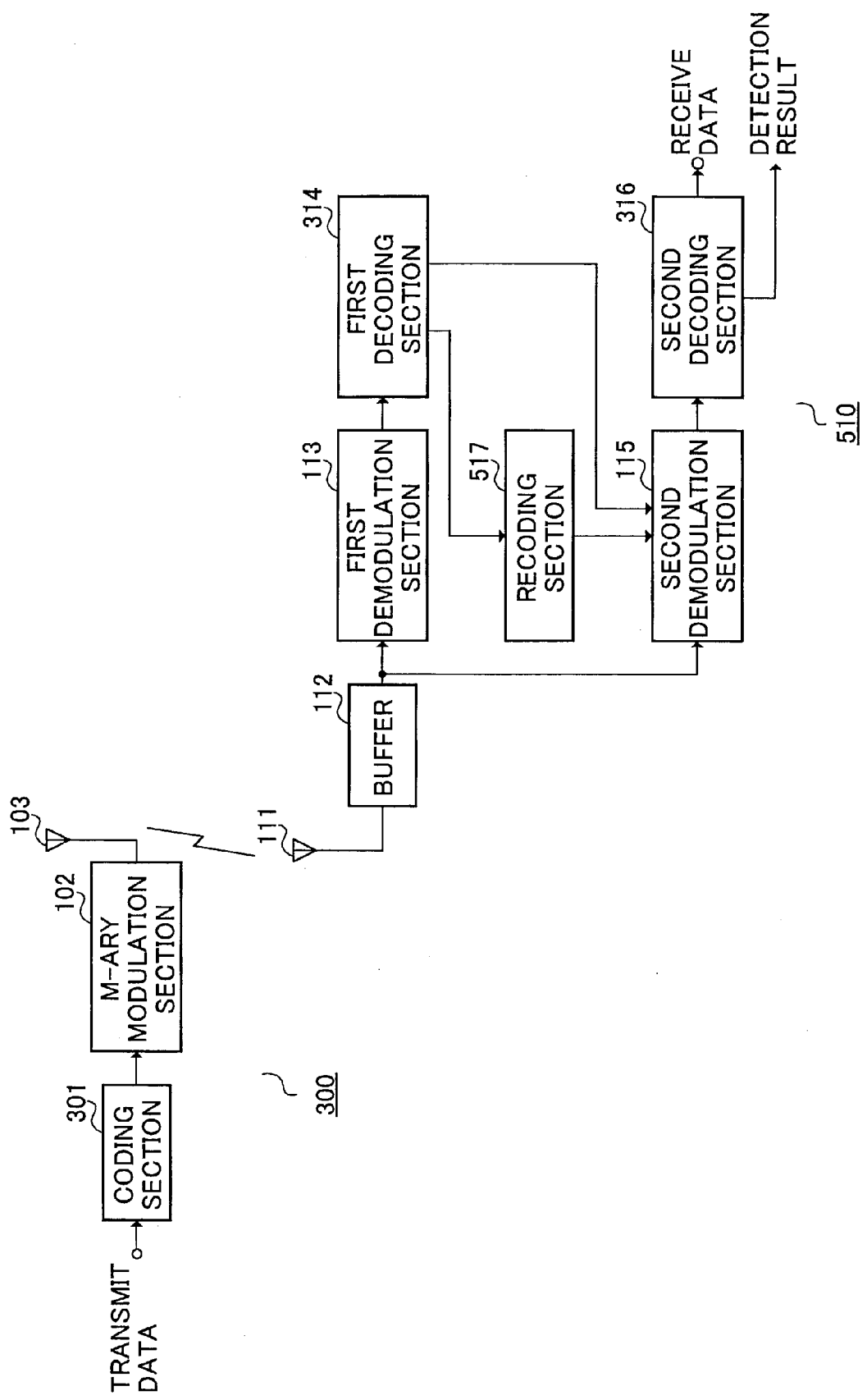
FIG. 18 is a block diagram showing the configuration of a radio communication system according to Embodiment 5 of the present invention.

FIG. 18 is a block diagram showing the configuration of a radio communication system according to Embodiment 5 of the present invention. In the radio communication system shown in FIG. 18, radio communications are performed between a transmitting apparatus 300 and receiving apparatus 510. The receiving apparatus 510 has a configuration in which a recoding section 517 has been added to the receiving apparatus 310 shown in FIG. 10. The recoding section 517 codes again data that has been decoded by a first decoding section 314.

Figure 19:
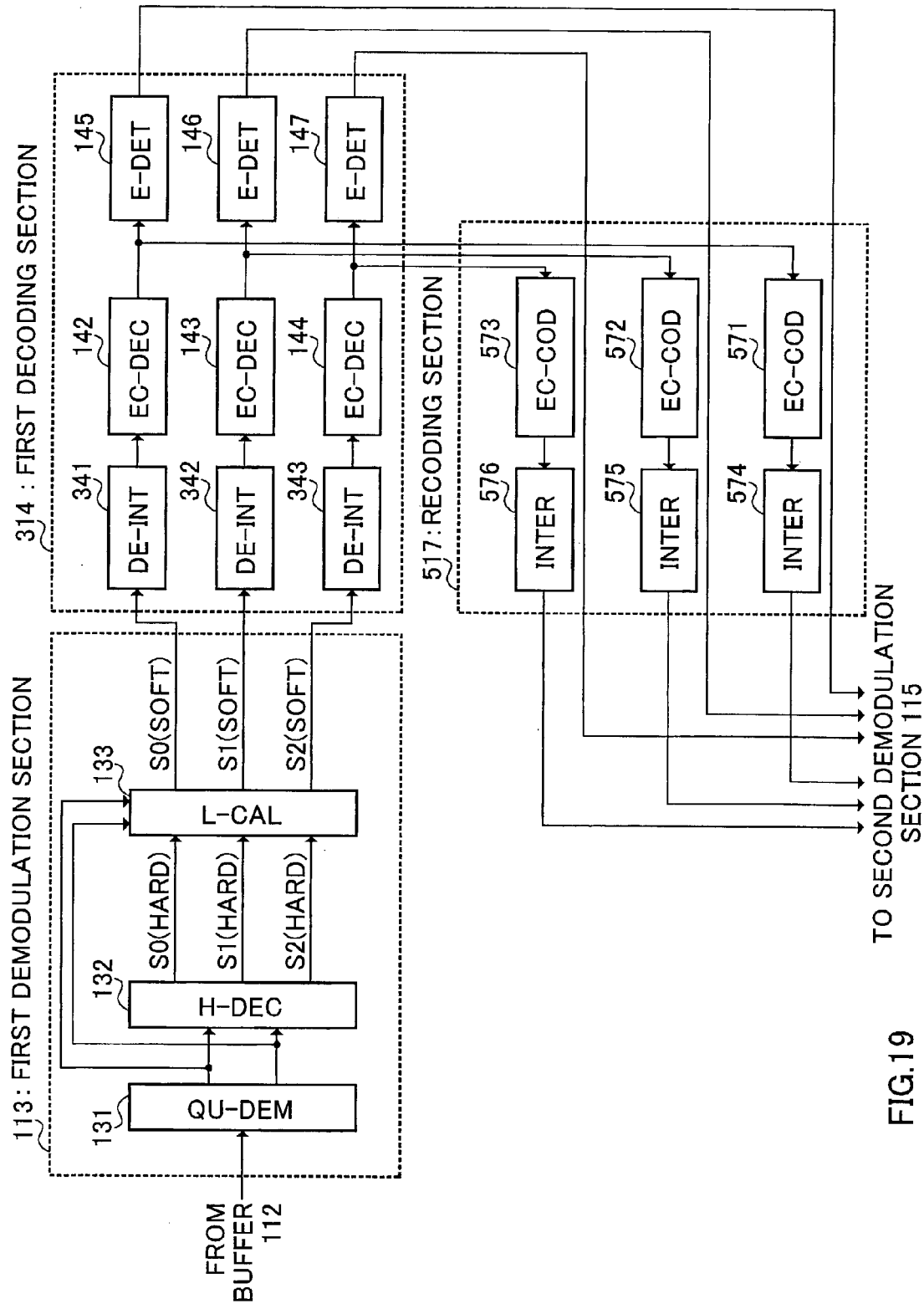
FIG. 19 is a block diagram showing the internal configuration of the first demodulation section, first decoding section, and recoding section of the receiving apparatus shown in FIG. 18.
Figure 20:
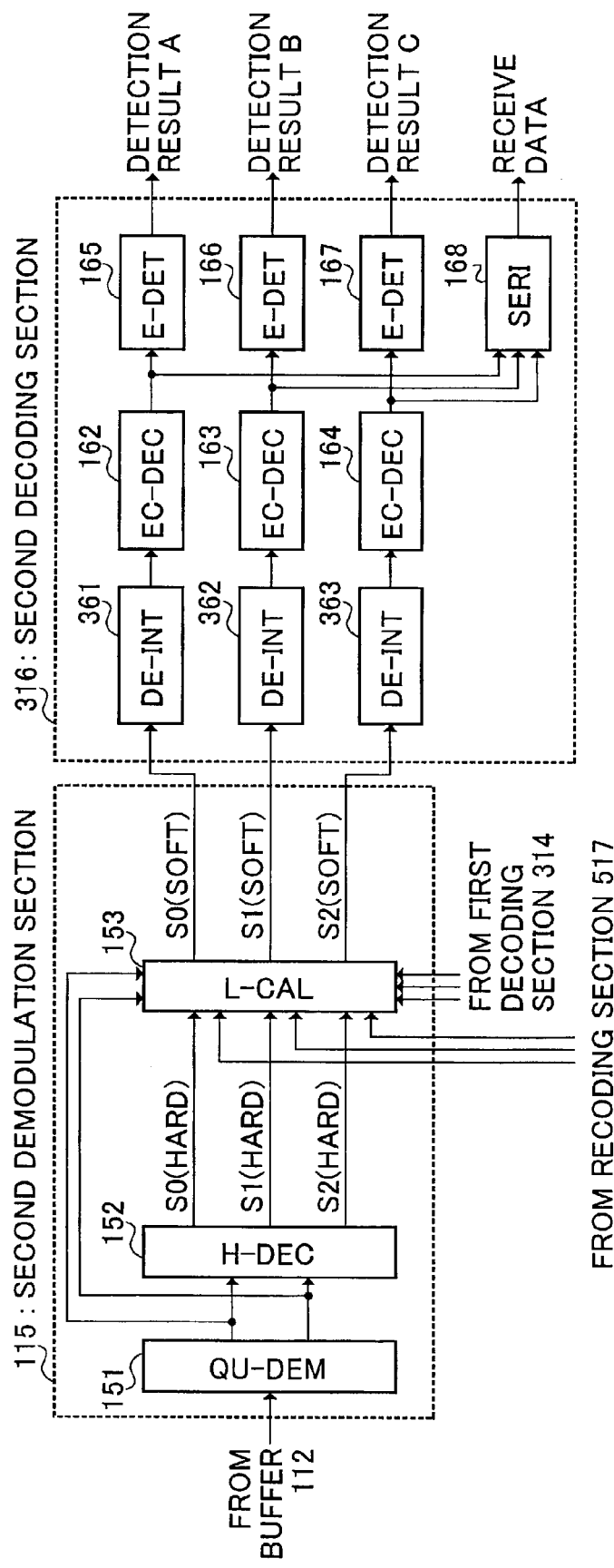
FIG. 20 is a block diagram showing the internal configuration of the second demodulation section and second decoding section of the receiving apparatus shown in FIG. 18.

FIG. 19 is a block diagram showing the internal configuration of the first demodulation section 113, first decoding section 314, and recoding section 517 of the receiving apparatus 510 shown in FIG. 18. FIG. 20 is a block diagram showing the internal configuration of the second demodulation section 115 and second decoding section 316 of the receiving apparatus 510 shown in FIG. 18. Parts in FIG. 19 and FIG. 20 identical to those in FIG. 12 or FIG. 13 are assigned the same codes as in FIG. 12 or FIG. 13 and their detailed explanations are omitted.

In the recoding section 517 of the receiving apparatus 510 shown in FIG. 19, error correction coding circuits 571 through 573 perform error correction coding again of demodulation results output from corresponding error correction decoding circuits 142 through 144, and output coded bit strings to corresponding interleaving circuits 574 through 576. Interleaving circuits 574 through 576 permute coded bit strings output from corresponding error correction coding circuits 571 through 573 in accordance with a predetermined rule. The permuted coded bit strings are output to a likelihood calculation circuit 153 provided in the second demodulation section 115. The predetermined rule used when permuting the data order here is the same as the rule used by interleaving circuits 321 through 323 provided in the transmitting apparatus.

In the second demodulation section 115 of the receiving apparatus 510 shown in FIG. 20, a likelihood calculation circuit 153 uses coded bit strings re-interleaved by interleaving circuits 574 through 576 to modify candidate likelihoods calculated based on demodulation results from a quadrature demodulation circuit 151 and hard decision results from a hard decision circuit 152. For example, likelihood calculation circuit 153 may compare demodulation results from quadrature demodulation circuit 151 with coded bit strings output from interleaving circuits 574 through 576 on a sequence-by-sequence basis (that is, for each independent error detection unit), and make the candidate likelihood of an error detection unit for which the demodulation result and coded bit string are determined to be identical higher than the likelihoods of other error detection units.

Thus, according to this embodiment, the second demodulation section 115 modifies candidate likelihoods using coded bit strings re-interleaved by interleaving circuits 574 through 576, and outputs modified high-precision candidate likelihoods to the second decoding section 316 as likelihoods. By this means, the second decoding section 316 performs error correction decoding using high-precision likelihoods output from the second demodulation section 115, enabling error correction capability to be improved.

Figure 21:
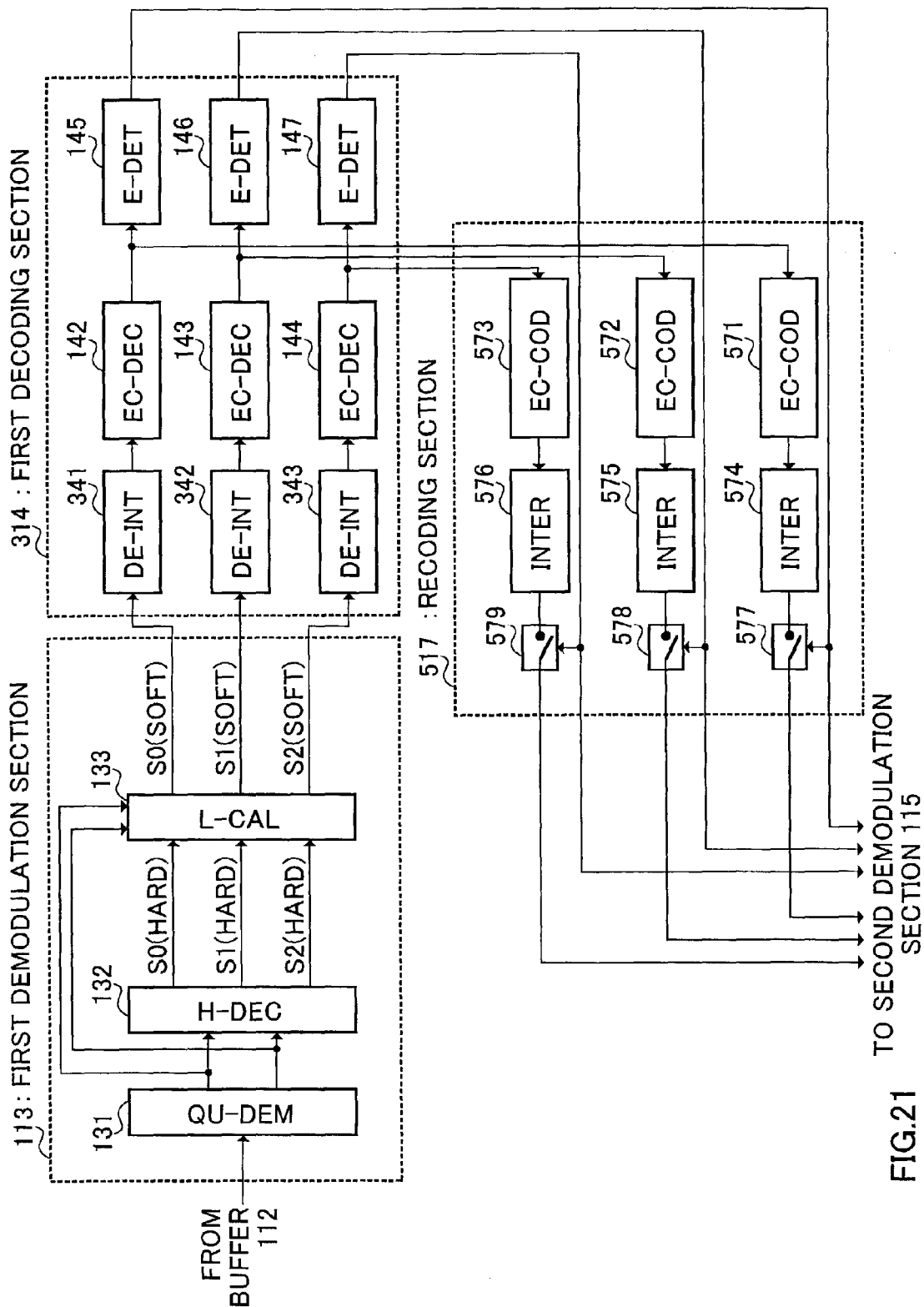
FIG. 21 is a block diagram showing the internal configuration of the first demodulation section, first decoding section, and recoding section of the receiving apparatus shown in FIG. 18.

In this embodiment, it is also possible to add switches 577 through 579 to the recoding section 517, as shown in FIG. 21, and use interleaving results for likelihood modification only for error detection units for which an error is not detected by error detection circuits 145 through 147.

By this means, likelihoods are modified reflecting only interleaving results corresponding to error detection units for which an error is not detected, enabling more precise likelihoods to be calculated.

(Embodiment 6)

Embodiment 6 of the present invention is a variant of Embodiment 2. When there are six independent error detection units in a radio communication system according to Embodiment 2, for example, it is not possible to arrange bits belonging to all the error detection units in the same symbol, and therefore, even if an error is not detected for a specific error detection unit, there is a possibility of not being able to perform likelihood recalculation that reflects error detection results for bits arranged in a different symbol from a symbol in which bits belonging to that error detection unit are arranged.

Thus, in this embodiment, a case is described in which likelihoods can be obtained more accurately by multiplying a recalculated likelihood by a compensation coefficient according to whether or not an error is detected.

Figure 22:
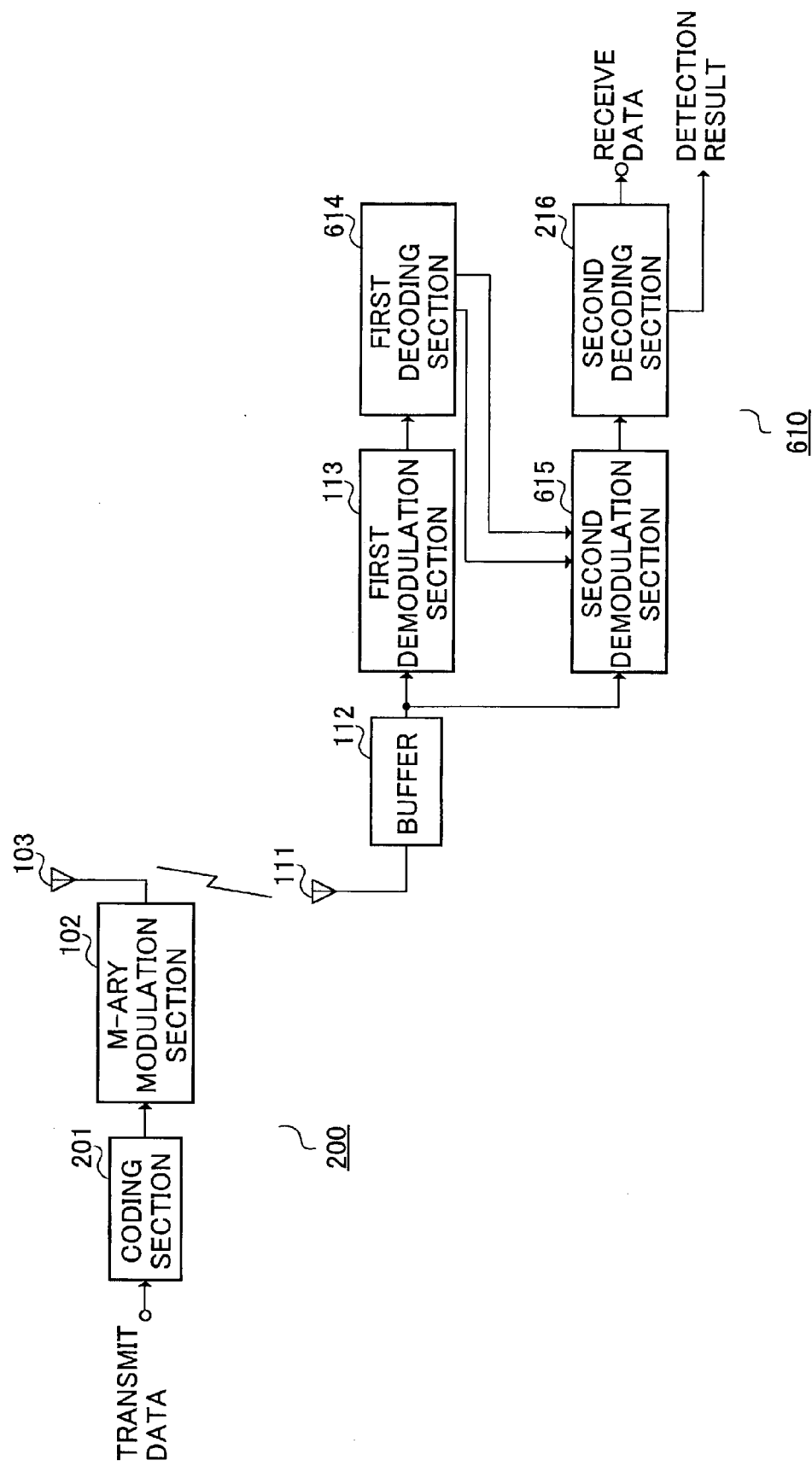
FIG. 22 is a block diagram showing the configuration of a radio communication system according to Embodiment 6 of the present invention.

FIG. 22 is a block diagram showing the configuration of a radio communication system according to Embodiment 6 of the present invention. In the radio communication system shown in FIG. 22, radio communications are performed between a transmitting apparatus 200 and receiving apparatus 610. In the receiving apparatus 610, the first decoding section 614 and second demodulation section 615 differ from the first decoding section 214 and second demodulation section 115 shown in FIG. 6.

Figure 23:
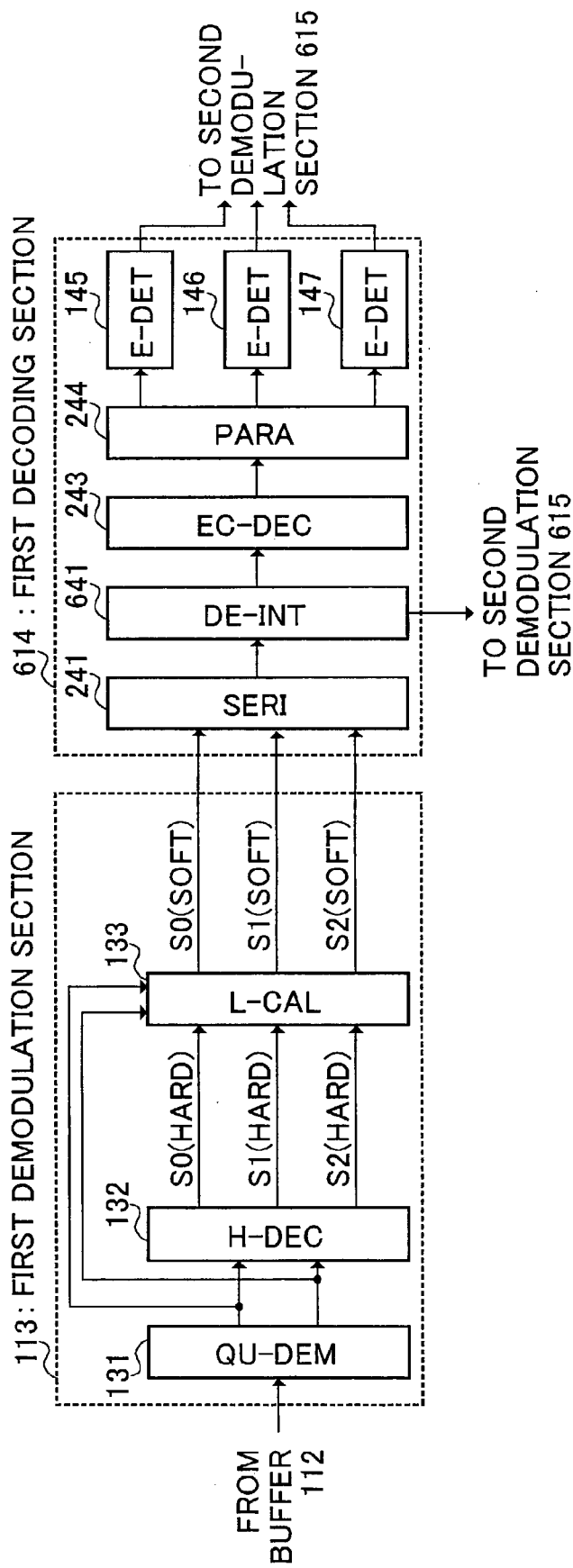
FIG. 23 is a block diagram showing the internal configuration of the first demodulation section and first decoding section of the receiving apparatus shown in FIG. 22.
Figure 24:
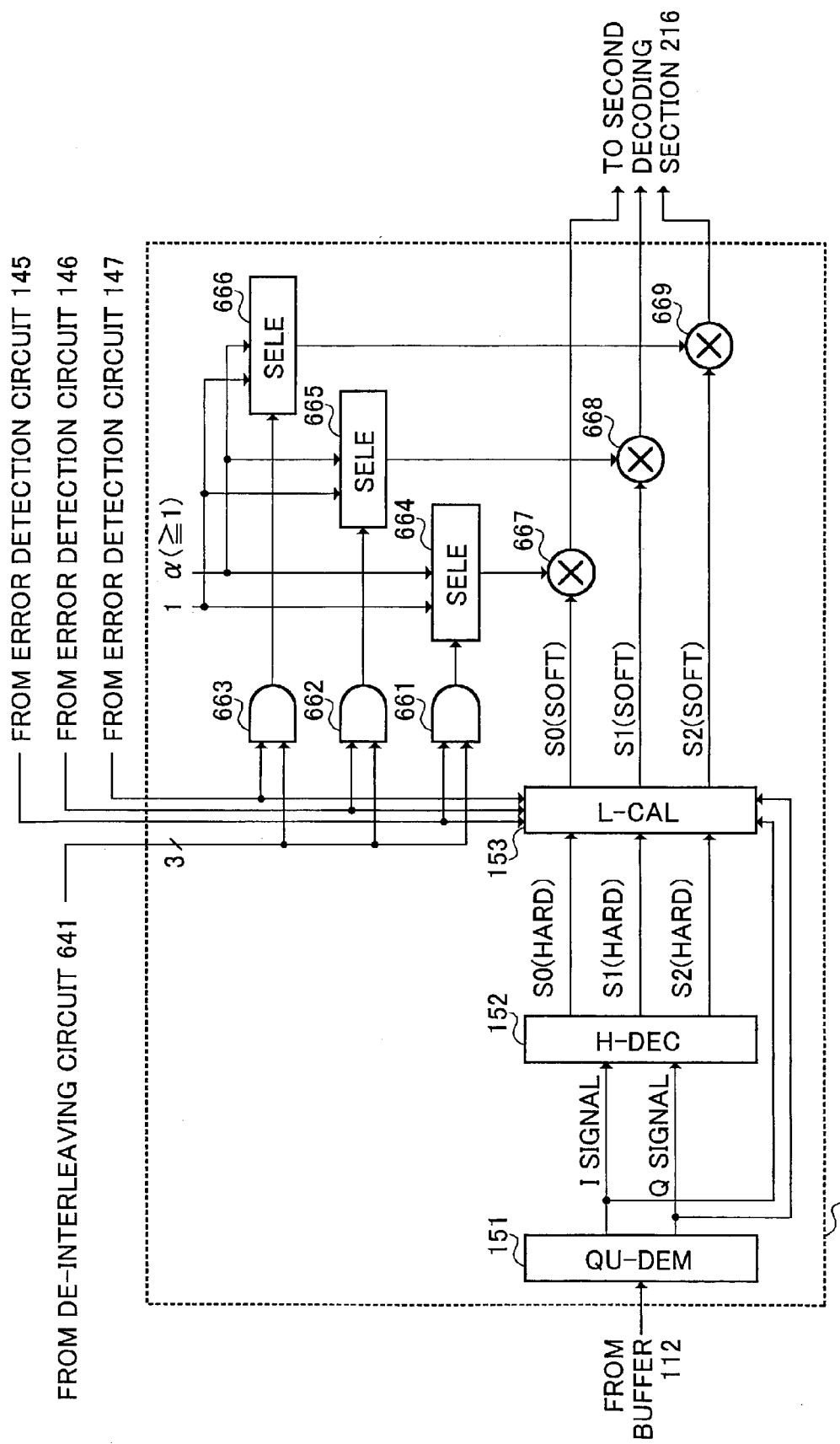
FIG. 24 is a block diagram showing the internal configuration of the second demodulation section of the receiving apparatus shown in FIG. 22.

FIG. 23 is a block diagram showing the internal configuration of the first demodulation section 113 and first decoding section 614 shown in FIG. 22. FIG. 24 is a block diagram showing the internal configuration of the second demodulation section 615 of the receiving apparatus 610 shown in FIG. 22. Parts in FIG. 23 and FIG. 24 identical to those in FIG. 7 or FIG. 8 are assigned the same codes as in FIG. 7 or FIG. 8 and their detailed explanations are omitted.

A de-interleaving circuit 641 in the first decoding section 614 permutes an output signal from a serialization circuit 241 in accordance with a predetermined rule corresponding to the permutation rule in an interleaving circuit 223 provided in the transmitting apparatus 200, and outputs a de-interleaving pattern indicating the data order in the output bit string of that circuit sequentially to AND circuits 661 through 663 in the second demodulation section 615. For example, if three independent error detection units have been set, the de-interleaving circuit 641 outputs a bit string in the order S0, S1, S2, S0, S1, S2, and therefore "1" is output to AND circuit 661 at the timing at which S0 is output, "1" is output to AND circuit 662 at the timing at which S1 is output, and "1" is output to AND circuit 663 at the timing at which S2 is output. Also, error detection circuits 145 through 147 output signals indicating error detection results to a likelihood calculation circuit 153 and AND circuits 661 through 663. It is here assumed that error detection circuits 145 through 147 output "1" as an error detection result when an error is not detected, and "0" when an error is detected.

AND circuits 661 through 663 calculate the AND of error detection results output from error detection circuits 145 through 147 and the de-interleaving pattern output from the de-interleaving circuit 641, and output the respective calculation results to corresponding selection circuits (SELE) 664 through 666. For example, if an error is not detected in S0 by error detection circuit 145, at the timing at which the de-interleaving circuit 641 outputs S0, "1" is input to AND circuit 661 as the error detection result, and "1" is input as the interleaving pattern. In this case, AND circuit 661 outputs "1" to selection circuit 664. If, on the other hand, an error is detected in S0 by error detection circuit 145, at the timing at which the de-interleaving circuit 641 outputs S0, "0" is input to AND circuit 661 as the error detection result, and "1" is input as the interleaving pattern. In this case, AND circuit 661 outputs "0" to selection circuit 664. The same applies to the output of the other selection circuits, 665 and 666. That is to say, when an error is not detected in a bit of the corresponding error detection unit in error detection circuits 145 through 147, AND circuits 661 through 663 output "1" at the processing timing for a bit of that error detection unit.

"1" and "α" are input to selection circuits 664 through 666. "α" is any real number from 1 up. A selection circuit 664 through 666 outputs "α" to a corresponding multiplier 667 through 669 when "1" is output from corresponding AND circuit 661 through 663, and outputs "1" to corresponding multiplier 667 through 669 when "0" is output from corresponding AND circuit 661 through 663.

Multipliers 667 through 669 multiply the output value (that is, "α" or "1") of the corresponding selection circuit 664 through 666 by the likelihood output from likelihood calculation circuit 153. The multiplication results are output to a serialization circuit 261 provided in a second decoding section 216.

Thus, in a receiving apparatus according to this embodiment, when an error is not detected in an error detection circuit 145 through 147, likelihood modification is performed by multiplying the likelihood corresponding to that bit for which an error was not detected by "α" (≧1). By this means, likelihood modification is performed so that the likelihood of a bit for which an error is not detected is made larger than the likelihood of a bit for which an error is detected, thus enabling high-precision likelihoods to be obtained.

(Embodiment 7)

Embodiment 7 of the present invention is a variant of Embodiment 6, differing from Embodiment 6 in that likelihood modification is performed using a bit string in which decoding results are recoded and re-interleaved.

Figure 25:
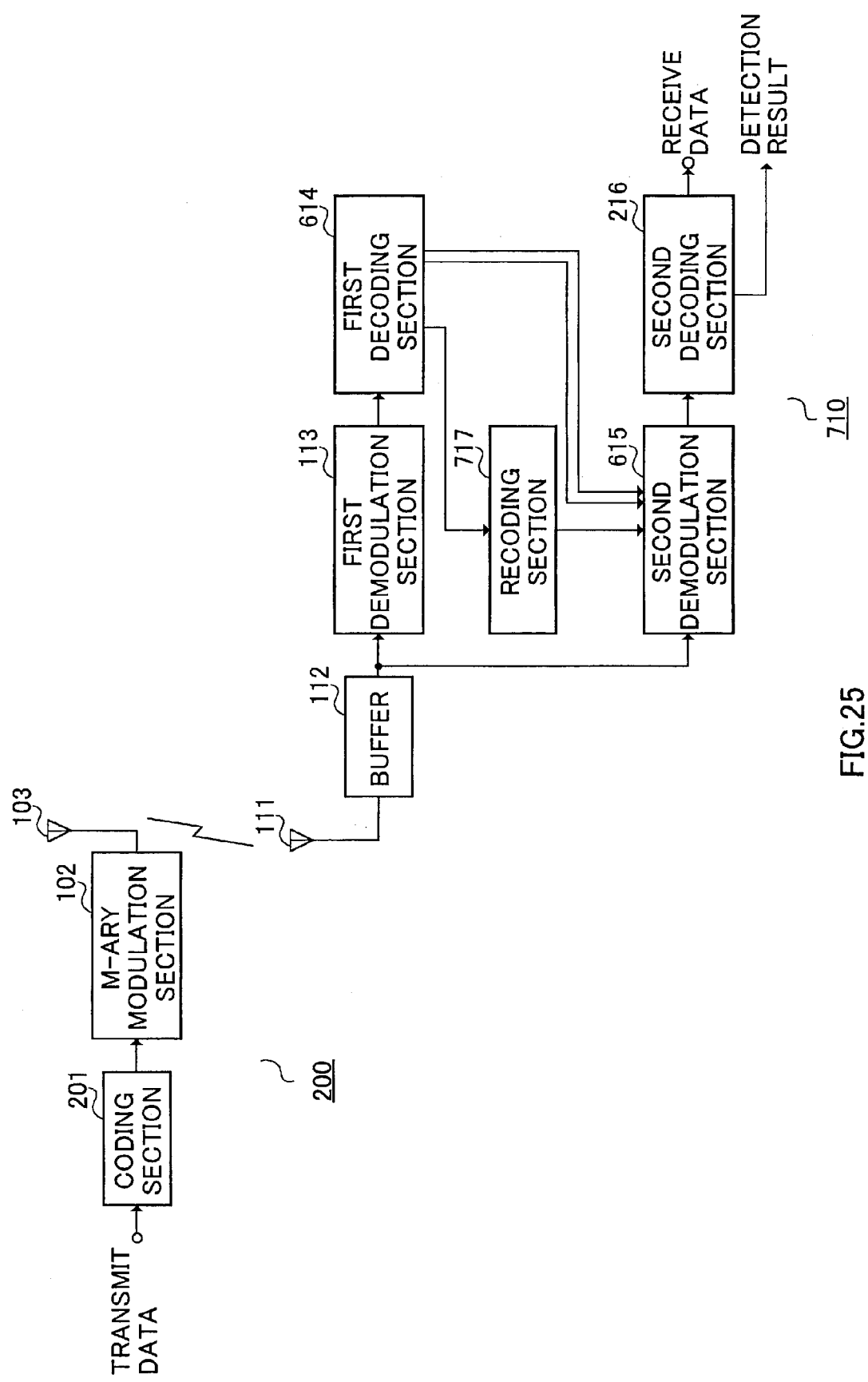
FIG. 25 is a block diagram showing the configuration of a radio communication system according to Embodiment 7 of the present invention.

FIG. 25 is a block diagram showing the configuration of a radio communication system according to Embodiment 7 of the present invention. In the radio communication system shown in FIG. 25, radio communications are performed between a transmitting apparatus 200 and receiving apparatus 710. The receiving apparatus 710 has a configuration in which a recoding section 717 has been added between the first decoding section 614 and second demodulation section 615 in the receiving apparatus 610 shown in FIG. 22.

Figure 26:
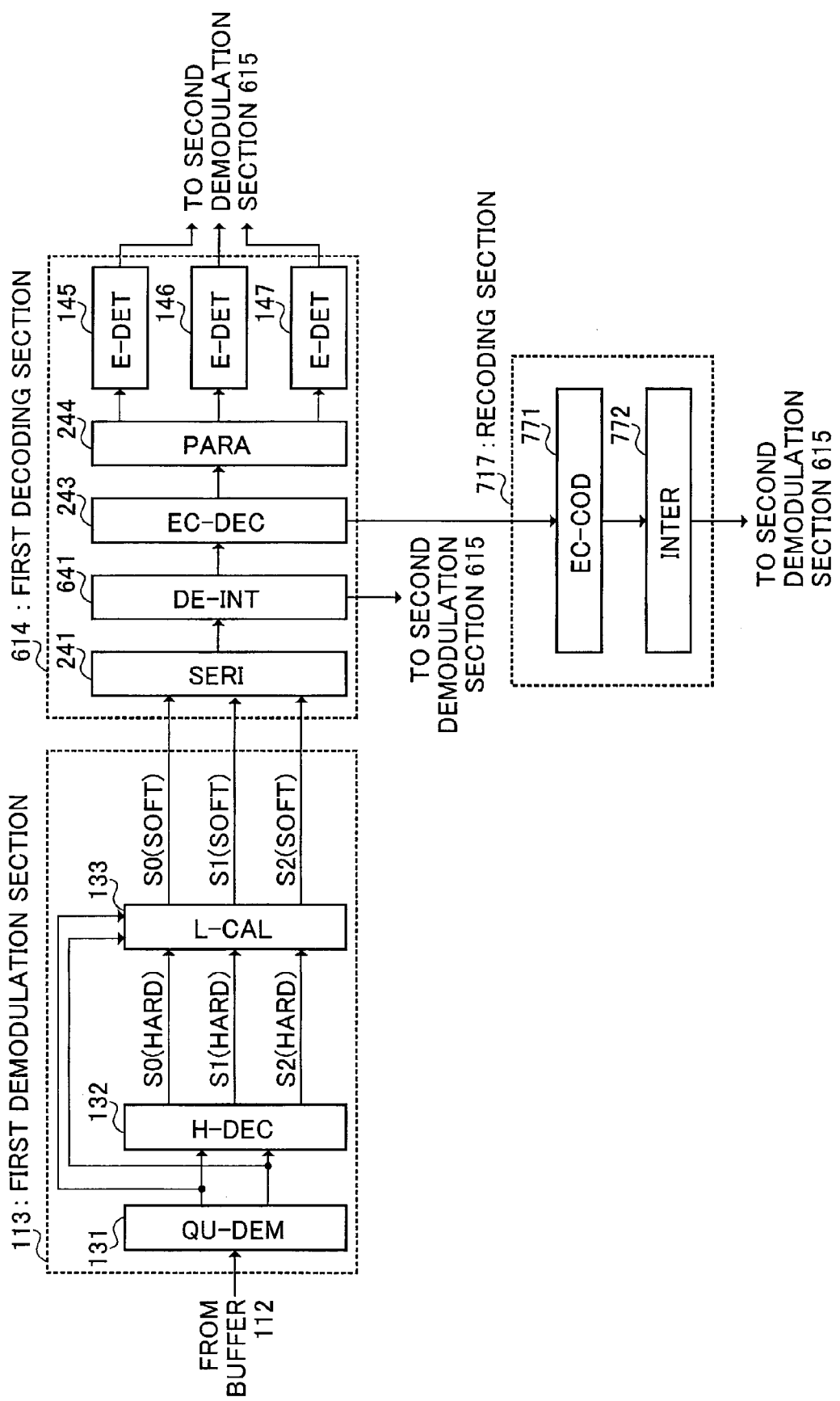
FIG. 26 is a block diagram showing the internal configuration of the first demodulation section, first decoding section, and recoding section of the receiving apparatus shown in FIG. 25.
Figure 27:
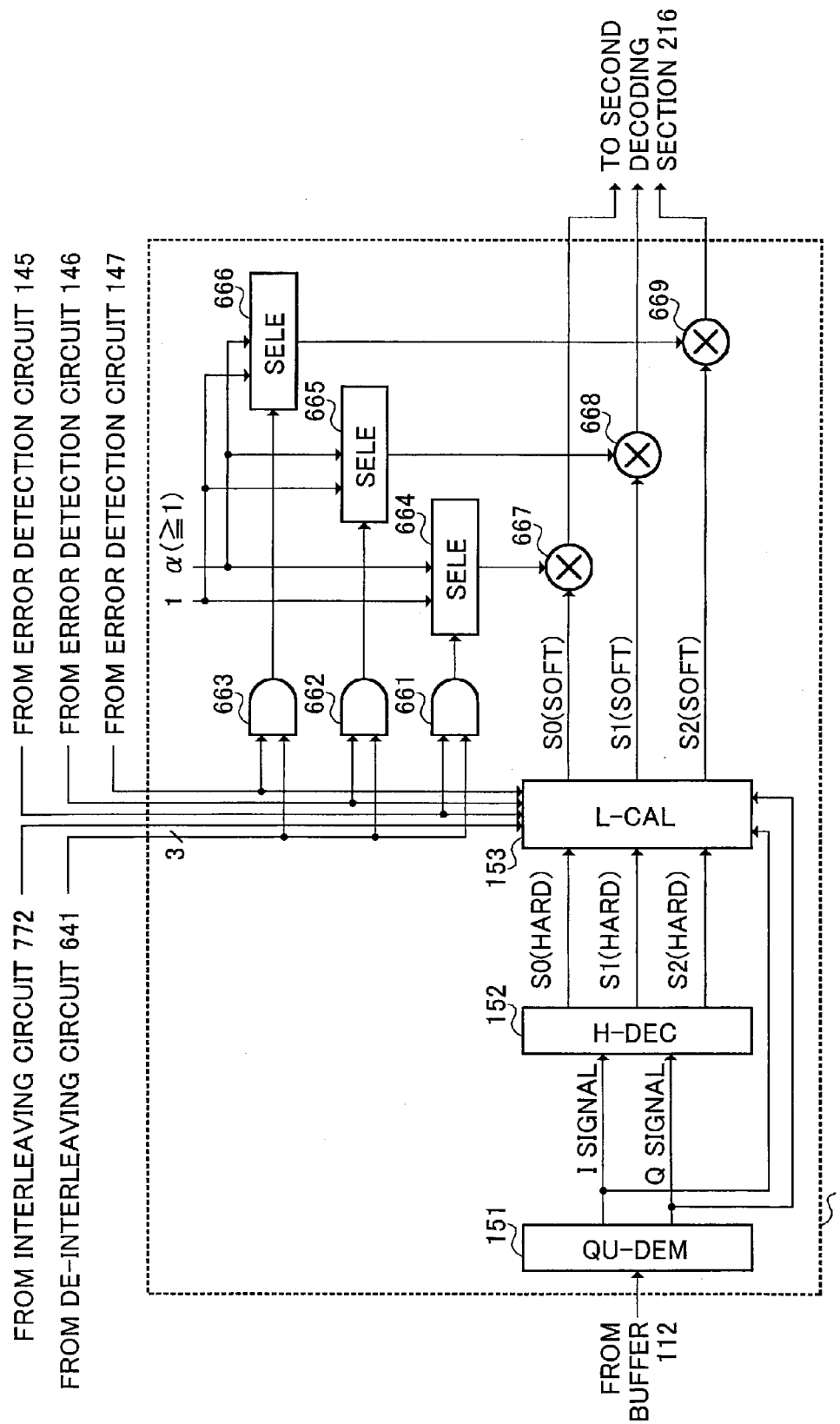
FIG. 27 is a block diagram showing the internal configuration of the second demodulation section of the receiving apparatus shown in FIG. 25.

FIG. 26 is a block diagram showing the internal configuration of the first demodulation section 113, first decoding section 614, and recoding section 717 of the receiving apparatus 710 shown in FIG. 25. FIG. 27 is a block diagram showing the internal configuration of the second demodulation section 615 of the receiving apparatus 710 shown in FIG. 25. Parts in FIG. 26 and FIG. 27 identical to those in FIG. 23 or FIG. 24 are assigned the same codes as in FIG. 23 or FIG. 24 and their detailed explanations are omitted.

An error correction coding circuit 771 performs error correction coding again of the decoding result output from an error correction decoding circuit 243, and outputs the coded bit string to an interleaving circuit 772. The interleaving circuit 772 permutes the coded bit string output from the error correction coding circuit 771 in accordance with a predetermined rule. The permuted coded bit string is output to a likelihood calculation circuit 153 provided in the second demodulation section 615. The predetermined rule used when permuting the data order in the interleaving circuit 772 is the same as the rule used by an interleaving circuit 223 provided in the transmitting apparatus.

The likelihood calculation circuit 153 uses the coded bit string re-interleaved by the interleaving circuit 772 to modify likelihoods calculated based on demodulation results from a quadrature demodulation circuit 151 and hard decision results from a hard decision circuit 152 (candidate likelihoods). For example, the likelihood calculation circuit 153 may compare demodulation results from the quadrature demodulation circuit 151 with the coded bit string output from the interleaving circuit 772 on a sequence-by-sequence basis (that is, for each independent error detection unit), and make the candidate likelihood of an error detection unit for which the demodulation result and coded bit string are identical higher than the likelihoods of other error detection units.

Thus, according to this embodiment, candidate likelihoods are modified using a re-interleaved coded bit string. By this means, error correction decoding is performed using high-precision likelihoods, enabling error correction capability to be improved.

(Embodiment 8)

Embodiment 8 of the present invention describes a case in which, when, in 8PSK, an error is not detected in the third most significant bit of the first error correction decoding result, a more accurate likelihood is calculated using that error detection result-that is to say, the likelihood (candidate likelihood) of a high-order bit is modified in accordance with the decision value of a low-order bit.

The principle of likelihood modification in this embodiment will now be explained, referring once again to FIG. 5. Of the signal points shown in FIG. 5, two points present in the same quadrant differ only in the third most significant bit. For example, to consider the two signal points "100" and "101" present in the first quadrant, the most significant 2 bits of both are "10", and they differ only in the third most significant bit being "1" or "0". When the "100" point of these two signal points is determined for a received symbol, at this signal point the most significant bit, for which the Q-axis is the decision axis, is nearer a decision axis than the second most significant bit, for which the I-axis is the decision axis, and is therefore more likely to be erroneous. On the other hand, when a received symbol is determined to be "101", the most significant bit is less likely to be erroneous than the second most significant bit. Thus, in 8PSK, there is a correlational relationship between the error tolerance of the most significant bit and the error tolerance of the second most significant bit such that if one is high the other is low, and the error tolerances of these most significant 2 bits are switched round in accordance with the value of the third most significant bit.

Thus, in this embodiment, when an error is not detected for the third most significant bit, likelihood modification is performed by multiplying the likelihoods of the most significant 2 bits by a compensation coefficient according to the relevant determination result. Specifically, when the third most significant bit is "0", the second most significant bit is multiplied by a larger compensation coefficient, and when the third most significant bit is "1", the second most significant bit is multiplied by a larger compensation coefficient.

Figure 28:
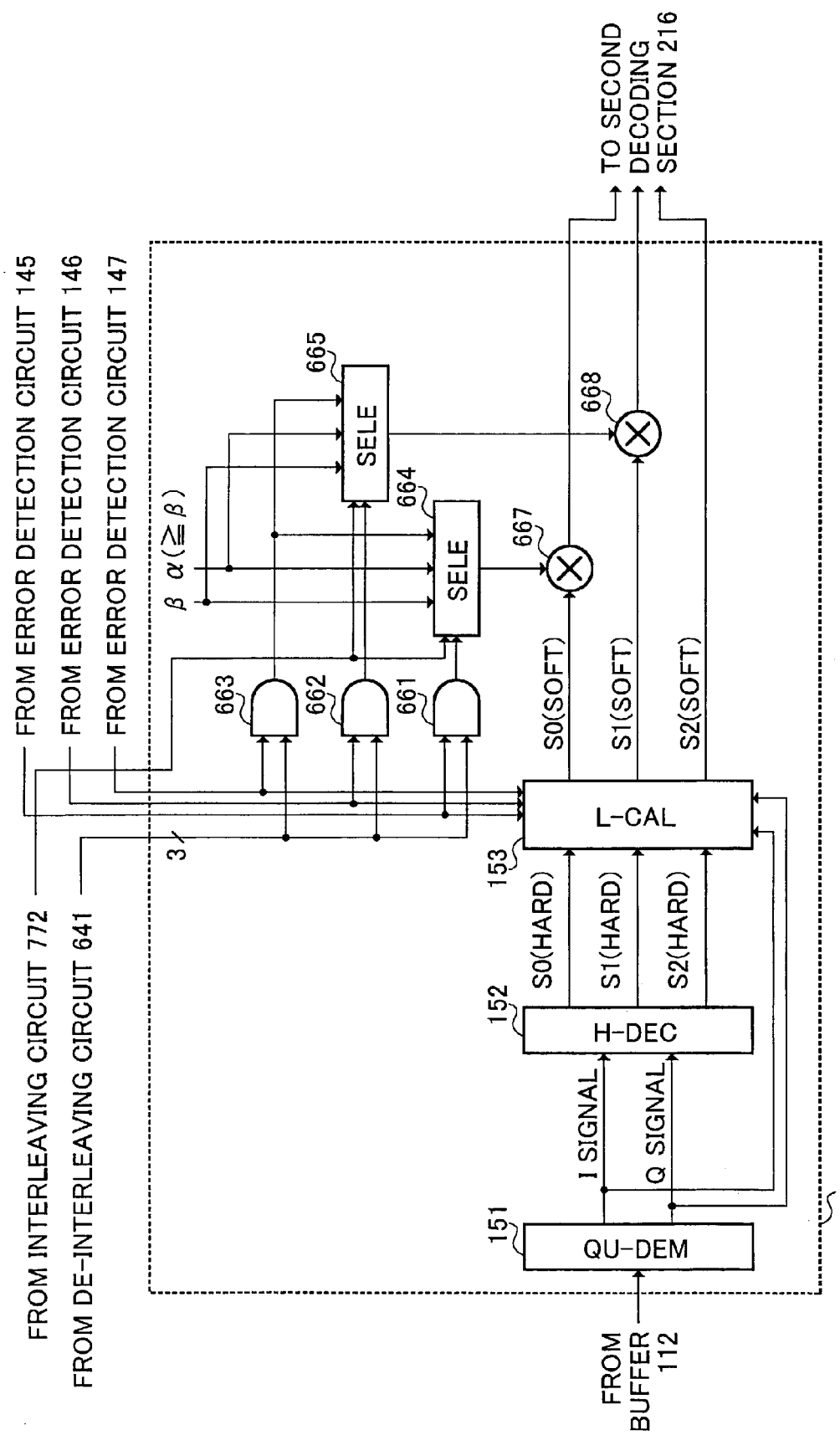
FIG. 28 is a block diagram showing the internal configuration of the second demodulation section of a receiving apparatus of a radio communication system according to Embodiment 8 of the present invention.

FIG. 28 is a block diagram showing the internal configuration of the second demodulation section 615 of a receiving apparatus of a radio communication system according to Embodiment 8 of the present invention. Parts in FIG. 28 identical to those in FIG. 27 are assigned the same codes as in FIG. 27 and their detailed explanations are omitted.

Except for the internal configuration of the second demodulation section 615, the configuration of a radio communication system according to this embodiment is identical to that of Embodiment 7 shown in FIG. 25.

The NOT of an error detection circuit 145 and a de-interleaving pattern are input to an AND circuit 661. The NOT of an error detection circuit 146 and a de-interleaving pattern are input to an AND circuit 662. The NOT of an error detection circuit 147 and a de-interleaving pattern are input to an AND circuit 663. "α" and "β" are input to selection circuits 664 and 665. The relationship between "α" and "β" is α≧β.

When "1" is output from both AND circuit 661 and AND circuit 663, and S2 output from an interleaving circuit 772 is "1", selection circuit 664 outputs "β" to a multiplier 667. When "1" is output from both AND circuit 661 and AND circuit 663, and S2 output from the interleaving circuit 772 is "0", selection circuit 664 outputs "α" to multiplier 667.

When "1" is output from both AND circuit 662 and AND circuit 663, and S2 output from the interleaving circuit 772 is "1", selection circuit 665 outputs "α" to a multiplier 668. When "1" is output from both AND circuit 662 and AND circuit 663, and S2 output from the interleaving circuit 772 is "0", selection circuit 665 outputs "β" to multiplier 668.

Multiplier 667 and multiplier 668 perform likelihood modification by multiplying S0 and S1 output from the likelihood calculation circuit 153 by compensation coefficients output from corresponding selection circuits 664 and 665.

Thus, according to this embodiment, high-precision likelihoods can be obtained by modifying the likelihoods of the most significant 2 bits with reference to the third most significant bit.

(Embodiment 9)

Embodiment 9 of the present invention is a variant of Embodiment 8, in which the value of the coefficient by which the most significant bit and second most significant bit are multiplied is modified.

The principle of compensation coefficient calculation in this embodiment will now be explained, referring once again to FIG. 5. Referring to FIG. 5, the ratio of the distance to the I-axis to the distance to the Q-axis from an arbitrary signal point is Sin (π/8) to Cos (π/8), or Cos (π/8) to Sin (π/8). Therefore, when an error is not detected in the third most significant bit in the first error correction decoding result, more accurate likelihoods can be obtained by performing multiplication by the coefficient of the most significant 2 bits with Sin (π/8) or Cos (π/8) as a compensation coefficient according to whether that third most significant bit is "0" or "1". Specifically, when the third most significant bit is "0", the ratio of the distance to the I-axis to the distance to the Q-axis from a signal point is Cos (π/8) to Sin (π/8). In this case, therefore, the likelihood of the most significant bit is multiplied by Sin (π/8), and the second most significant bit is multiplied by Cos (π/8). On the other hand, when the third most significant bit is "1", the ratio of the distance to the I-axis to the distance to the Q-axis from a signal point is Sin (π/8) to Cos (π/8). In this case, therefore, the likelihood of the most significant bit is multiplied by Cos (π/8), and the second most significant bit is multiplied by Sin (π/8).

Figure 29:
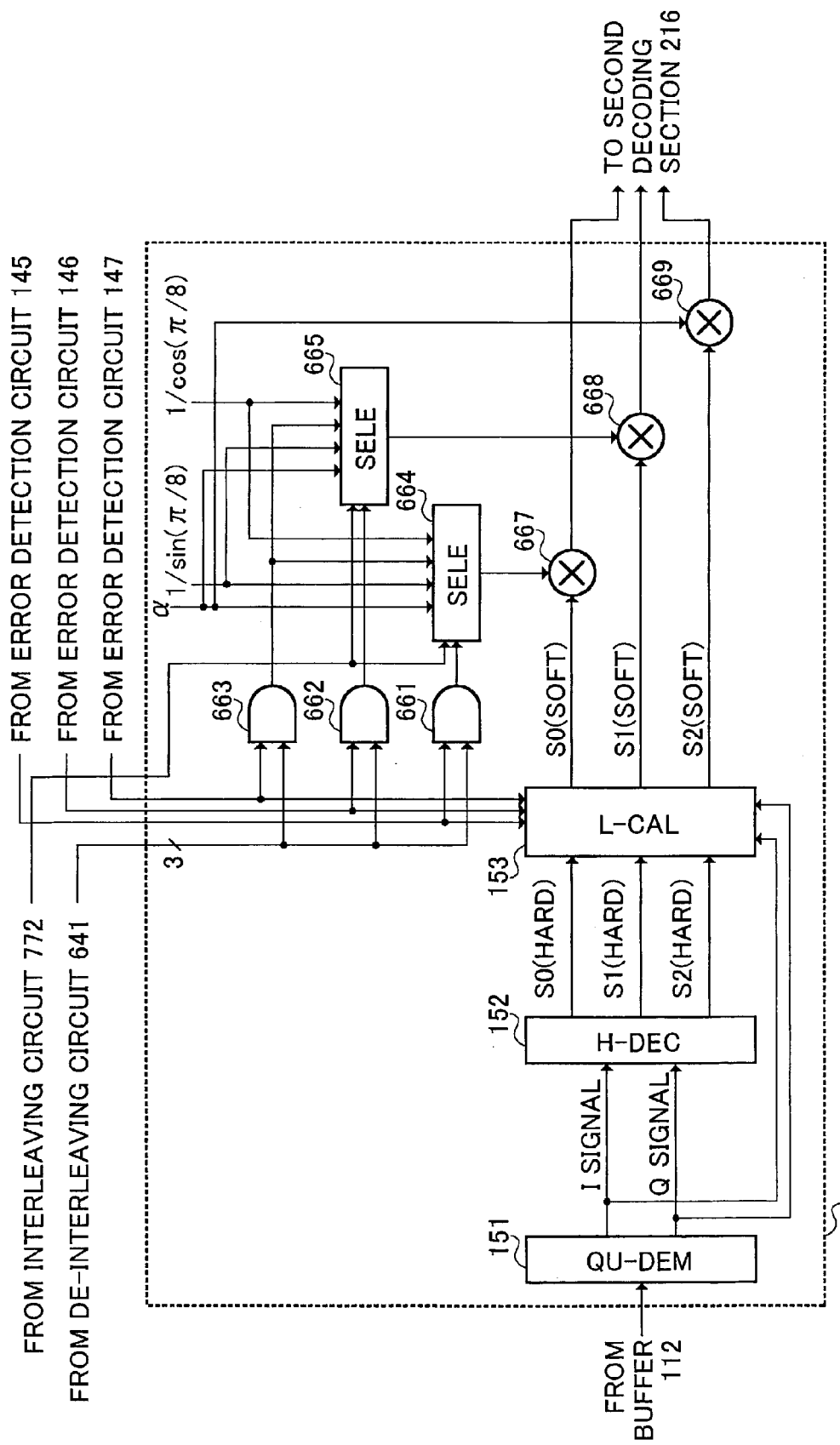
FIG. 29 is a block diagram showing the internal configuration of the second demodulation section of a receiving apparatus of a radio communication system according to Embodiment 9 of the present invention.

FIG. 29 is a block diagram showing the internal configuration of the second demodulation section 615 of a receiving apparatus of a radio communication system according to Embodiment 9 of the present invention. Parts in FIG. 29 identical to those in FIG. 28 are assigned the same codes as in FIG. 28 and their detailed explanations are omitted. Except for the internal configuration of the second demodulation section 615, the configuration of a radio communication system according to this embodiment is identical to that of Embodiment 7 shown in FIG. 25.

"Sin (π/8)", "Cos (π/8)", and "α" are input to selection circuits 664 and 665.

When "1" is output from both AND circuit 661 and AND circuit 663, and S2 output from an interleaving circuit 772 is "1", selection circuit 664 outputs "Cos (π/8)" to a multiplier 667. When "1" is output from both AND circuit 661 and AND circuit 663, and S2 output from the interleaving circuit 772 is "0", selection circuit 664 outputs "Sin (π/8)" to multiplier 667. When "1" is output from AND circuit 661 and "0" is output from AND circuit 663, α is selected.

When "1" is output from both AND circuit 661 and AND circuit 663, and S2 output from the interleaving circuit 772 is "1", selection circuit 665 outputs "Sin (π/8)" to a multiplier 668. When "1" is output from both AND circuit 662 and AND circuit 663, and S2 output from the interleaving circuit 772 is "0", selection circuit 665 outputs "Cos (π/8)" to multiplier 668. When "1" is output from AND circuit 662 and "0" is output from AND circuit 663, α is selected.

Multipliers 667 and 668 perform likelihood modification by multiplying S0 and S1 output from the likelihood calculation circuit 153 by compensation coefficients output from corresponding selection circuits 664 and 665. A multiplier 669 performs likelihood modification by multiplying S2 output from the likelihood calculation circuit 153 by compensation coefficient α.

Thus, according to this embodiment, high-precision likelihoods can be obtained by modifying the likelihoods of the most significant 2 bits with reference to the third most significant bit.

(Embodiment 10)

Embodiment 10 of the present invention is a variant of Embodiment 5.

The principle of compensation coefficient calculation in this embodiment will now be explained, referring once again to FIG. 5. Referring to FIG. 5, there is an 8PSK characteristic whereby, when the most significant bit is determined to be erroneous, the second most significant bit and third most significant bit are unlikely to be erroneous. That is to say, when the most significant bit is determined to be erroneous, the corresponding received signal point is located near the Q-axis, as with point d, for example. When a signal that should actually be determined to be "010" is received at point d, the most significant bit is determined to be erroneous. However, when a received signal point is near the Q-axis, that received signal point is very far from the I-axis, and therefore an error is unlikely to occur in the second most significant bit. Also, when a received signal point is near the Q-axis, that received signal point is also very far from the X-axis and Y-axis, and therefore an error is also unlikely to occur in the third most significant bit.

Thus, in 8PSK, there is an error tolerance correlational relationship between bits in the same symbol such that, when the most significant bit is susceptible to error (that is, when the error tolerance of the most significant bit is low), an error is unlikely to occur in the second most significant bit or third most significant bit (that is, the error tolerance of these bits is high).

Figure 30:
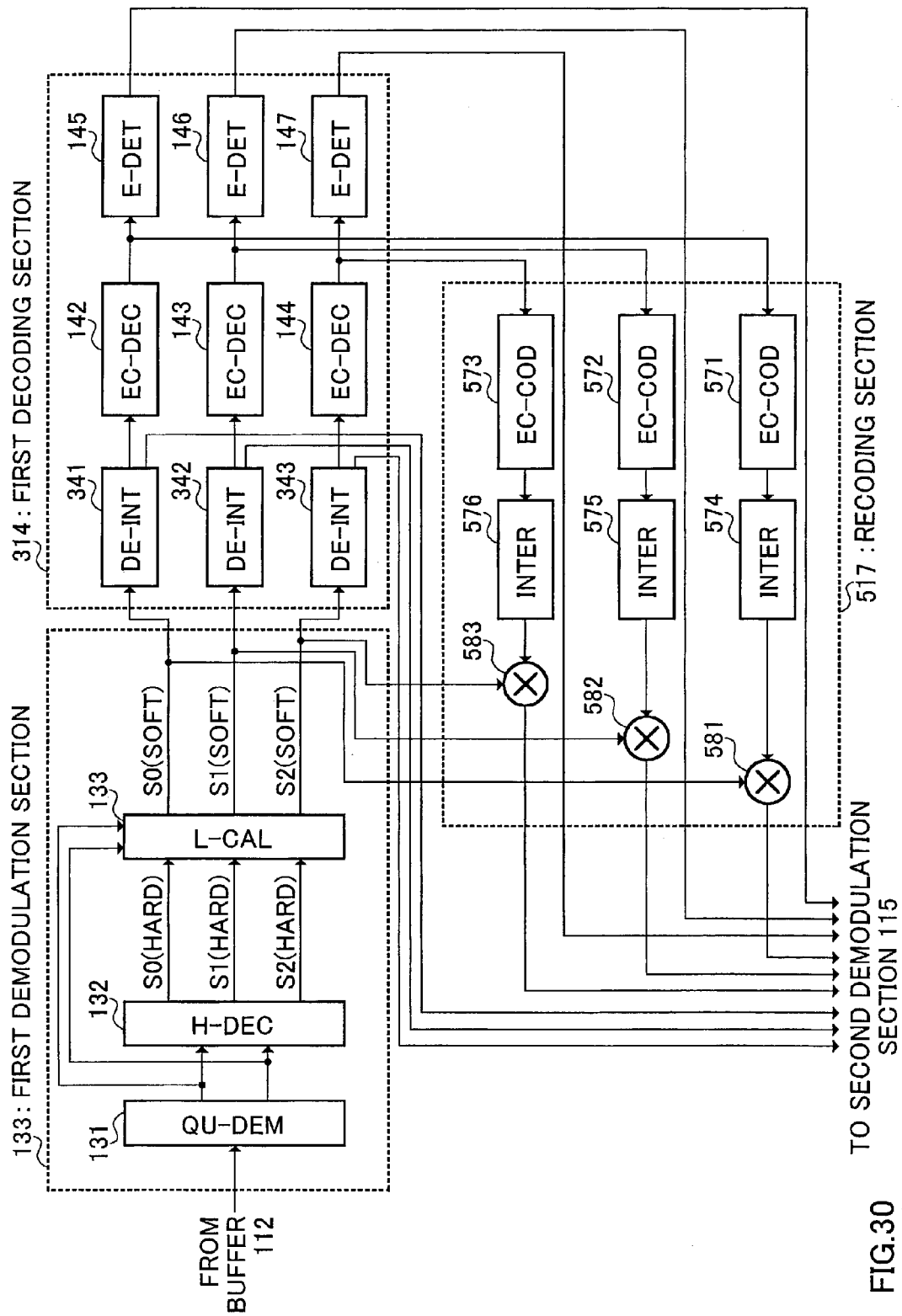
FIG. 30 is a block diagram showing the internal configuration of the first demodulation section, first decoding section, and recoding section of a receiving apparatus of a radio communication system according to Embodiment 10 of the present invention.

Except for the internal configuration of the recoding section 517 and second demodulation section 115, the configuration of a radio communication-system according to this embodiment is identical to that of Embodiment 5 shown in FIG. 18. FIG. 30 is a block diagram showing the internal configuration of the first demodulation section 113, first decoding section 314, and recoding section 517 of a receiving apparatus of a radio communication system according to Embodiment 10 of the present invention. Parts in FIG. 30 identical to those in FIG. 19 are assigned the same codes as in FIG. 19 and their detailed explanations are omitted.

In this embodiment, when a bit belonging to an error detection unit determined to be error-free by the first decoding section 314 is different before and after error correction, the likelihoods of other bits contained in the same symbol as that bit are increased by multiplying those other bits by one or more compensation coefficients. The reason for this is that it is probable that, when a bit belonging to an error detection unit determined to be error-free by the first decoding section 314 is different before and after error correction, that bit has been erroneously determined by a first demodulation section 113, and that erroneously determined bit has undergone error correction.

Multipliers 581 through 583 multiply together pre-error-correction bits output from a likelihood calculation circuit 133 in a first demodulation section 113, and post-error-correction bits output from corresponding interleaving circuits 574 through 576. These multipliers are arranged so as to output "0" when the result of the operation is negative, and to output "1" when the result of the operation is positive. As bits subjected to error correction by error correction decoding circuits 142 through 144 have different values before and after error correction, multipliers 581 through 583 output "0" for these bits since the multiplication results are negative. On the other hand, bits not subjected to error correction by error correction decoding circuits 142 through 144 have identical values before and after error correction, and therefore multipliers 581 through 583 output "1" for these bits since the multiplication results are positive. That is to say, the output values of multipliers 581 through 583 indicate whether or not error correction has been performed by error correction decoding circuits 142 through 144.

Figure 31:
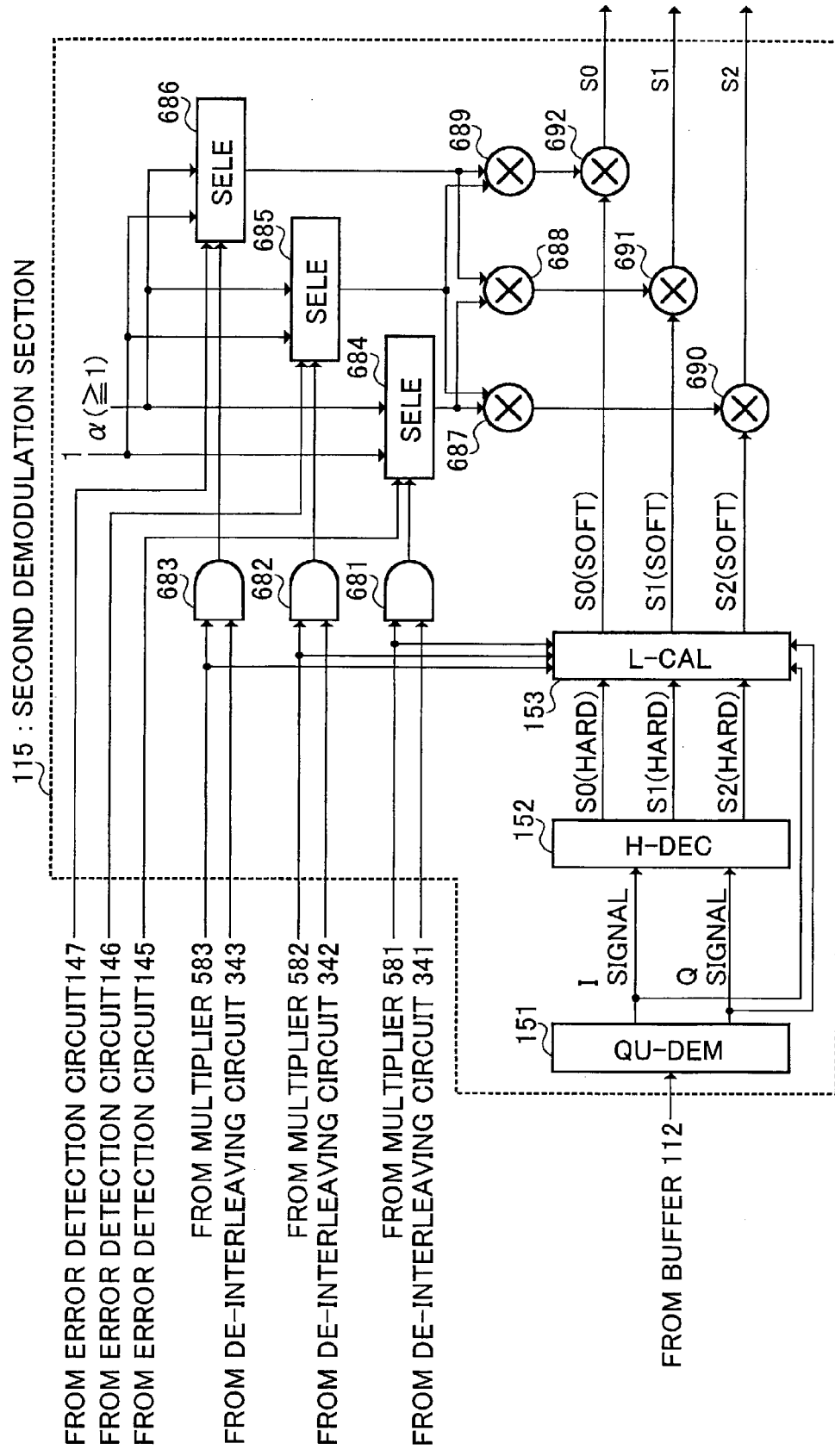
FIG. 31 is a block diagram showing the internal configuration of the second demodulation section of a receiving apparatus of a radio communication system according to Embodiment 10 of the present invention.

FIG. 31 is a block diagram showing the internal configuration of the second demodulation section 115 of a receiving apparatus of a radio communication system according to Embodiment 10 of the present invention. In this second demodulation section 115 shown in FIG. 31, AND circuits 681 through 683 calculate the AND of multiplication results output from multipliers 581 through 583 and the de-interleaving pattern output from corresponding de-interleaving circuits 341 through 343, and output the respective calculation results to corresponding selection circuits 684 through 686. For example, if error correction is not performed by error detection circuit 142, at the timing at which de-interleaving circuit 341 outputs S0, "1" is input to AND circuit 681 as the multiplier output, and "1" is input as the interleaving pattern. In this case, AND circuit 681 outputs "1" to selection circuit 684. If, on the other hand, error correction is performed by error detection circuit 142, at the timing at which de-interleaving circuit 341 outputs S0, "0" is input to AND circuit 681 as the multiplier output, and "1" is input as the interleaving pattern. In this case, AND circuit 681 outputs "0" to selection circuit 684. A similar pattern also applies to the output of AND circuits 682 and 683. That is to say, when error correction is not performed by an error detection circuit 145 through 147, the corresponding AND circuit 681 through 683 outputs "1" at the processing timing for that bit on which error correction was not performed.

"α" and "1" are input to selection circuits 684 through 686, where α≧1. When "1" is output from AND circuit 681, and "0" is output from error detection circuit 145, selection circuit 684 outputs "α" to a multiplier 687 and multiplier 688. On the other hand, when "1" is output from AND circuit 681, and "1" is output from error detection circuit 145, selection circuit 684 outputs "1" to multiplier 687 and multiplier 688. That is to say, "α" is output from selection circuit 684 when error correction is performed for S0.

When "1" is output from AND circuit 682, and "0" is output from error detection circuit 146, selection circuit 685 outputs "α" to multiplier 687 and a multiplier 689. On the other hand, when "1" is output from AND circuit 682, and "1" is output from error detection circuit 146, selection circuit 685 outputs "1" to multiplier 687 and multiplier 689. That is to say, "α" is output from selection circuit 685 when error correction is performed for S1.

When "1" is output from AND circuit 683, and "0" is output from error detection circuit 147, selection circuit 686 outputs "α" to multiplier 688 and multiplier 689. On the other hand, when "1" is output from AND circuit 683, and "1" is output from error detection circuit 147, selection circuit 686 outputs "1" to multiplier 688 and multiplier 689. That is to say, "α" is output from selection circuit 686 when error correction is performed for S2.

Multiplier 687 multiplies together the output of selection circuit 684 and the output of selection circuit 685, and outputs the result of the multiplication to a multiplier 690. Multiplier 688 multiplies together the output of selection circuit 684 and the output of selection circuit 686, and outputs the result of the multiplication to a multiplier 691. Multiplier 689 multiplies together the output of selection circuit 685 and the output of selection circuit 686, and outputs the result of the multiplication to a multiplier 692.

Multiplier 690 performs likelihood modification by multiplying the output of multiplier 687 by S2 output from a likelihood calculation circuit 153. Multiplier 691 performs likelihood modification by multiplying the output of multiplier 687 by S1 output from the likelihood calculation circuit 153. Multiplier 692 performs likelihood modification by multiplying the output of multiplier 687 by S0 output from the likelihood calculation circuit 153.

For example, when error correction is performed for S0, and error correction is not performed for S1 or S2, selection circuit 684 outputs "α", and selection circuit 685 and selection circuit 686 output "1". Therefore, multiplier 687 multiplies S2 by "1", multiplier 688 multiplies S1 by "α", and multiplier 689 multiplies S0 by "α".

Thus, according to this embodiment, high-precision likelihoods can be obtained by modifying the likelihood of each bit with reference to whether or not error correction is performed for each bit.

Figure 32:
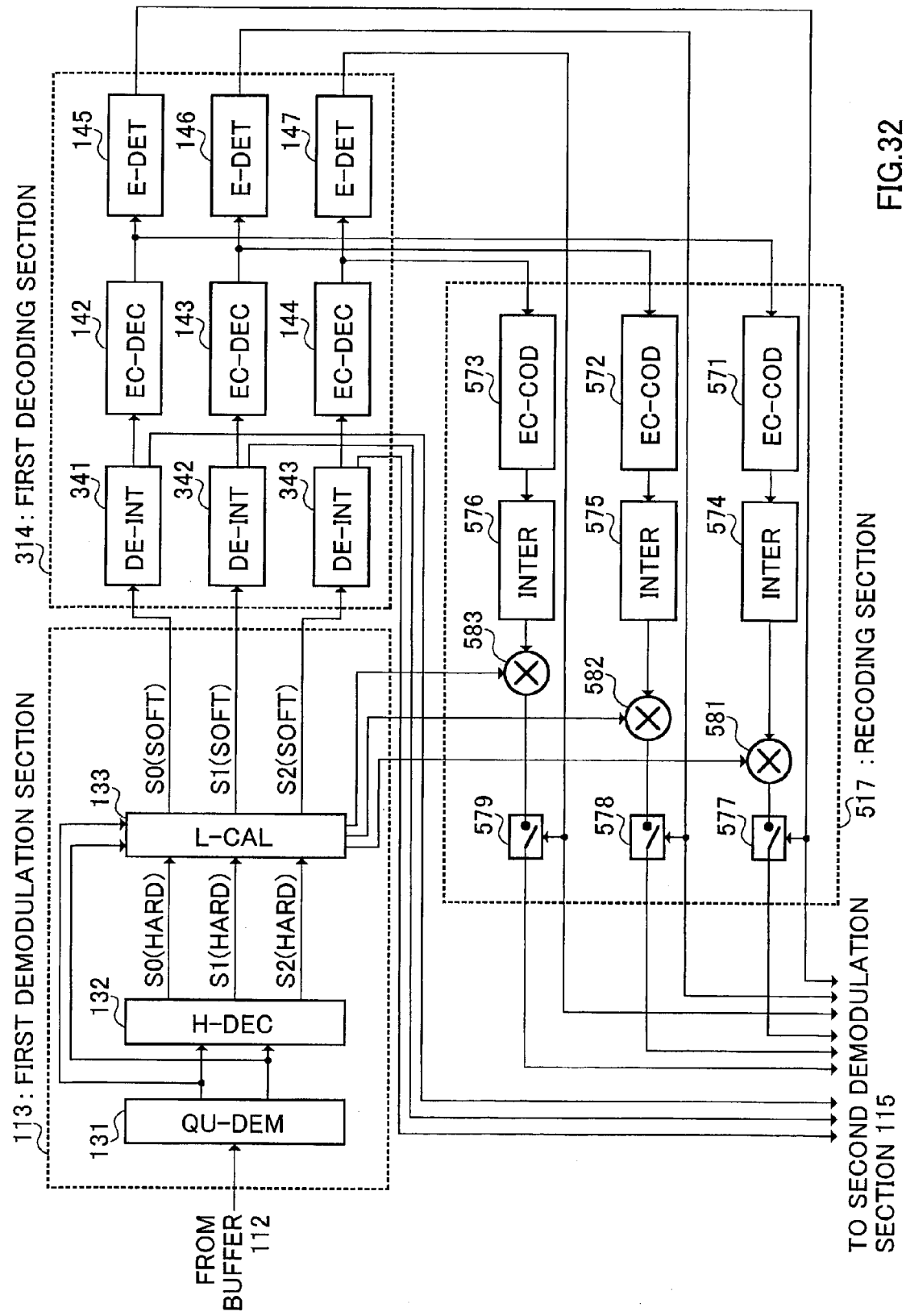
FIG. 32 is a block diagram showing the internal configuration of the first demodulation section, first decoding section, and recoding section of a receiving apparatus of a radio communication system according to Embodiment 10 of the present invention.

In this embodiment, it is also possible to add switches 577 through 579 to the recoding section 517, as shown in FIG. 32, and use interleaving results for likelihood modification only for error detection units for which an error is not detected by error detection circuits 145 through 147.

By this means, according to this embodiment, likelihoods are modified reflecting only interleaving results corresponding to error detection units for which an error is not detected, enabling more precise likelihoods to be calculated.

(Embodiment 11)

Embodiment 11 of the present invention is a variant of Embodiment 1, differing from Embodiment 1 in that likelihoods recalculated by likelihood calculation circuit 153 are modified in accordance with the error tolerance of each bit.

As already indicated in Embodiment 8, in 8PSK there is a correlational relationship between the error tolerance of the most significant bit and the error tolerance of the second most significant bit such that if one is high the other is low. That is to say, in 8PSK, if the error tolerance of the most significant bit is high, the error tolerance of the second most significant bit is low, and conversely, if the error tolerance of the most significant bit is low, the error tolerance of the second most significant bit is high.

Thus, in this embodiment, the difference in likelihood between the most significant 2 bits is increased by considering the likelihood of the most significant bit and the likelihood of the second most significant bit among the likelihoods calculated by likelihood calculation circuit 153, and dividing the likelihood of each of these most significant 2 bits by the absolute value of the likelihood of the other. That is to say, the likelihood of the most significant bit is divided by the likelihood of the second most significant bit, and the likelihood of the second most significant bit is divided by the likelihood of the most significant bit. By this means, error correction precision is improved.

Figure 33:
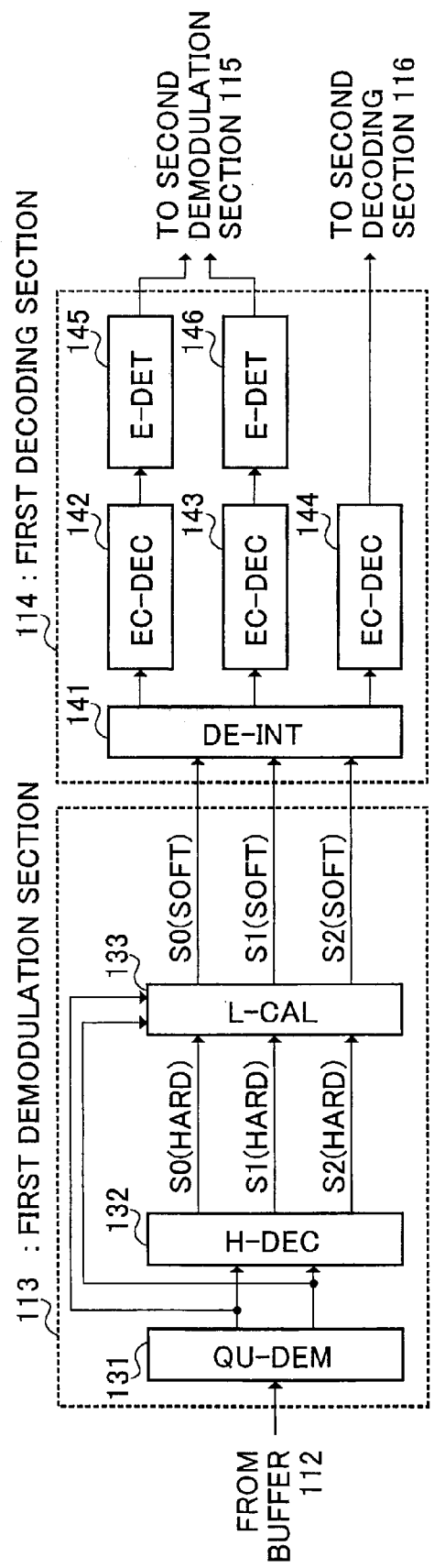
FIG. 33 is a block diagram showing the configuration of the first demodulation section and first decoding section of a receiving apparatus of a radio communication system according to Embodiment 11 of the present invention.
Figure 34:
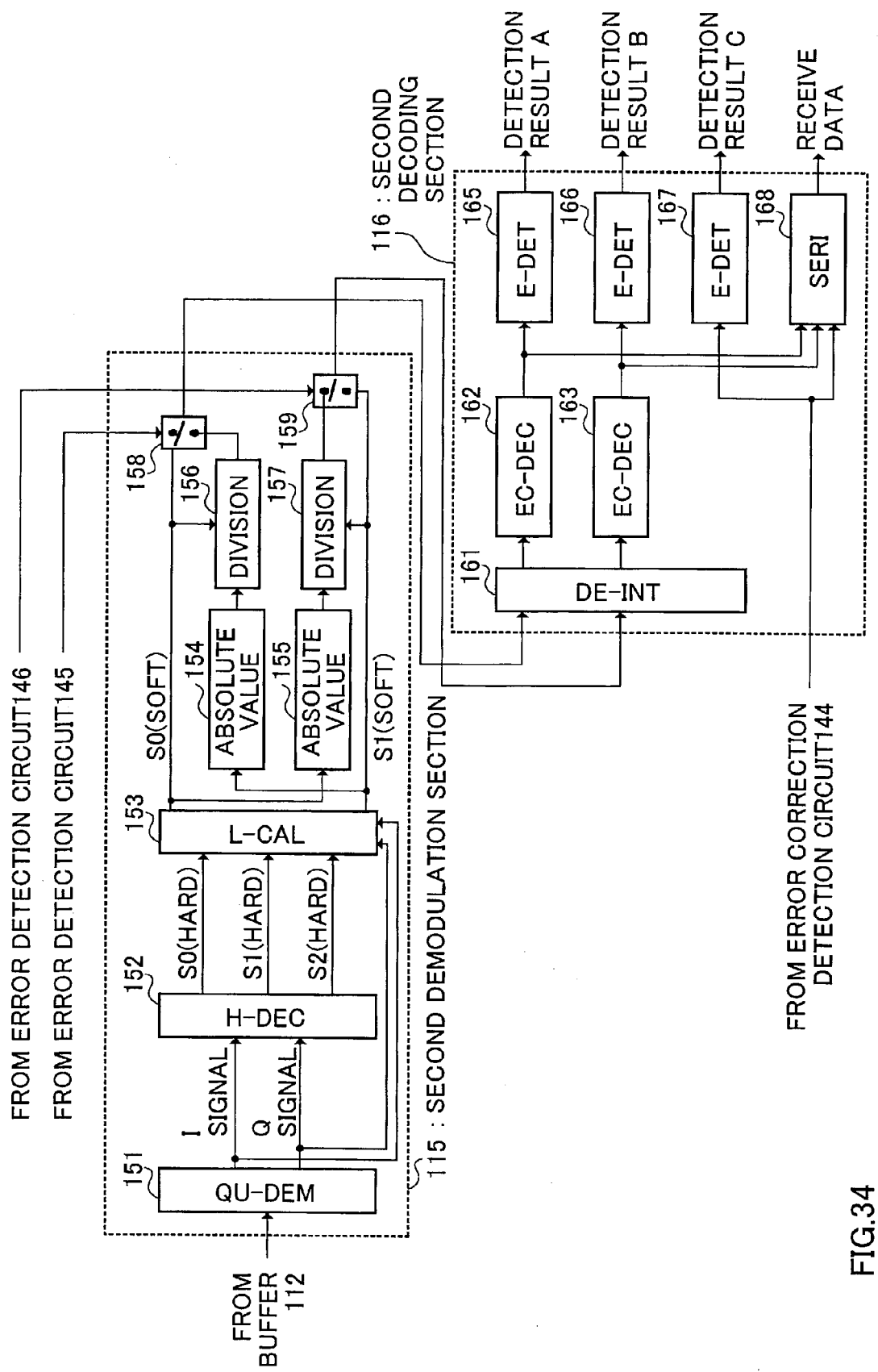
FIG. 34 is a block diagram showing the internal configuration of the second demodulation section and second decoding section of a receiving apparatus of a radio communication system according to Embodiment 11 of the present invention.

Except for the internal configuration of the first decoding section 114, second demodulation section 115, and second decoding section 116, the configuration of a radio communication system according to this embodiment is identical to that of Embodiment 1 shown in FIG. 1. FIG. 33 is a block diagram showing the configuration of the first demodulation section 113 and first decoding section 114 of a receiving apparatus of a radio communication system according to Embodiment 11 of the present invention. FIG. 34 is a block diagram showing the internal configuration of the second demodulation section 115 and second decoding section 116 of a receiving apparatus of a radio communication system according to Embodiment 11 of the present invention. Parts in FIG. 33 and FIG. 34 identical to those in FIG. 3 or FIG. 4 are assigned the same codes as in FIG. 3 or FIG. 4 and their detailed explanations are omitted. The transmitting apparatus of a radio communication system according to this embodiment is identical to the transmitting apparatus shown in FIG. 2, and therefore a description of the transmitting apparatus is omitted here.

In the receiving apparatus shown in FIG. 33, an error detection circuit 145 performs error detection on a most significant bit that has undergone error correction decoding, and outputs the error detection result to a switching circuit 158. An error detection circuit 146 performs error detection on a second most significant bit that has undergone error correction decoding, and outputs the error detection result to a switching circuit 159. An error correction decoding circuit 144 performs error correction decoding on a third most significant bit, and outputs the result of decoding to an error detection circuit 167 and serialization circuit 168.

An absolute value calculation circuit (154 calculates the absolute value of the likelihood of the second most significant bit output from likelihood calculation circuit 153, and outputs this value to a division circuit 156. An absolute value calculation circuit 155 calculates the absolute value of the likelihood of the most significant bit output from likelihood calculation circuit 153, and outputs this value to a division circuit 157.

Division circuit 156 divides the likelihood of the most significant bit output from likelihood calculation circuit 153 by the absolute value of the likelihood of the second most significant bit output from absolute value calculation circuit 154, and outputs the result of the division to switching circuit 158. Division circuit 157 divides the likelihood of the second most significant bit output from likelihood calculation circuit 153 by the absolute value of the-likelihood of the most significant bit output from absolute value calculation circuit 155, and outputs the result of the division to switching circuit 159.

Switching circuit 158 outputs to a de-interleaving circuit 161 either the division result output from division circuit 156 or the likelihood of the most significant bit output from likelihood calculation circuit 153, according to the error detection result for the most significant bit output from error detection circuit 145. That is to say, switching circuit 158 outputs the result of division by division circuit 156 to the de-interleaving circuit 161 when the error detection result indicates that there is an error. Switching circuit 159 outputs to the de-interleaving circuit 161 either the division result output from division circuit 157 or the likelihood of the second most significant bit output from likelihood calculation circuit 153, according to the error detection result for the second most significant bit output from error detection circuit 146. That is to say, switching circuit 159 outputs the result of division by division circuit 157 to the de-interleaving circuit 161 when the error detection result indicates that there is an error.

Thus, according to this embodiment, the difference in likelihood between the most significant 2 bits can be increased by dividing the likelihood of each of the most significant 2 bits by the absolute value of the likelihood of the other. Performing error correction using likelihoods calculated in this way enables error correction capability to be improved.

(Embodiment 12)

Embodiment 12 of the present invention is a variant of Embodiment 11, differing from Embodiment 11 in that the likelihood modification indicated in Embodiment 11 is performed only for a bit belonging to an error detection unit for which an error is not detected in the first decoding section 114.

Figure 35:
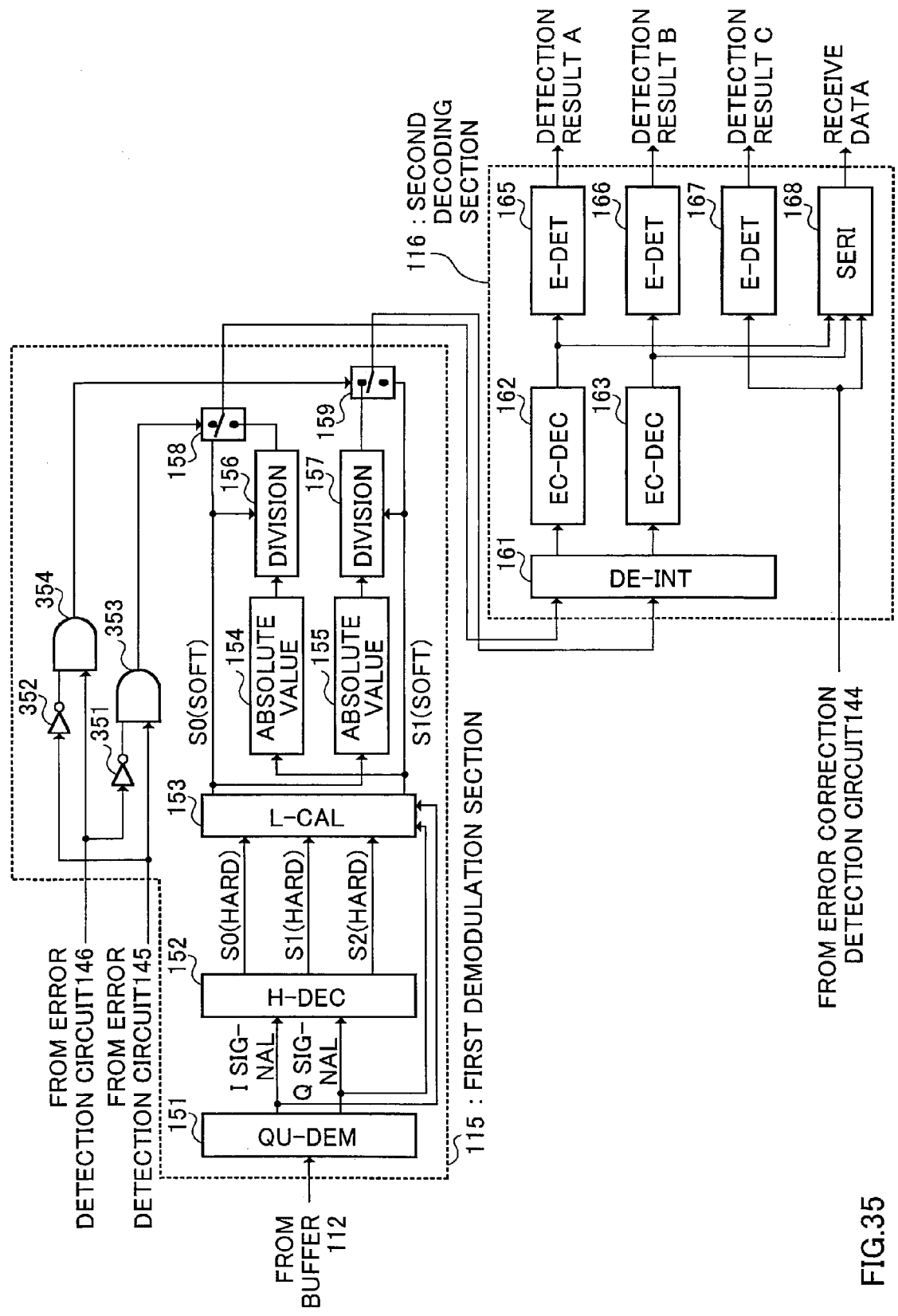
FIG. 35 is a block diagram showing the configuration of the second demodulation section and second decoding section of a receiving apparatus of a radio communication system according to Embodiment 12 of the present invention.

Except for the internal configuration of the second demodulation section 115, the configuration of a radio communication system according to this embodiment is identical to that of Embodiment 11. FIG. 35 is a block diagram showing the configuration of the second demodulation section 115 and second decoding section 116 of a receiving apparatus of a radio communication system according to Embodiment 12 of the present invention. Parts in FIG. 35 identical to those in FIG. 34 are assigned the same codes as in FIG. 34 and their detailed explanations are omitted.

In the receiving apparatus shown in FIG. 35, a logical NOT circuit 351 calculates the logical NOT of an error detection result represented by "1" or "0" output from an error detection circuit 146, and outputs the result of the calculation to an AND circuit 353. A logical NOT circuit 352 calculates the logical NOT of an error detection result represented by "1" or "0" output from an error detection circuit 145, and outputs the result of the calculation to an AND circuit 354.

AND circuit 353 calculates the AND of the error detection result output from error detection circuit 145 and the output value of logical NOT circuit 351, and outputs the result of the calculation to a switching circuit 158. AND circuit 354 calculates the AND of the error detection result output from error detection circuit 146 and the output value of logical NOT circuit 352, and outputs the result of the calculation to a switching circuit 159.

When an error is not detected in the second most significant bit and an error is detected in the most significant bit, switching circuit 158 outputs the result of division by a division circuit 156 to a de-interleaving circuit 161. In other cases, switching circuit 158 outputs the likelihood calculated by likelihood calculation circuit 153 to the de-interleaving circuit 161. When an error is not detected in the most significant bit and an error is detected in the second most significant bit, switching circuit 159 outputs the result of division by a division circuit 157 to the de-interleaving circuit 161. In other cases, switching circuit 159 outputs the likelihood calculated by likelihood calculation circuit 153 to the de-interleaving circuit 161.

Thus, according to this embodiment, likelihood modification is performed only for a bit, of the most significant bit and second most significant bit, for which an error is not detected, thereby enabling likelihoods to be calculated with greater precision.

(Embodiment 13)

Embodiment 13 of the present invention is a combination of Embodiment 10 and Embodiment 12, in which the likelihood modification indicated in Embodiment 12 is performed only for a bit belonging to an error detection unit for which error correction is not performed in the first decoding section 314.

Figure 36:
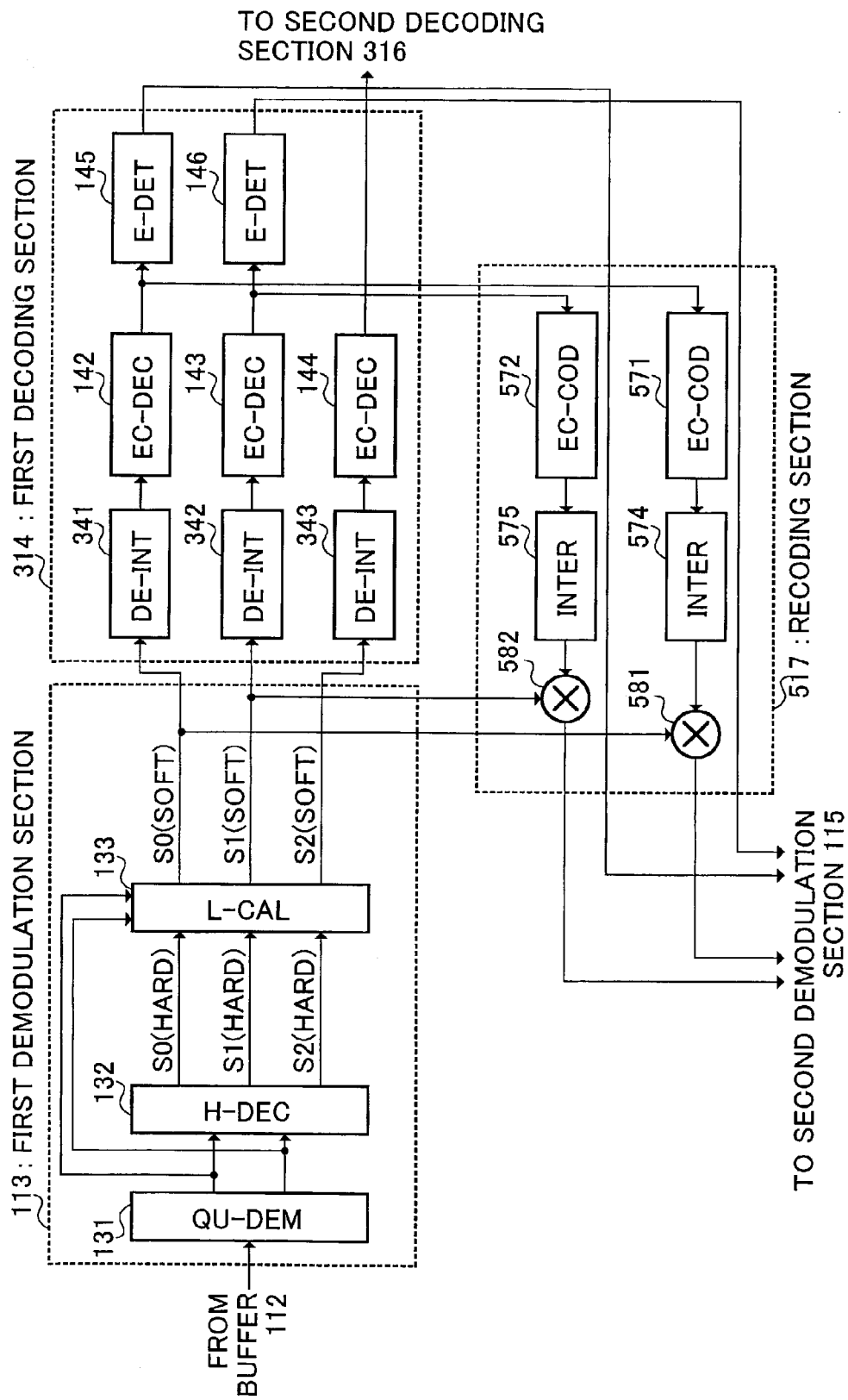
FIG. 36 is a block diagram showing the internal configuration of the first demodulation section, first decoding section, and recoding section of a receiving apparatus of a radio communication system according to Embodiment 13 of the present invention.
Figure 37:
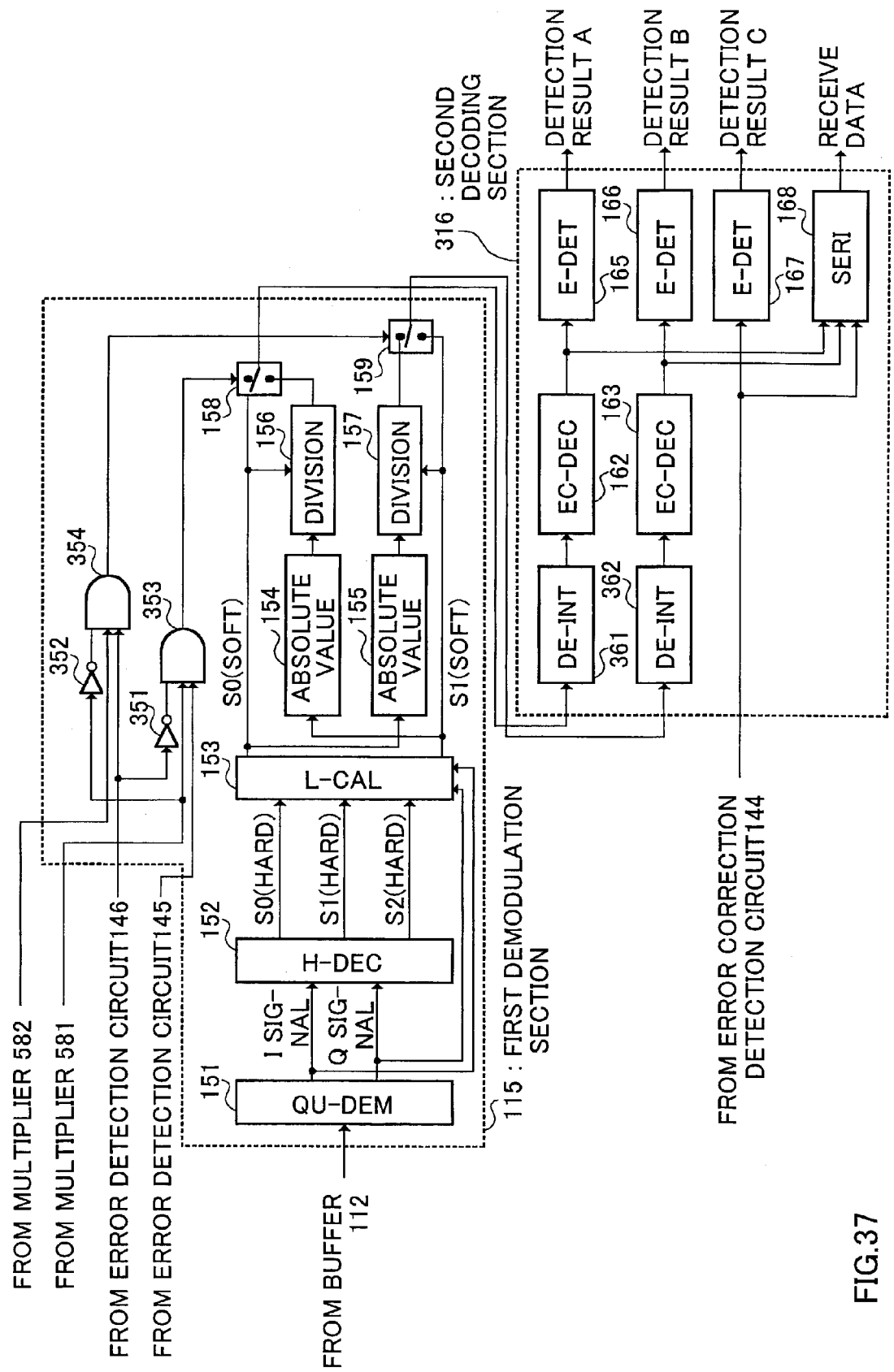
FIG. 37 is a block diagram showing the internal configuration of the second demodulation section and second decoding section of a receiving apparatus of a radio communication system according to Embodiment 13 of the present invention.

Except for the internal configuration of the recoding section 517 and second demodulation section 115, the configuration of a radio communication system according to this embodiment is identical to that of Embodiment 5 shown in FIG. 18. FIG. 36 is a block diagram showing the internal configuration of the first demodulation section 113, first decoding section 314, and recoding section 517 of a receiving apparatus of a radio communication system according to Embodiment 13 of the present invention. FIG. 37 is a block diagram showing the internal configuration of the second demodulation section 115 and second decoding section 316 of a receiving apparatus of a radio communication system according to Embodiment 13 of the present invention. Parts in FIG. 36 and FIG. 37 identical to those in FIG. 20, FIG. 30, or FIG. 35 are assigned the same codes as in FIG. 20, FIG. 30, or FIG. 35, and their detailed explanations are omitted.

An error correction decoding circuit 142 performs error correction decoding of a most significant bit, and outputs the result of decoding to an error detection circuit 145 and error correction coding circuit 571. An error correction decoding circuit 143 performs error correction decoding of a second most significant bit, and outputs the result of decoding to an error detection circuit 146 and error correction coding circuit 572. An error correction decoding circuit 144 performs error correction decoding of a third most significant bit, and outputs the result of decoding to an error detection circuit 167 and serialization circuit 168.

Error correction coding circuit 571 performs error correction coding again of the decoding result output from error correction decoding circuit 142, and outputs the coded bit string to an interleaving circuit 574. Error correction coding circuit 572 performs error correction coding again of the decoding result output from error correction decoding circuit 143, and outputs the coded bit string to an interleaving circuit 575. Interleaving circuit 574 permutes the coded bit string that has undergone error correction coding in error correction coding circuit 571 in accordance with a predetermined rule. Interleaving circuit 575 permutes the coded bit string that has undergone error correction coding in error correction coding circuit 572 in accordance with a predetermined rule.

Multipliers 581 and 582 multiply together a pre-error-correction bit output from a likelihood calculation circuit 133 in a first demodulation section 113, and a post-error-correction bit output from corresponding interleaving circuit 574 or 575. These multipliers are arranged so as to output "0" when the result of the operation is negative, and to output "1" when the result of the operation is positive. As bits subjected to error correction by error correction decoding circuits 142 and 143 have different values before and after error correction, multipliers 581 and 582 output "0" for these bits since the multiplication results are negative. On the other hand, bits not subjected to error correction by error correction decoding circuits 142 and 143 have identical values before and after error correction, and therefore multipliers 581 and 582 output "1" for these bits since the multiplication results are positive. That is to say, the output values of multipliers 581 and 582 indicate whether or not error correction has been performed by error correction decoding circuits 142 and 143.

AND circuit 353 calculates the AND of the error detection result output from error detection circuit 145, the output value of logical NOT circuit 351, and the comparison result signal output from multiplier 581, and outputs the result of the calculation to a switching circuit 158. AND circuit 354 calculates the AND of the error detection result output from error detection circuit 146, the output value of logical NOT circuit 352, and the comparison result signal output from multiplier 582, and outputs the result of the calculation to a switching circuit 159.

When an error is not detected in the second most significant bit, and an error is detected in the most significant bit, and there is no change in the signal code before and after error correction coding for the most significant bit, switching circuit 158 outputs the result of division by a division circuit 156 to a de-interleaving circuit 361. In other cases, switching circuit 158 outputs the likelihood calculated by likelihood calculation circuit 153 to de-interleaving circuit 361. When an error is not detected in the most significant bit, and an error is detected in the second most significant bit, and there is no change in the signal code before and after error correction coding for the second most significant bit, switching circuit 159 outputs the result of division by a division circuit 157 to a de-interleaving circuit 362. In other cases, switching circuit 159 outputs the likelihood calculated by likelihood calculation circuit 153 to de-interleaving circuit 362.

Thus, according to this embodiment, likelihood modification is performed only for a bit, of the most significant bit and second most significant bit, for which an error has not been detected in the first decoding section 314 and error correction has not been performed, thereby enabling likelihoods to be calculated with greater precision.

(Embodiment 14)

Figure 38:
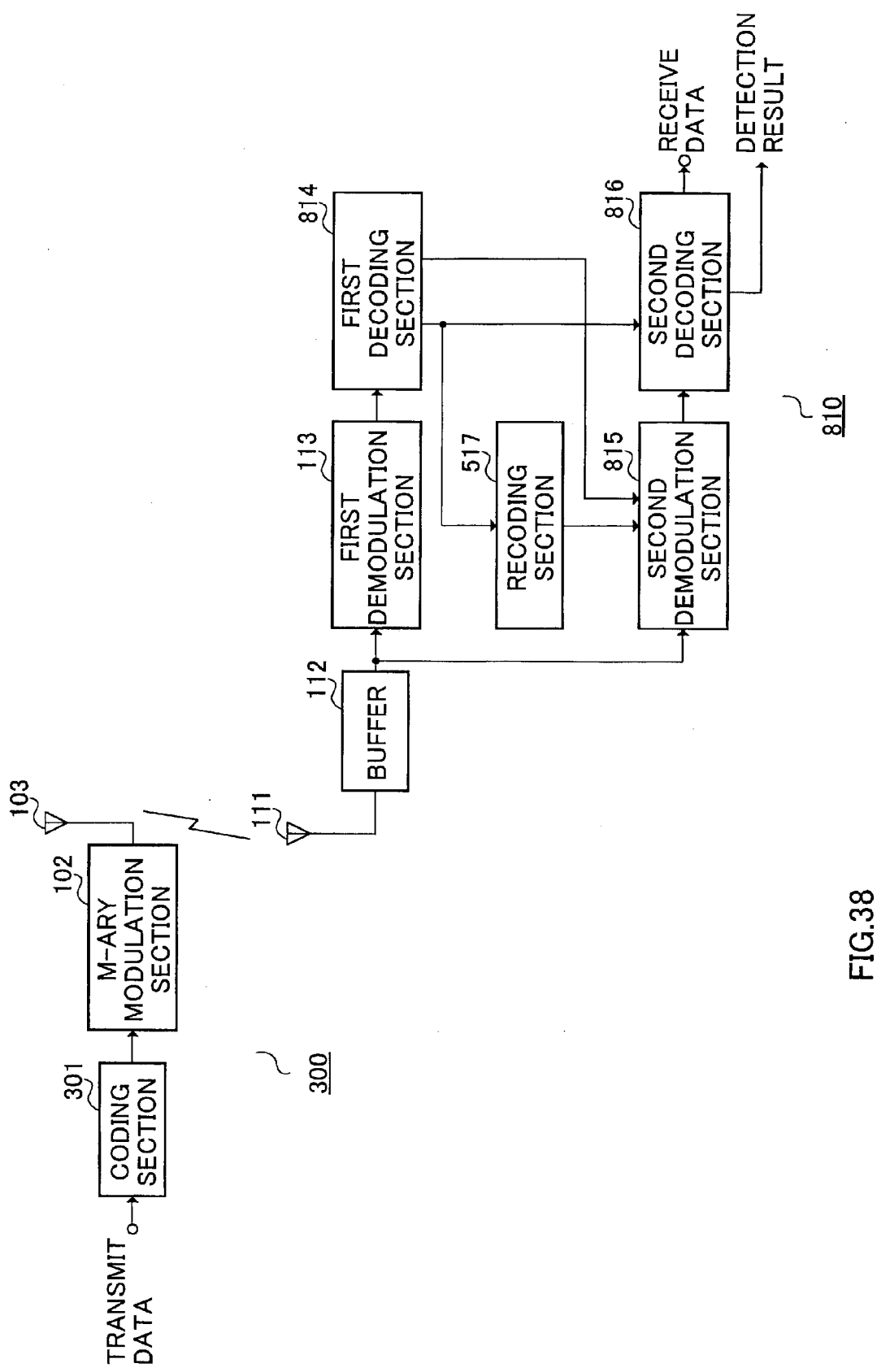
FIG. 38 is a block diagram showing the configuration of a radio communication system according to Embodiment 14 of the present invention.

FIG. 38 is a block diagram showing the configuration of a radio communication system according to Embodiment 14 of the present invention. In the radio communication system shown in FIG. 38, radio communications are performed between a transmitting apparatus 300 and receiving apparatus 810.

Figure 39:
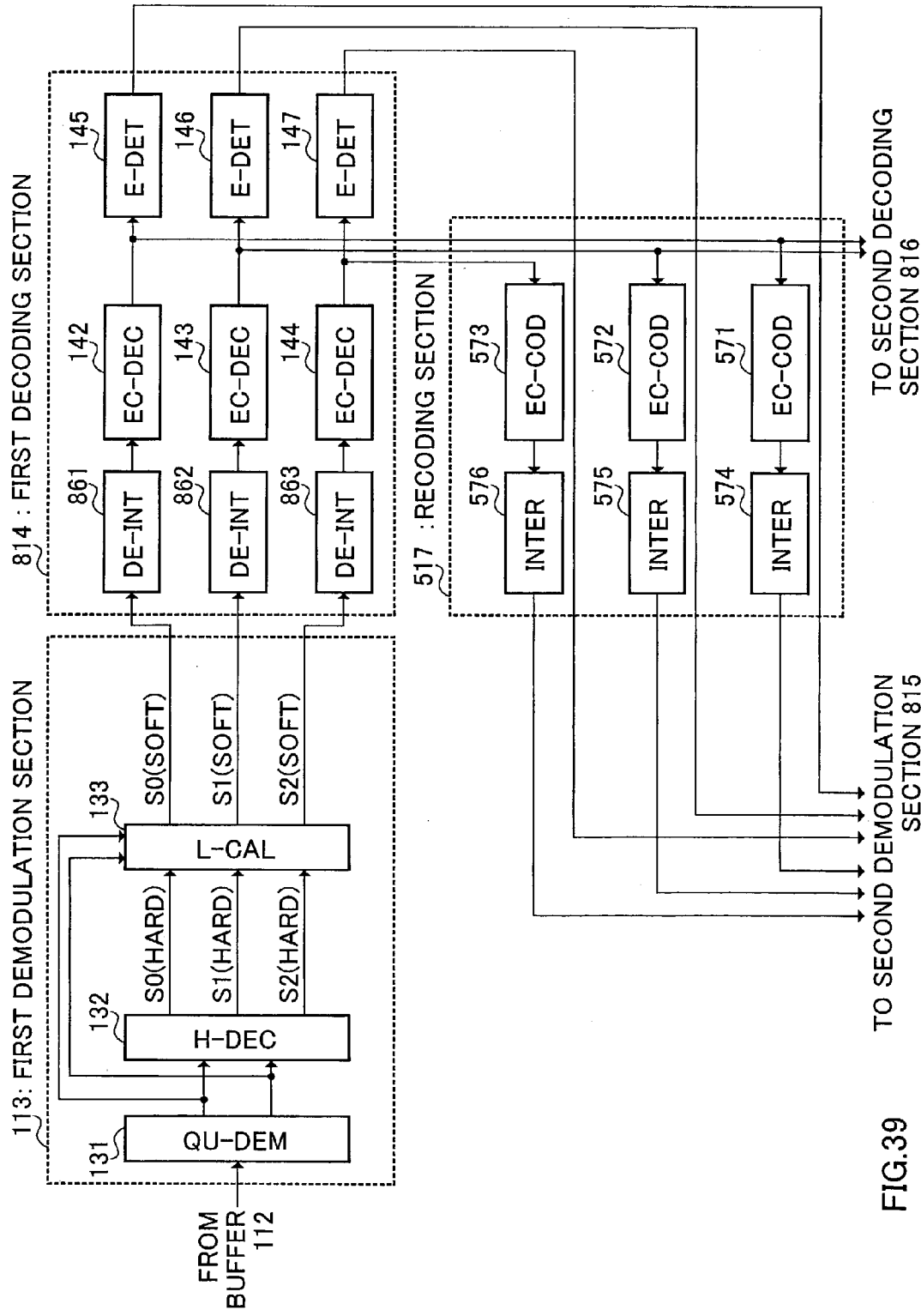
FIG. 39 is a block diagram showing the internal configuration of the first demodulation section, first decoding section, and recoding section of the receiving apparatus shown in FIG. 38.
Figure 40:
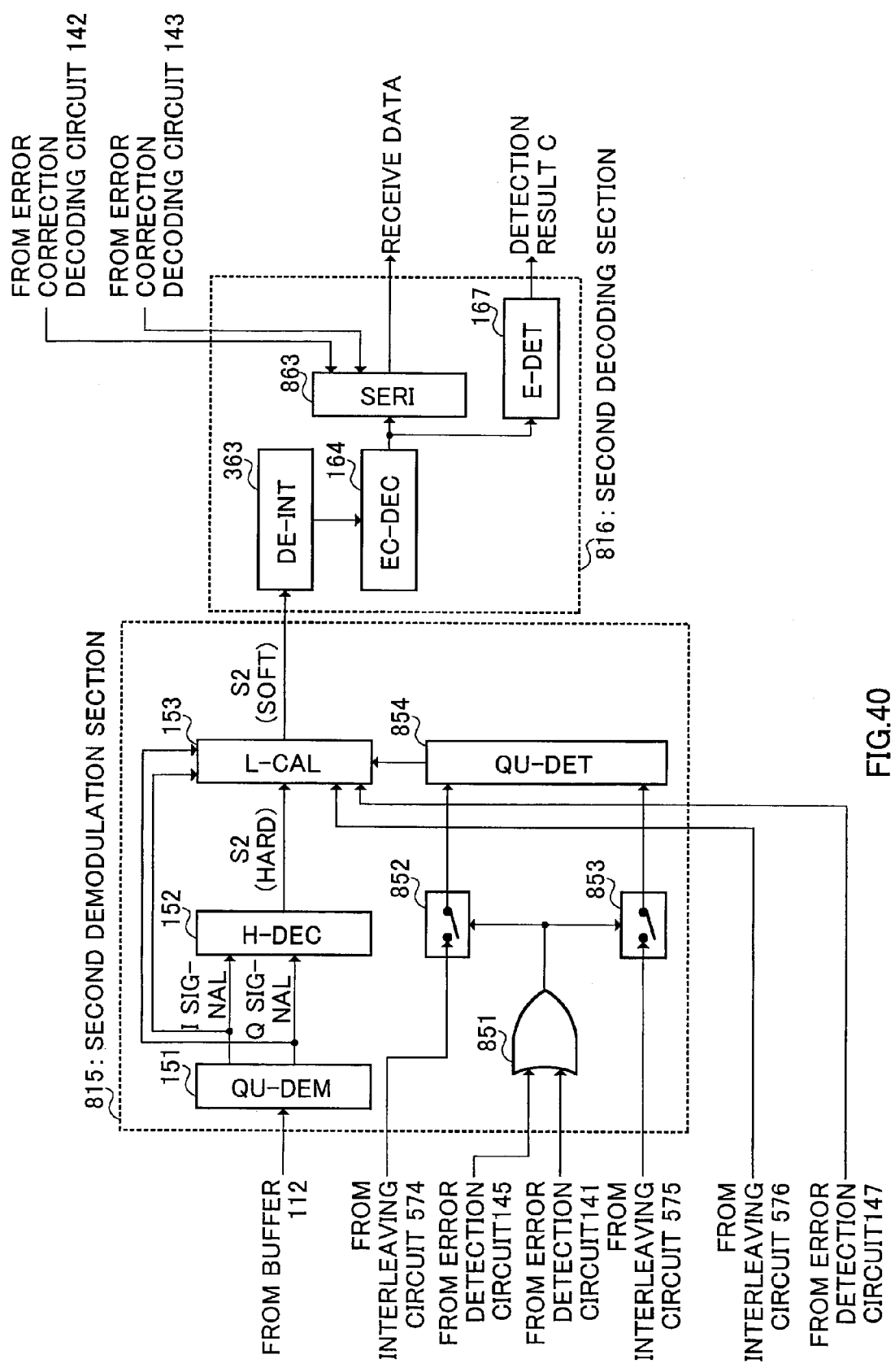
FIG. 40 is a block diagram showing the internal configuration of the second demodulation section and second decoding section of the receiving apparatus shown in FIG. 38.

FIG. 39 is a block diagram showing the internal configuration of the first demodulation section 113, first decoding section 814, and recoding section 517 of the receiving apparatus 810 shown in FIG. 38. FIG. 40 is a block diagram showing the internal configuration of the second demodulation section 815 and second decoding section 816 of the receiving apparatus 810 shown in FIG. 38. Parts in FIG. 39 and FIG. 40 identical to those in FIG. 19 or FIG. 20 are assigned the same codes as in FIG. 19 or FIG. 20 and their detailed explanations are omitted.

An error correction decoding circuit 142 performs error correction decoding of individual soft decision values independently, and an error detection circuit 145 outputs the result of decoding to an error detection circuit 145, error correction coding circuit 571, and serialization circuit 863.

Error correction coding circuits 571 through 573 perform error correction coding again of demodulation results output from corresponding error correction decoding circuits 142 through 144, and output coded bit strings to corresponding interleaving circuits 574 through 576. Interleaving circuits 574 through 576 permute coded bit strings output from corresponding error correction coding circuits 571 through 573 in accordance with a predetermined rule. The predetermined rule used when permuting the data order here is the same as the rule used by interleaving circuits 321 through 323 provided in the transmitting apparatus.

Coded bit strings permuted by interleaving circuits 574 and 575 are output to an OR circuit 851 provided in the second demodulation section 815, and the coded bit string permuted by interleaving circuit 576 is output to a likelihood calculation circuit 153 provided in the second demodulation section 815.

Error detection circuits 145 and 146 output error detection results to the OR circuit 851, and error detection circuit 147 outputs the error detection result to likelihood calculation circuit 153.

The OR circuit 851 calculates the OR of the error detection result for the error detection unit to which the most significant bit output from error detection circuit 145 belongs, and the error detection result for the error detection unit to which the second most significant bit output from error detection circuit 146 belongs, and outputs the result of the calculation to a switching circuit 852 and switching circuit 853.

It is here assumed that error detection circuits 145 through 147 output "1" when an error is not detected, and output "0" when an error is detected. The OR circuit 851 outputs "1" when an error is not detected in one or other of the most significant 2 bits.

When "1" is output from the OR circuit 851, switching circuit 852 outputs S0 from interleaving circuit 574 to a quadrant determination circuit (QU-DET) 854. When "1" is output from the OR circuit 851, switching circuit 853 outputs S1 from interleaving circuit 575 to the quadrant determination circuit 854.

The quadrant determination circuit 854 determines the quadrant of the I-Q plane to which the received signal point belongs, based on the most significant 2 bits (that is, S0 and S1) output from switching circuits 852 and 853. That is to say, the received signal point is determined to be in the first quadrant when the most significant 2 bits are "10", to be in the second quadrant when the most significant 2 bits are "00", to be in the third quadrant when the most significant 2 bits are "01", and to be in the fourth quadrant when the most significant 2 bits are "11".

Likelihood calculation circuit 153 modifies the likelihood of third most significant bit S2 based on the result of determination by the quadrant determination circuit 854. Likelihood modification in this embodiment will now be described with reference to FIG. 5. When point e is determined for a received signal in the first demodulation section 113, the likelihood of S2 of the signal received at point e is indicated by the distance from the identifying axis nearest point e (here, the Y-axis).

Assuming here that the most significant 2 bits are decoded as "10" by the second demodulation section 815, and that neither of these bits is erroneous, the received signal point is determined by the quadrant determination circuit 854 to be in the first quadrant. By referring to the result of determination by the quadrant determination circuit 854, likelihood calculation circuit 153 recognizes that the received signal is "101" or "100", and therefore modifies the identifying axis to the X-axis, which identifies "101" and "100", and makes the distance from point e to the X-axis the likelihood. That is to say, likelihood calculation circuit 153 performs likelihood modification by changing the decision axis for least significant bit S2.

A de-interleaving circuit 363 permutes an input bit string in accordance with the rule corresponding to interleaving circuit 323, and outputs the permuted bit string to corresponding error correction decoding circuit 164. Error correction decoding circuit 164 performs error correction coding based on the respective input bit strings. The serialization circuit 863 serializes error correction decoding results from error correction decoding circuits 142 and 143 and error correction decoding circuit 164, and obtains receive data.

Thus, according to this embodiment, the likelihood of least significant bit S2 can be modified to a more precise likelihood based on the error detection results for the most significant 2 bits.

(Embodiment 15)

Embodiment 15 of the present invention is a variant of Embodiment 14, differing from Embodiment 14 in that, in the likelihood modification in Embodiment 14, likelihood modification is performed with the likelihood of a bit belonging to an error correction unit for which an error is not detected in the first decoding section 814 reflected to a greater degree than the likelihood of an error correction unit for which an error is detected.

Figure 41:
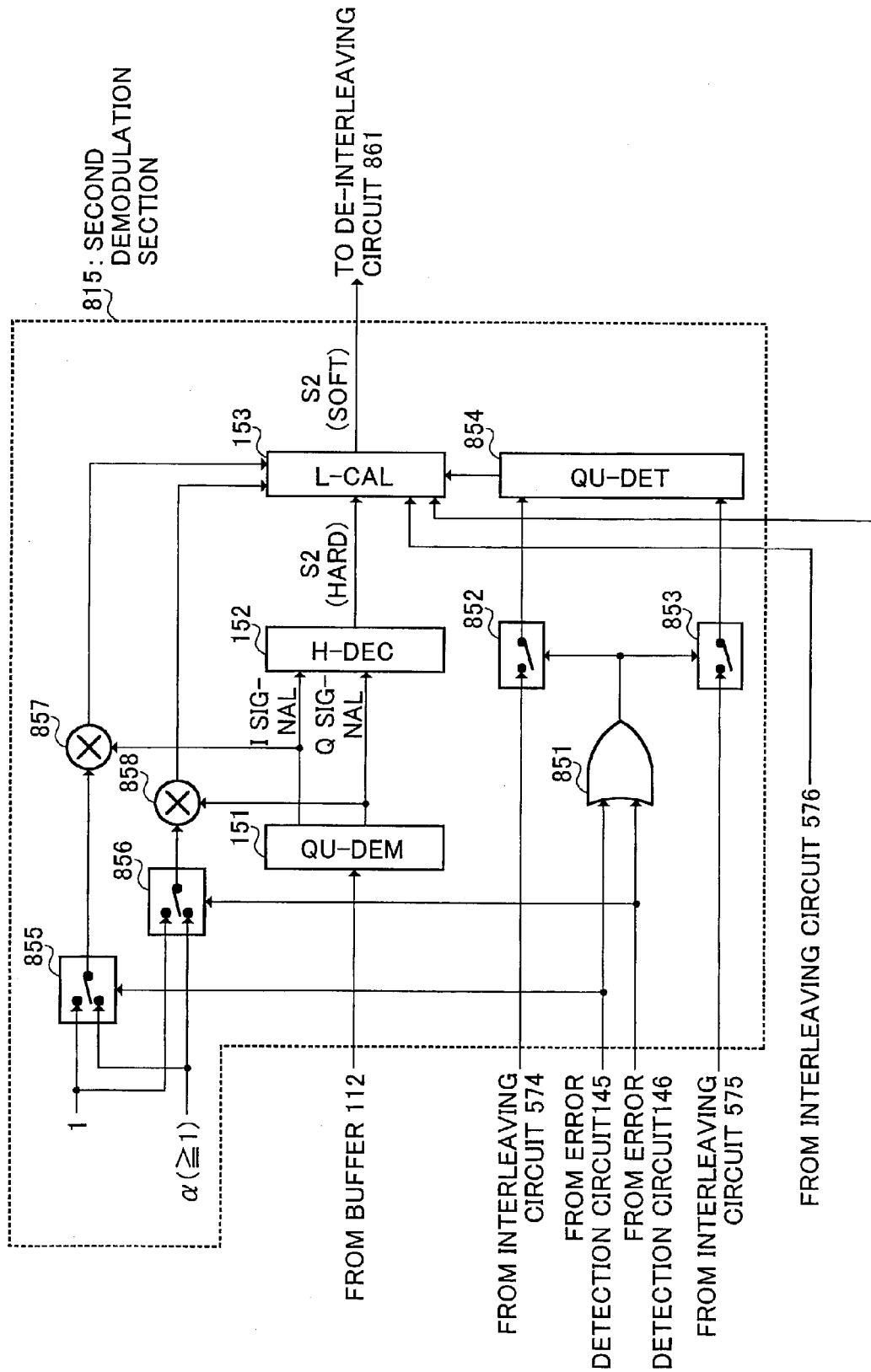
FIG. 41 is a block diagram showing the configuration of the second demodulation section of a receiving apparatus of a radio communication system according to Embodiment 15 of the present invention.

Except for the internal configuration of the second demodulation section 815, the configuration of a radio communication system according to this embodiment is identical to that of Embodiment 14 shown in FIG. 18. FIG. 41 is a block diagram showing the configuration of the second demodulation section 815 of a receiving apparatus of a radio communication system according to Embodiment 15 of the present invention. Parts in FIG. 41 identical to those in FIG. 40 are assigned the same codes as in FIG. 40 and their detailed explanations are omitted.

In the receiving apparatus shown in FIG. 41, a switching circuit 855 outputs "α" when an error is not detected in S0 in an error detection circuit 145, and outputs "1" when an error is detected. A switching circuit 856 outputs "α" when an error is not detected in S1 in an error detection circuit 146, and outputs "1" when an error is detected. Here, $\alpha \geq 1$.

Multipliers 857 and 858 multiply the output values of corresponding switching circuits 855 and 856 by the output value of a quadrature demodulation circuit 151. The multiplication results are output to a likelihood calculation circuit 153. Likelihood calculation circuit 153 performs likelihood calculation based on the multiplication results output from multipliers 857 and 858, and a hard decision value output from a hard decision circuit 152.

Thus, according to this embodiment, a bit for which an error is not detected is reflected to a high degree in likelihood calculation by likelihood calculation circuit 153, thereby enabling likelihoods to be calculated with greater precision.

(Embodiment 16)

In Embodiment 16 of the present invention, likelihood recalculation is described when using 16QAM as the modulation method. In the radio communication system shown in FIG. 42, radio communications are performed between a transmitting apparatus 900 and receiving apparatus 910.

In the transmitting apparatus 900, a coding section 901 performs error detection coding of transmit data for each predetermined error detection unit, and performs error correction coding for each predetermined error correction unit. An M-ary modulation section 902 performs 16QAM modulation of the output signal from the coding section 901, and performs radio transmission of this signal from an antenna 903.

In the receiving apparatus 910, a signal received from an antenna 911 is first stored in a buffer 912, and then output to a first demodulation section 913 and a second demodulation section 915 for each predetermined transmission unit.

The first demodulation section 913 demodulates the received signal and outputs the result of demodulation to a first decoding section 914. The first decoding section 914 performs error correction decoding of the received signal, and also performs error detection on the result of demodulation. Data that has undergone error correction decoding is output to a recoding section 917. The error detection result is output to the second demodulation section 915.

The second demodulation section 915 refers to the data recoded by the recoding section 917 and the result of error detection by the first decoding section 914 and demodulates the received signal again, and outputs the result of demodulation to a second decoding section 916. The second decoding section 916 performs error correction decoding on the result of demodulation by the second demodulation section 915, and obtains receive data.

Figure 42:
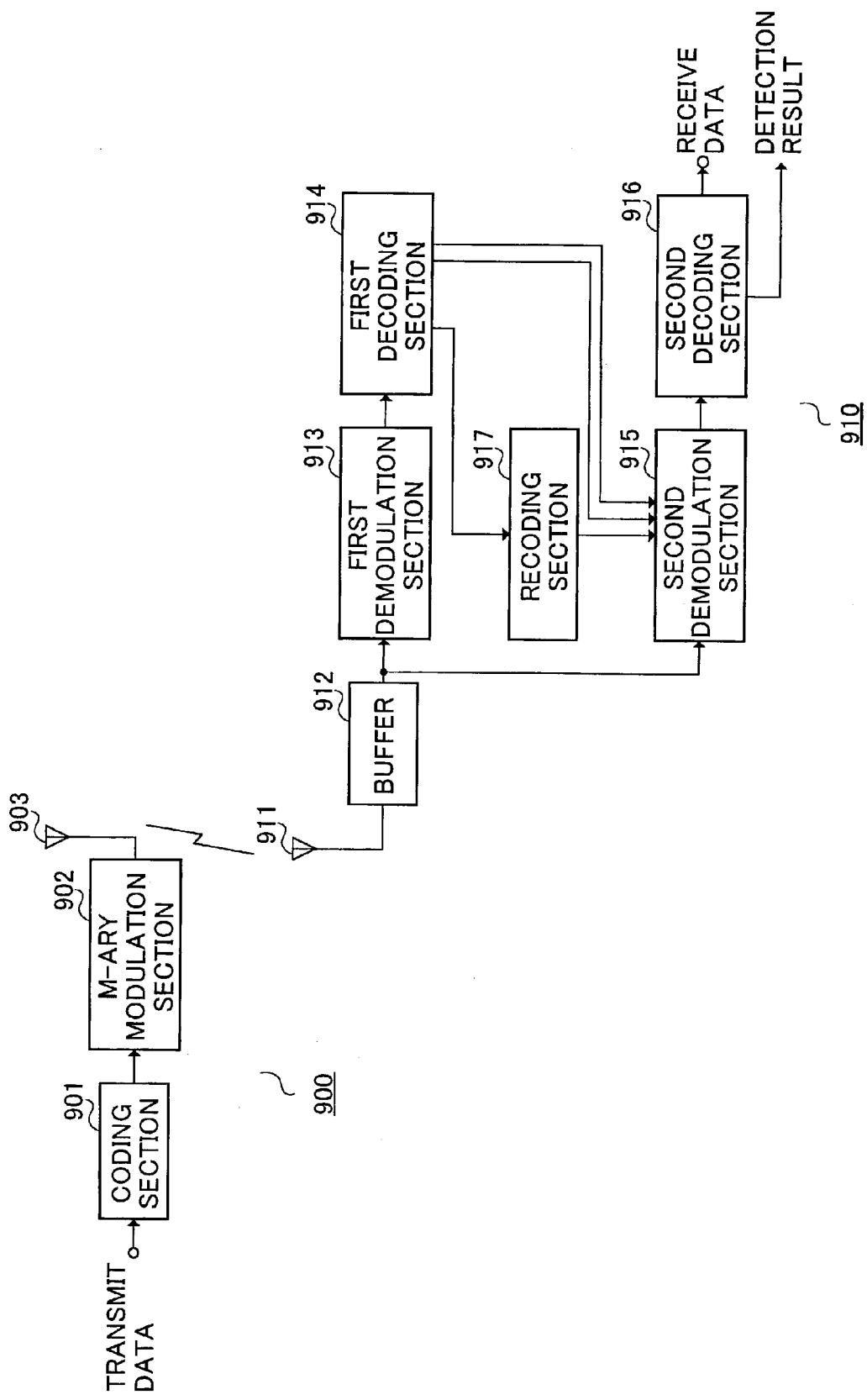
FIG. 42 is a block diagram showing the configuration of a radio communication system according to Embodiment 16 of the present invention.
Figure 43:
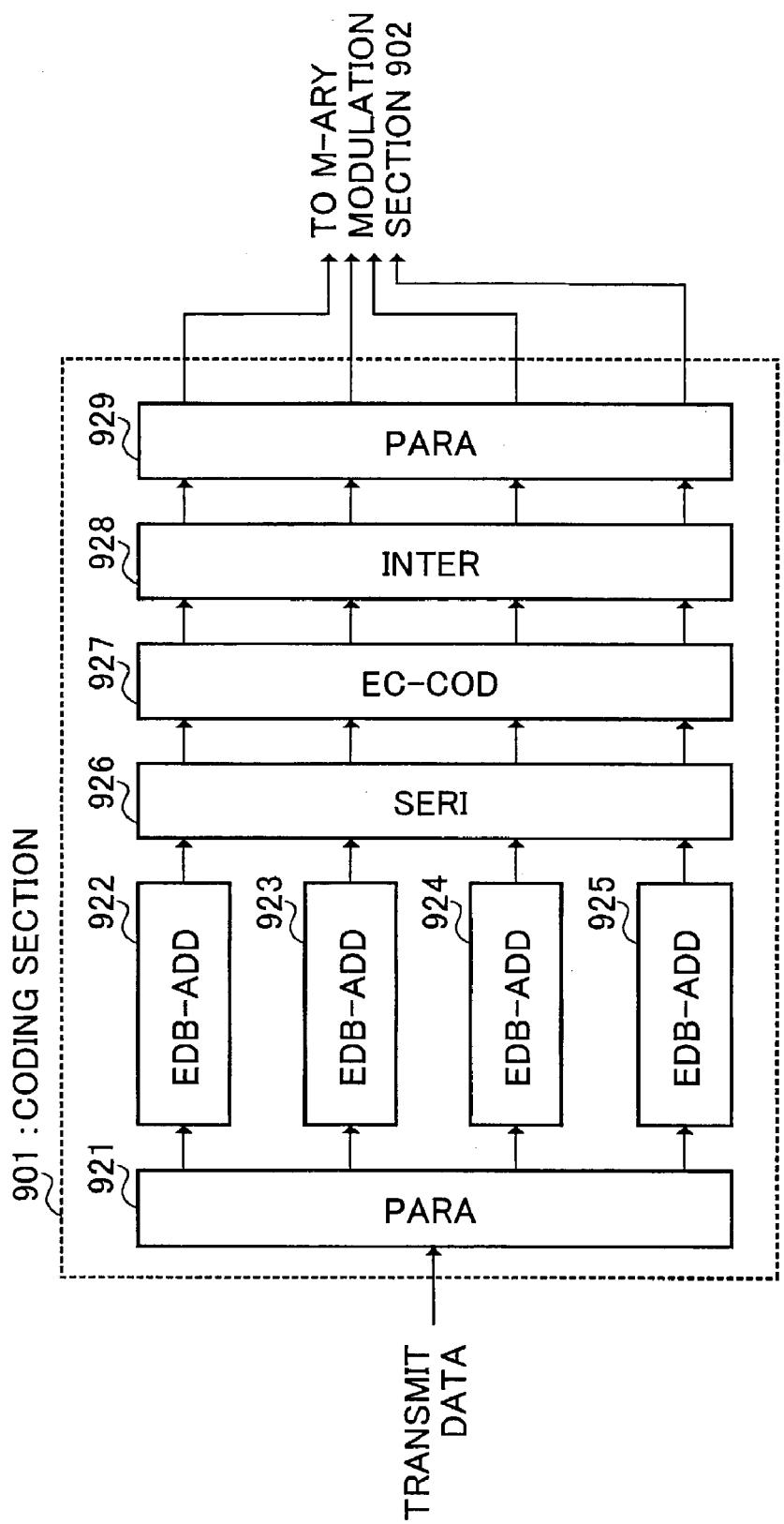
FIG. 43 is a block diagram showing the internal configuration of the coding section of the transmitting apparatus shown in FIG. 42.

FIG. 43 is a block diagram showing the internal configuration of the coding section 901 of the transmitting apparatus 900 shown in FIG. 42. In FIG. 43, transmit data is first input to a parallelization circuit 921. The parallelization circuit 921 parallelizes the transmit data into 4 sequences, and outputs the parallelized transmit data to error detection bit adding circuits 922 through 925. The error detection bit adding circuits 922 through 925 add error detection bits to input bits parallelized into 4 sequences from the parallelization circuit 921 for each predetermined error detection unit. By this means, the transmit data is distributed into 4 independent kinds of error detection units.

Transmit data to which error detection bits have been added by error detection bit adding circuits 922 through 925 is serialized by a serialization circuit 926, undergoes error correction coding by an error correction coding circuit 927, has its data order modified in accordance with a predetermined rule by an interleaving circuit 928, is parallelized into 4 sequences by a parallelization circuit 929, and is output to the M-ary modulation section 902.

Figure 44:
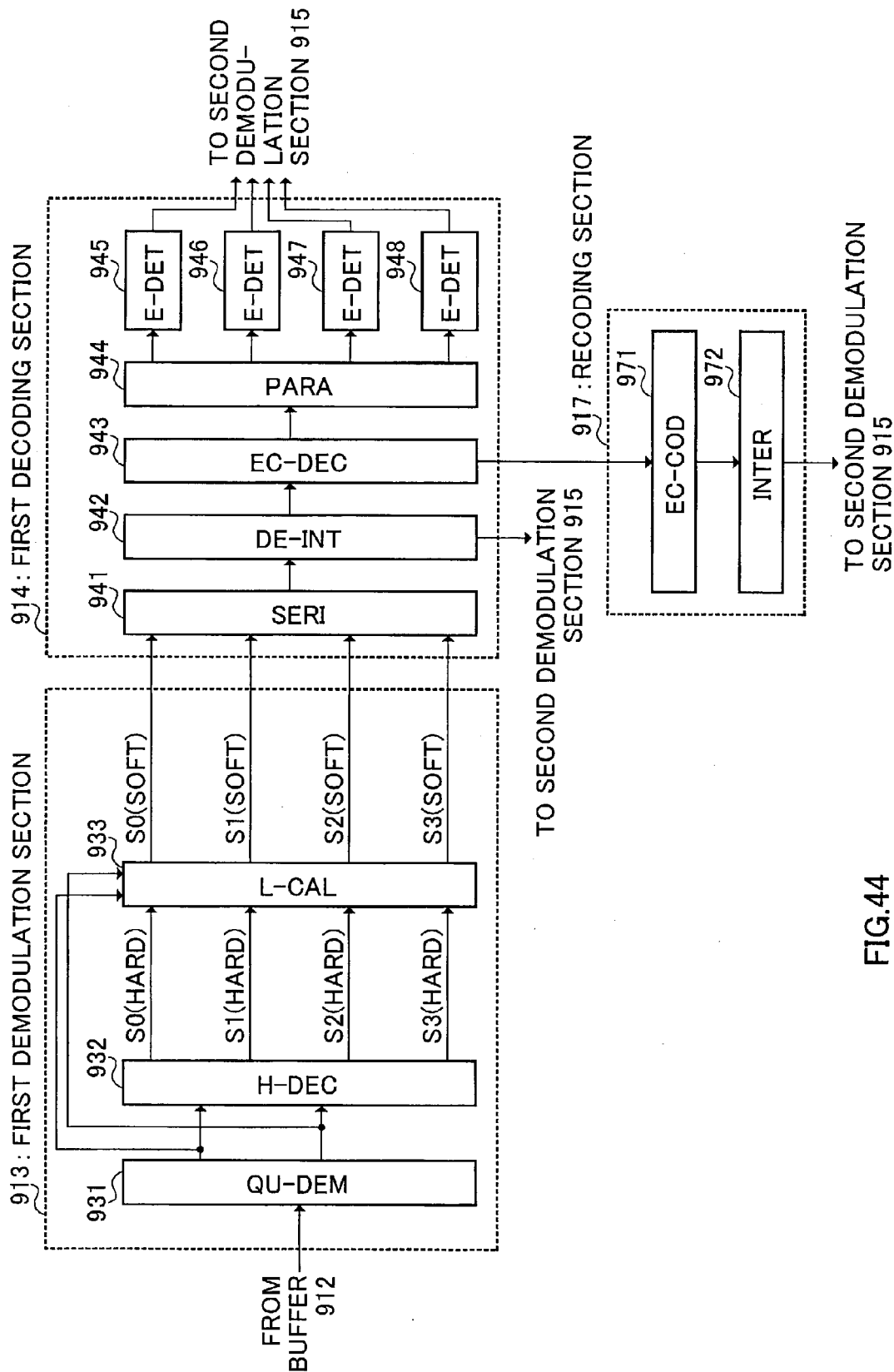
FIG. 44 is a block diagram showing the internal configuration of the first demodulation section, first decoding section, and recoding section of the receiving apparatus shown in FIG. 42.

FIG. 44 is a block diagram showing the internal configuration of the first demodulation section 913, first decoding section 914, and recoding section 917 of the receiving apparatus 910 shown in FIG. 42.

A quadrature demodulation circuit 931 separates a received signal for one symbol output from the buffer 912 into an I signal and Q signal, and outputs these to a hard decision circuit 932 and likelihood calculation circuit 933. The hard decision circuit 932 performs hard decision processing on the received signal and calculates a hard decision value for each bit. The likelihood calculation circuit 933 calculates a likelihood (soft decision value) for each bit based on the hard decision value output from the hard decision circuit 932 and the received signal output from the quadrature demodulation circuit 931. Likelihoods obtained by such calculation are output to a serialization circuit 941 provided in the first decoding section 914.

Soft decision values (likelihoods) obtained for each bit by the likelihood calculation circuit 933 in the first demodulation section 913 are serialized by the serialization circuit 941, and permuted by a de-interleaving circuit 942 in accordance with a predetermined rule corresponding to the permutation rule in the interleaving circuit 928 provided in the transmitting apparatus 900. An error correction decoding circuit 943 performs error correction decoding using the likelihoods output from this de-interleaving circuit 942, and outputs the resulting signal to a parallelization circuit 944 and error correction coding circuit 971. The results of decoding are parallelized into 4 sequences by parallelization circuit 944, and the parallelized decoding results are output to error detection circuits 945 through 948. Error detection circuits 945 through 948 perform error detection independently, and output the results of detection to the second demodulation section 915.

Error correction coding circuit 971 performs error correction coding again of the decoding result output from error correction decoding circuit 943, and outputs the coded bit string to an interleaving circuit 972. Interleaving circuit 972 permutes the coded bit string output from error correction coding circuit 971 in accordance with a predetermined rule. The permuted coded bit string is output to the second demodulation section 915. The predetermined rule used when permuting the data order in interleaving circuit 972 is the same as the rule used by the interleaving circuit 928 provided in the transmitting apparatus 900.

Figure 45:
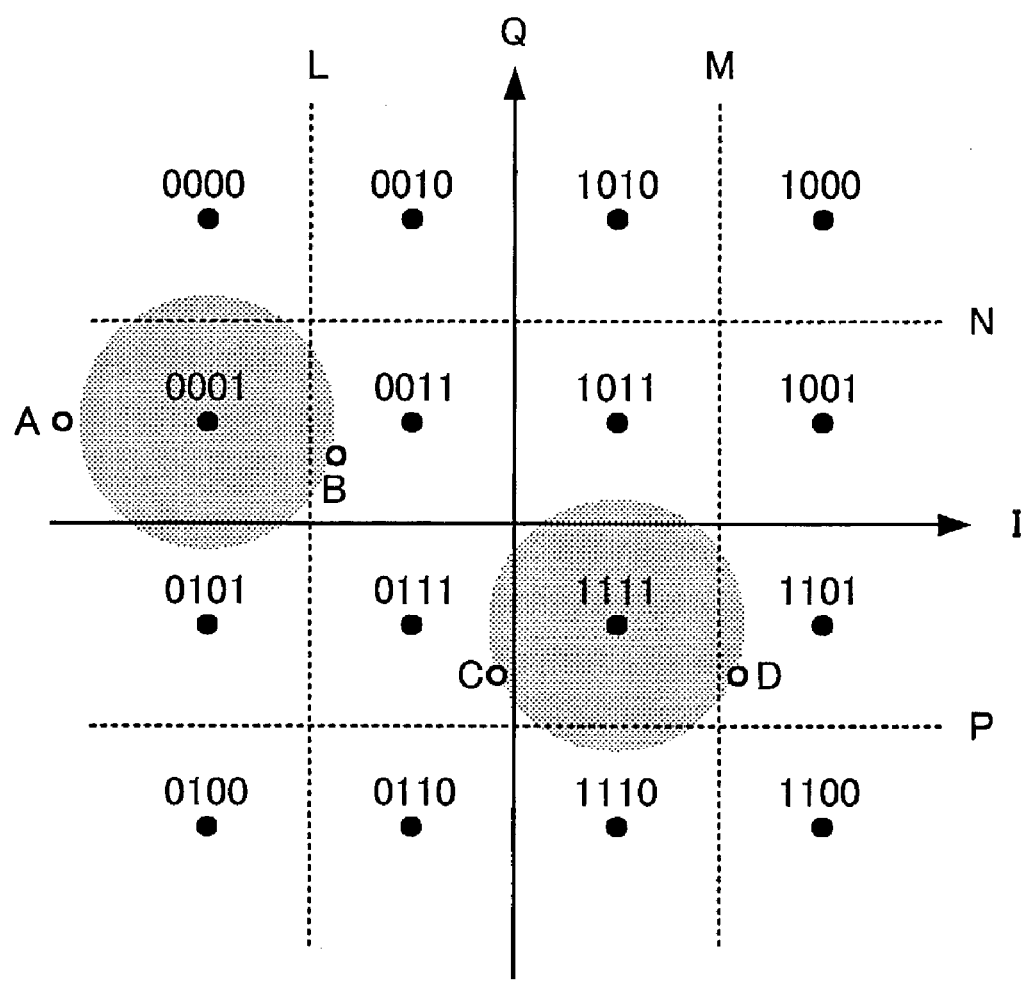
FIG. 45 is a drawing for explaining a 16QAM signal space diagram.

The principle of likelihood modification in this embodiment will now be explained in detail with reference to FIG. 45. FIG. 45 is a drawing for explaining a 16QAM signal space diagram. As shown in this drawing, in 16QAM, 16 signal points are arranged uniformly in the I-Q plane. The 16 signal points are assigned 4-bit values from 0000 to 1111. In this embodiment, the 4-bit values assigned to the signal points are designated, from left to right, "S0", "S1", "S2", and "S3". In 16QAM, "S3" is the least significant bit.

Referring to FIG. 45, with regard to the most significant bit, the distance from a signal point to the decision axis (that is, the Q-axis) is smaller when the third most significant bit is "1" (when S2=1) than when the third most significant bit is "0" (when S2=0). Also, with regard to the second most significant bit, the distance from this signal point to the decision axis is smaller when the fourth most significant bit is "1" than when the fourth most significant bit is "0".

Thus, in this embodiment, the likelihoods of the most significant 2 bits (S0 and S1) are modified in accordance with the values of the least significant 2 bits (S2 and S3). Specifically, when the third most significant bit (S2) is "1", the likelihood of the most significant bit (S0) is modified so as to become smaller, and conversely, when the third most significant bit (S2) is "0", the likelihood of the most significant bit (S0) is modified so as to become larger. Also, when the fourth most significant bit (S3) is "1", the likelihood of the second most significant bit (S1) is modified so as to become smaller, and conversely, when the fourth most significant bit (S3) is "0", the likelihood of the second most significant bit (S1) is modified so as to become larger.

Figure 46:
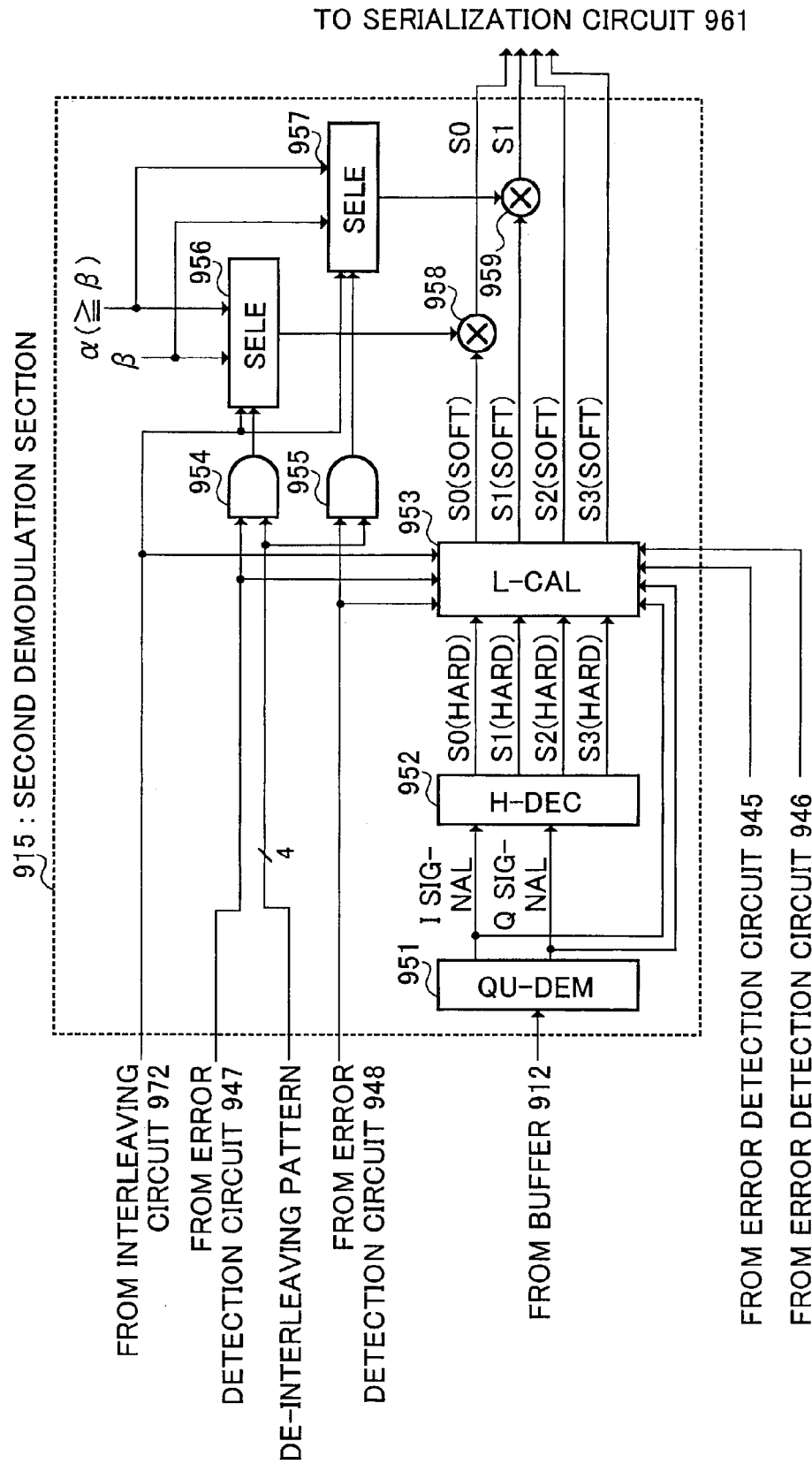
FIG. 46 is a block diagram showing the internal configuration of the second demodulation section of the receiving apparatus shown in FIG. 42.

Next, the internal configuration of the second demodulation section 915 of the receiving apparatus 910 shown in FIG. 42 will be described in detail using FIG. 46.

A quadrature demodulation circuit 951 separates a received signal for one symbol output from the buffer 912 into an I signal and Q signal, and outputs these to a hard decision circuit 952 and likelihood calculation circuit 953. The hard decision circuit 952 performs hard decision processing on the received signal and calculates a hard decision value for each bit. The likelihood calculation circuit 953 calculates candidate likelihoods, and modifies the calculated candidate likelihoods with reference to the error detection results output from the first decoding section 914.

De-interleaving circuit 942 outputs a de-interleaving pattern indicating the data order in the output bit string of that circuit sequentially to AND circuits 954 and 955. For example, if four independent error detection units have been set, de-interleaving circuit 942 outputs "1" to AND circuit 954 at the timing at which S2 is output, and outputs "1" to AND circuit 954 at the timing at which S3 is output. It is here assumed that error detection circuits 947 and 948 output "1" as an error detection result when an error is not detected, and "0" when an error is detected.

AND circuits 954 and 955 calculate the AND of error detection results output from corresponding error detection circuits 947 and 948 and the de-interleaving pattern output from de-interleaving circuit 942, and output the respective calculation results to corresponding selection circuits 956 and 957. That is to say, when an error is not detected by error detection circuit 947 or 948, corresponding AND circuit 954 or 955 outputs "1" at the processing timing for a bit of that error detection unit.

"α" and "β" are input respectively to selection circuits 956 and 957, where $\alpha \geq \beta$. Selection circuits 956 and 957 output "α" to corresponding multipliers 958 and 959 when "1" is output from corresponding AND circuits 954 and 955, and when the value of the least significant 2 bits (S2 and S3) output from interleaving circuit 972 is 0, and output "β" to corresponding multipliers 958 and 959 in other cases.

Multipliers 958 and 959 multiply the output value (that is, "α" or "β") of corresponding selection circuit 956 or 957 by the likelihood of S0 or S1 output from likelihood calculation circuit 953. The multiplication results are output to a serialization circuit 961 provided in the second decoding section 916.

Figure 47:
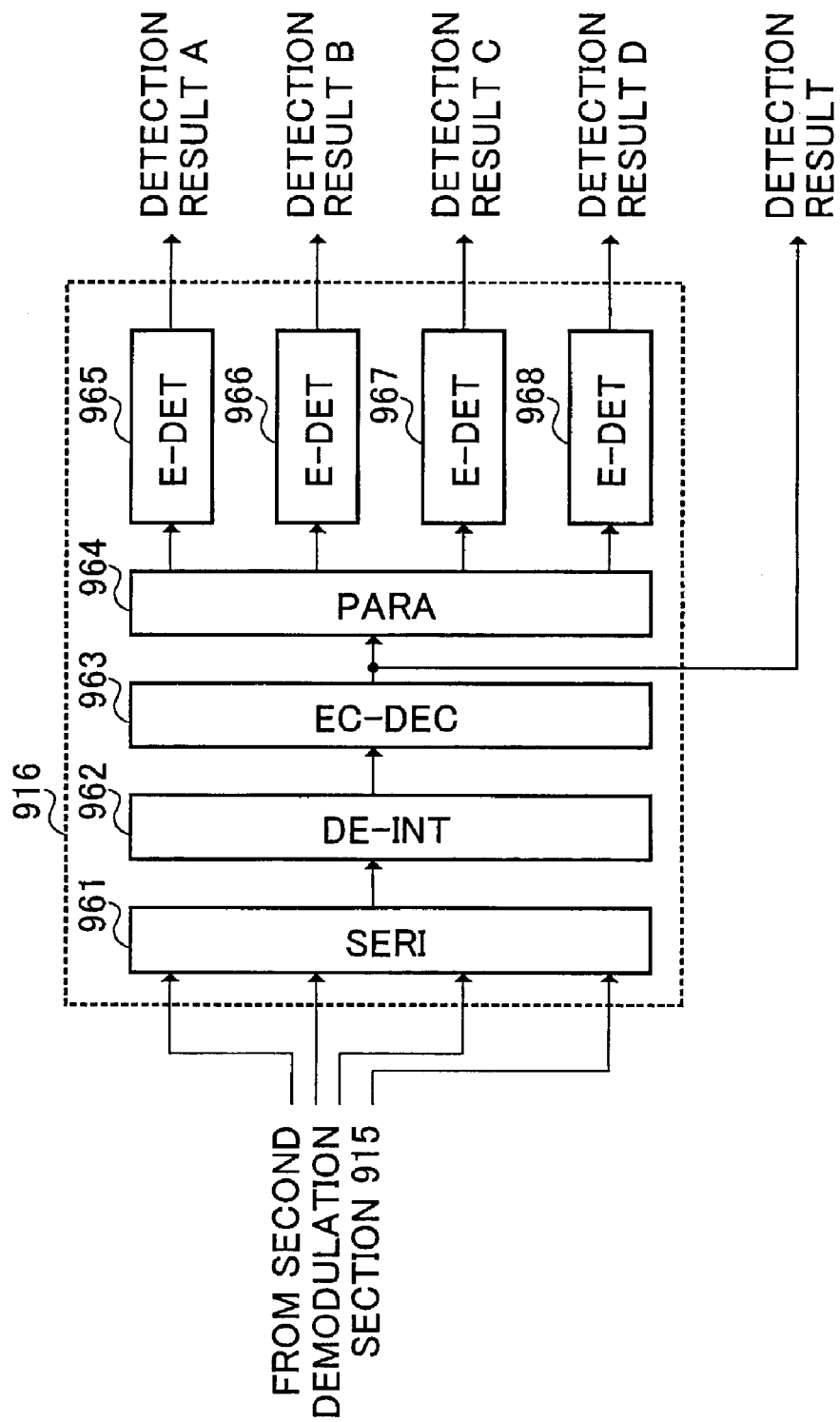
FIG. 47 is a block diagram showing the internal configuration of the second decoding section of the receiving apparatus shown in FIG. 42.

FIG. 47 is a block diagram showing the internal configuration of the second decoding section 916 of the receiving apparatus 910 shown in FIG. 42.

The recalculated likelihoods (soft decision values) are serialized by the serialization circuit 961, and are permuted in a de-interleaving circuit 962 in accordance with a predetermined rule corresponding to the permutation rule in the interleaving circuit 928 provided in the transmitting apparatus 900. An error correction decoding circuit 963 performs error correction decoding using the likelihoods output from this de-interleaving circuit 962. Decoding results are parallelized into 4 sequences by a parallelization circuit 964, and the parallelized decoding results are output to error detection circuits 965 through 968 respectively.

Thus, in a receiving apparatus according to this embodiment, a likelihood for which there is a predetermined relationship to a bit for which an error is not detected is made larger. Specifically, when an error is not detected for the third most significant bit and its value is "1", the likelihood of the most significant bit is made larger; and when an error is not detected for the fourth most significant bit and its value is "1", the likelihood of the second most significant bit is made larger. By this means it is possible, in 16QAM, to obtain the likelihoods of the most significant 2 bits with greater precision when an error is not detected in the least significant 2 bits.

(Embodiment 17)

Embodiment 17 of the present invention is a variant of Embodiment 16, differing from Embodiment 16 in that the presence or absence of error correction is detected for the most significant 2 bits, and if error correction has been performed, the likelihoods of the least significant 2 bits are modified.

The principle of likelihood modification in this embodiment will now be explained, again referring to FIG. 45. Referring to FIG. 45, a characteristic of 16QAM is that, when the most significant bit is determined erroneously, that received signal point is located near the Q-axis, as in the case of point C, for example. If a signal that should be determined as "1111" is received at point C, the most significant bit is determined erroneously. However, when a received signal point is near the Q-axis, that received signal point is very far from the L-axis and M-axis, which are the decision axes for the third most significant bit, and therefore an error is unlikely to occur in the third most significant bit.

Also, when the second most significant bit is determined erroneously, that received signal point is located near the I-axis. However, when a received signal point is near the I-axis, that received signal point is very far from the N-axis and P-axis, which are the decision axes for the fourth most significant bit, and therefore an error is unlikely to occur in the fourth most significant bit.

Thus, in 16QAM, there is an error tolerance correlational relationship between bits in the same symbol such that, when the most significant bit is susceptible to error (that is, when the error tolerance of the most significant bit is low), an error is unlikely to occur in the third most significant bit (that is, the error tolerance of the third most significant bit is high). Furthermore, there is an error tolerance correlational relationship between bits in the same symbol such that, when the second most significant bit is susceptible to error (that is, when the error tolerance of the second most significant bit is low), an error is unlikely to occur in the fourth most significant bit (that is, the error tolerance of the fourth most significant bit is high).

Moreover, a bit that has been subjected to error correction was erroneous prior to error correction, and therefore is likely to have been received near a decision axis.

Thus, in this embodiment, the presence or absence of error correction is detected for the most significant 2 bits by comparing the bits prior to error correction decoding with the bits after error correction decoding, and a positive value is added to the calculated likelihoods if error correction has been performed, since the least significant 2 bits will be close to "1" in this case.

In Embodiment 16, a procedure was described whereby the likelihoods of the most significant 2 bits are modified when an error has not been detected in the least significant 2 bits, but the likelihood modification in Embodiment 16 essentially employs the above-described error tolerance correlational relationship between bits in the same symbol in 16QAM.

Figure 48:
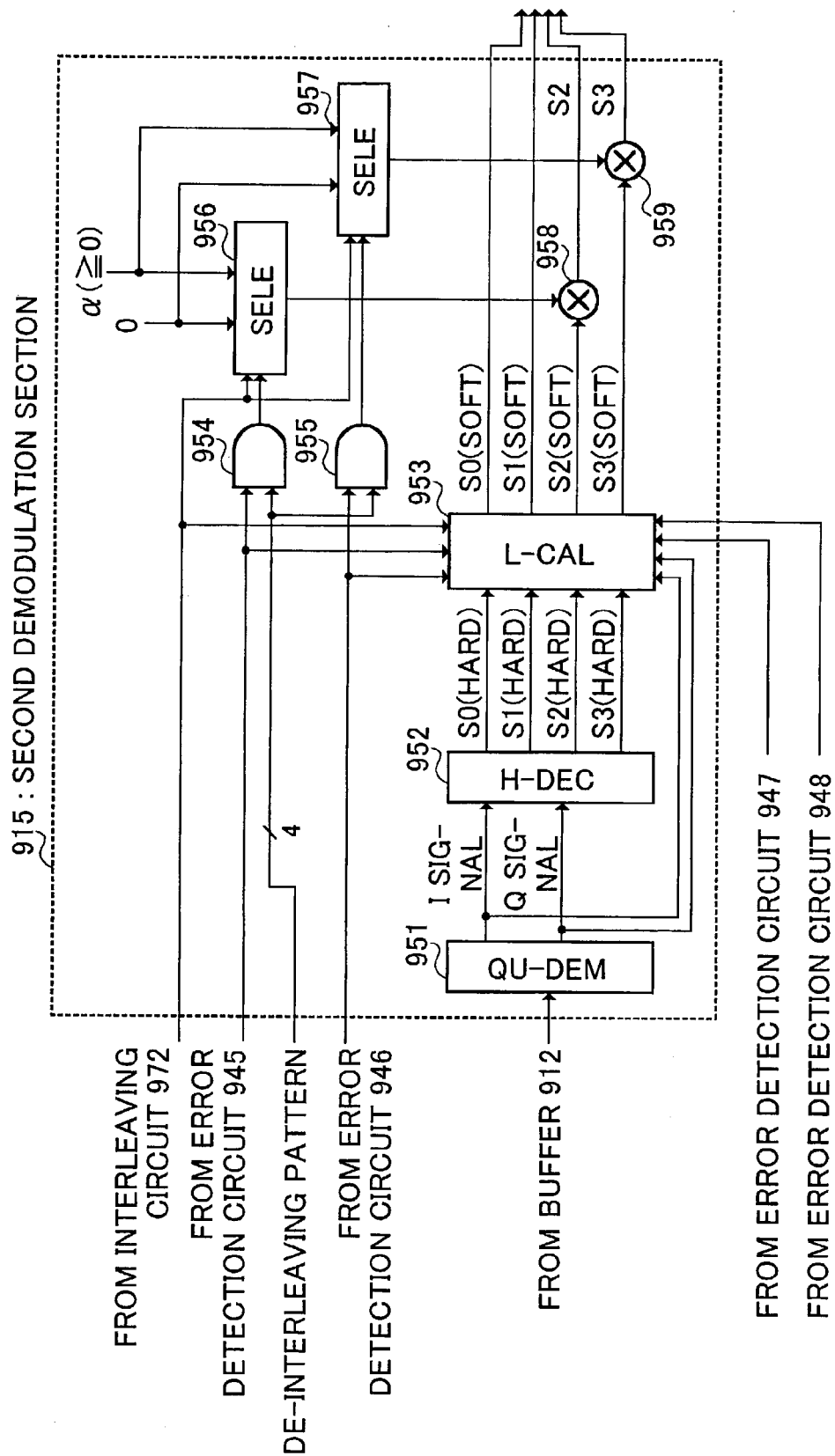
FIG. 48 is a block diagram showing the configuration of the second demodulation section of a receiving apparatus of a radio communication system according to Embodiment 17 of the present invention.

FIG. 48 is a block diagram showing the configuration of the second demodulation section 915 of a receiving apparatus of a radio communication system according to Embodiment 17 of the present invention. Parts in FIG. 48 identical to those in FIG. 46 are assigned the same codes as in FIG. 46 and their detailed explanations are omitted.

A de-interleaving circuit 942 outputs a de-interleaving pattern indicating the data order in the output bit string of that circuit sequentially to AND circuits 954 and 955. For example, if four independent error detection units have been set, de-interleaving circuit 942 outputs "1" to AND circuit 954 at the timing at which S0 is output, and outputs "1" to AND circuit 954 at the timing at which S1 is output. It is here assumed that error detection circuits 947 and 948 output "1" as an error detection result when an error is not detected, and "0" when an error is detected.

AND circuits 954 and 955 calculate the AND of error detection results output from corresponding error detection circuits 947 and 948 and the de-interleaving pattern output from de-interleaving circuit 942, and output the respective calculation results to corresponding selection circuits 956 and 957. That is to say, when an error is not detected by error detection circuit 945 or 946, corresponding AND circuit 954 or 955 outputs "1" at the processing timing for a bit of that error detection unit.

"α" and "0" are input respectively to selection circuits 956 and 957. Selection circuits 956 and 957 output "α" to corresponding multipliers 958 and 959 when "1" is output from corresponding AND circuits 954 and 955, and when the value of the most significant 2 bits (S0 and S1) output from interleaving circuit 972 is 0, and output "0" to corresponding multipliers 958 and 959 in other cases.

Multipliers 958 and 959 multiply the output value (that is, "α" or "0") of corresponding selection circuit 956 or 957 by the likelihood of S2 or S3 output from likelihood calculation circuit 953. The multiplication results are output to a serialization circuit 961 provided in the second decoding section 916.

Thus, according to this embodiment, the relationship between the most significant 2 bits and least significant 2 bits in 16QAM is considered, and the likelihoods of the least significant 2 bits are modified by adding a positive value to the likelihoods of the least significant 2 bits when error correction has been performed on the most significant 2 bits. By this means, likelihoods can be calculated more accurately, enabling error correction capability to be improved.

(Embodiment 18)

Embodiment 18 of the present invention is a variant of Embodiment 1, differing from Embodiment 1 in that, in the first decoding section 114, a replica is generated using bits for which an error has not been detected, and demodulation is performed after interference waves are suppressed by subtracting the replica from the received signal.

Figure 49:
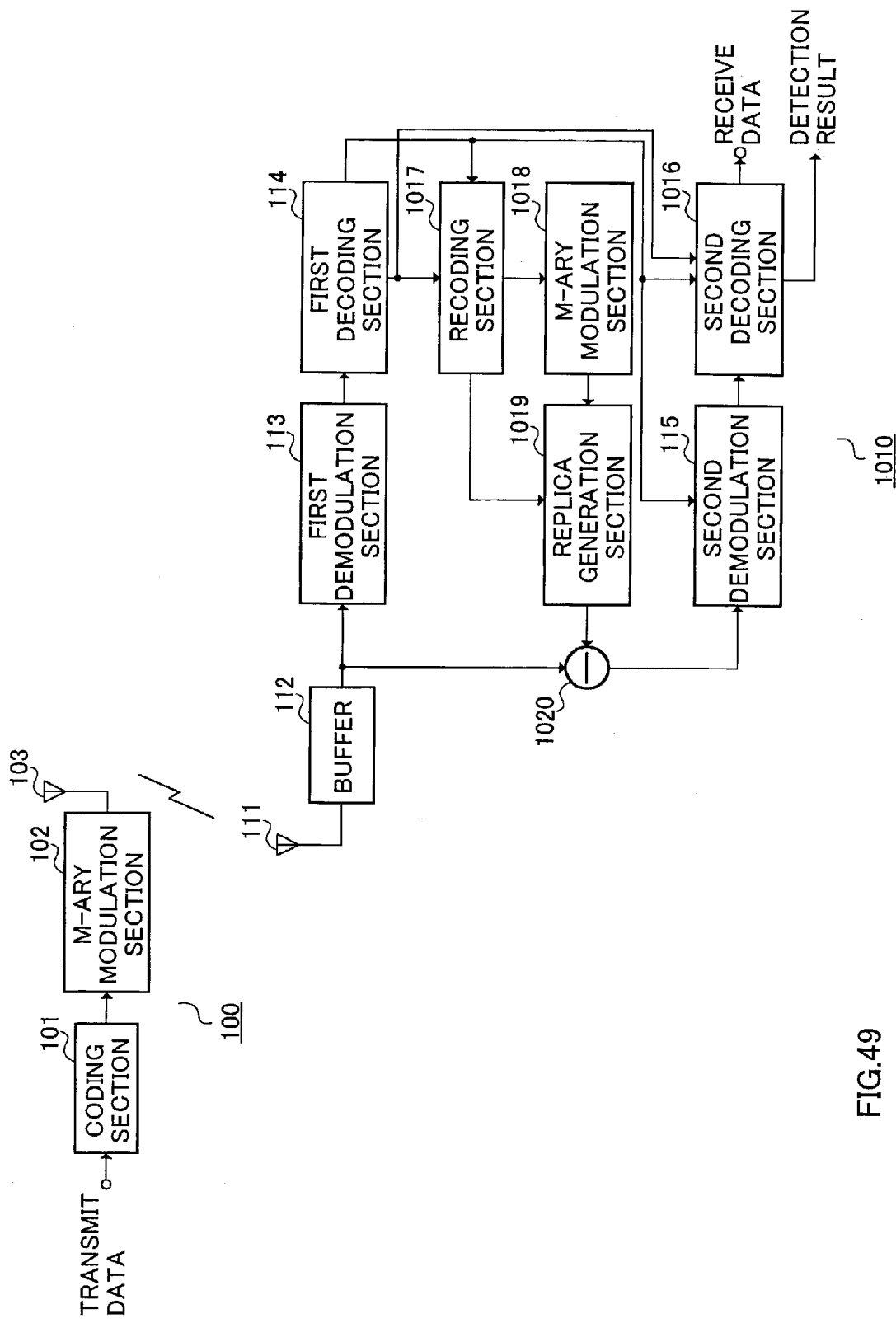
FIG. 49 is a block diagram showing the configuration of a radio communication system according to Embodiment 18 of the present invention.

FIG. 49 is a block diagram showing the configuration of a radio communication system according to Embodiment 18 of the present invention. In the radio communication system shown in FIG. 49, radio communications are performed between a transmitting apparatus 100 and receiving apparatus 1010. Parts in FIG. 49 identical to those in FIG. 1 are assigned the same codes as in FIG. 1 and their detailed explanations are omitted. The receiving apparatus 1010 in FIG. 49 has a configuration in which a recoding section 1017, M-ary modulation section 1018, replica generation section 1019, and adder 1020 have been added to the receiving apparatus 110 shown in FIG. 1. Also, in receiving apparatus 1010, the internal configuration of the second decoding section 1016 differs from that of the second decoding section 116 shown in FIG. 1.

The recoding section 1017 codes again data that has been decoded by a first decoding section 114, and outputs the resulting data to the M-ary modulation section 1018. M-ary modulation section 1018 generates a symbol by executing the same modulation processing as M-ary modulation section 102 in the transmitting apparatus 100, and outputs the generated symbol to the replica generation section 1019. In this embodiment, 8PSK modulation is performed in M-ary modulation section 102, and therefore 8PSK modulation is also performed in M-ary modulation section 1018.

For a symbol input to the replica generation section 1019, only bits for which an error was not detected are arranged in M-ary modulation section 1018. The replica generation section 1019 generates a replica of bits for which an error was not detected by multiplying a symbol output from M-ary modulation section 1018 by an impulse response (channel estimate).

The adder 1020 subtracts the replica generated by the replica generation section 1019 from the received signal output from a buffer 112. A second demodulation section 115 decodes the output signal from the adder 1020.

Figure 50:
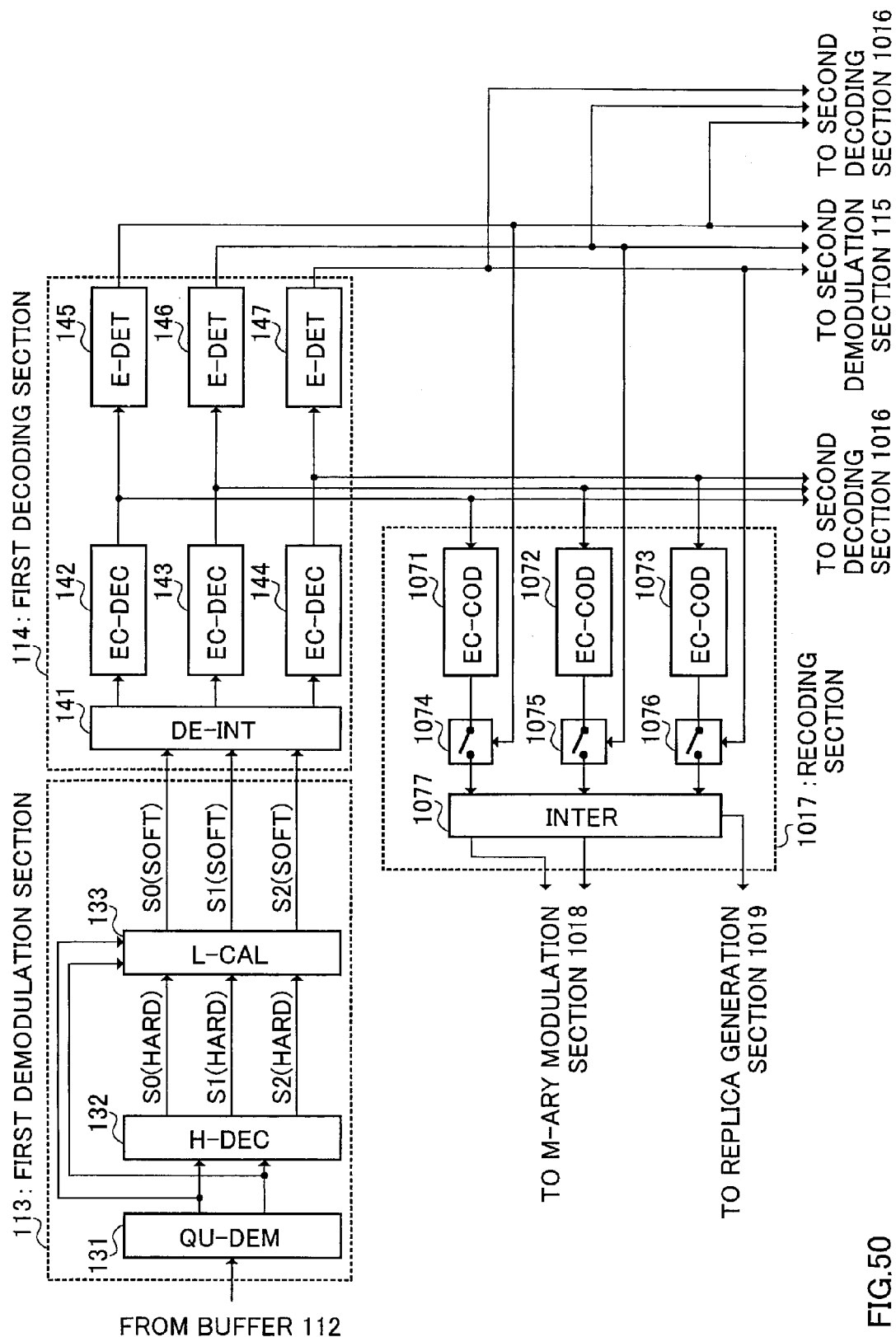
FIG. 50 is a block diagram showing the internal configuration of the first demodulation section, first decoding section, and recoding section of the receiving apparatus shown in FIG. 49.
Figure 51:
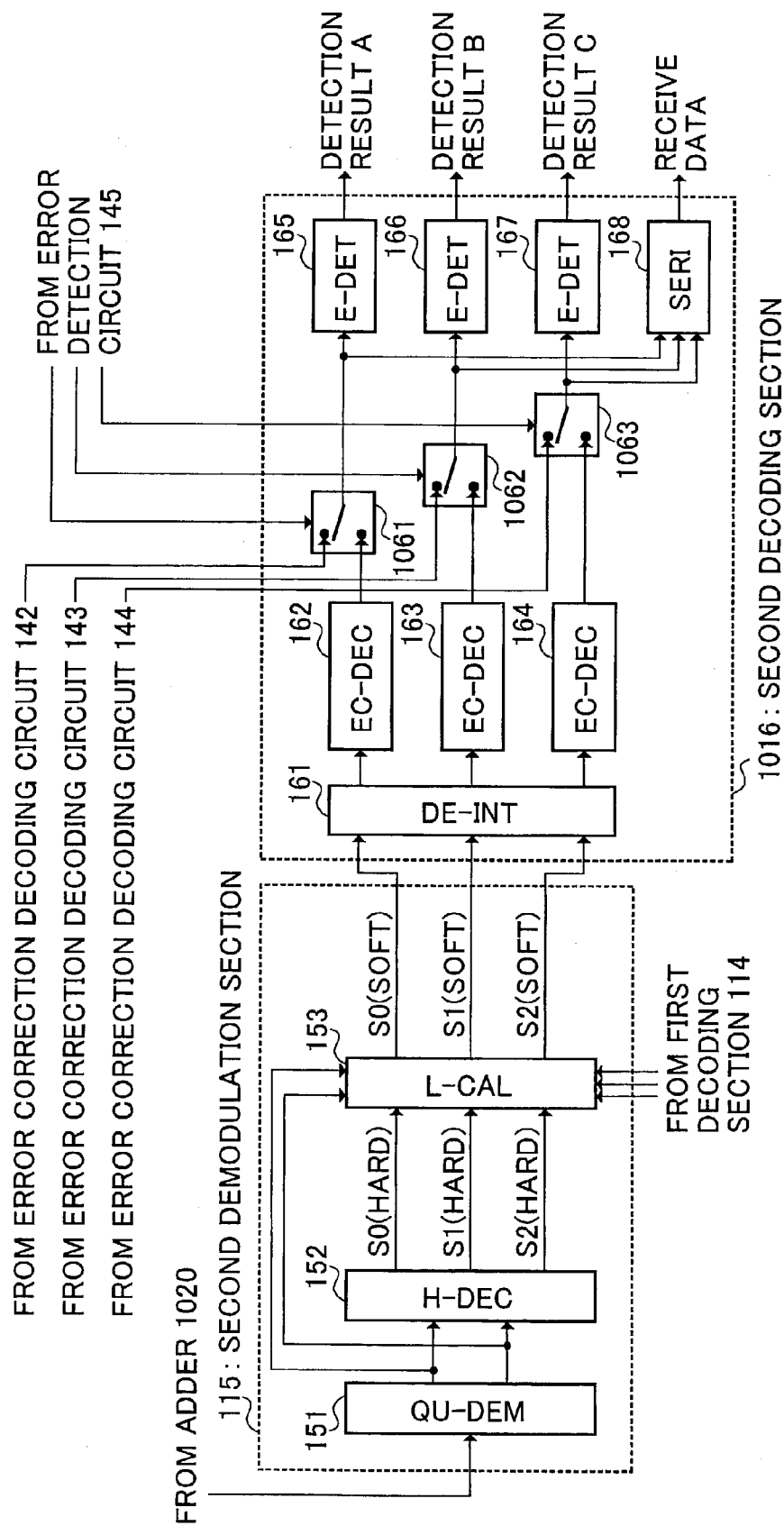
FIG. 51 is a block diagram showing the internal configuration of the second demodulation section and second decoding section of the receiving apparatus shown in FIG. 49.

FIG. 50 is a block diagram showing the internal configuration of the first demodulation section 113, first decoding section 114, and recoding section 1017 shown in FIG. 49. FIG. 51 is a block diagram showing the internal configuration of the second demodulation section 115 and second decoding section 1016 shown in FIG. 49. Parts in FIG. 50 and FIG. 51 identical to those in FIG. 3 or FIG. 4 are assigned the same codes as in FIG. 3 or FIG. 4 and their detailed explanations are omitted.

Error correction decoding circuits 142 through 144 output error correction decoding results to corresponding error correction coding circuits 1071 through 1073, switching circuits 1061 through 1063, and switching circuits 1074 through 1076.

Error correction coding circuits 1071 through 1073 perform error correction coding again of decoding results output from corresponding error correction decoding circuits 142 through 144, and output coded bit strings to corresponding switching circuits 1074 through 1076. Switching circuits 1074 through 1076 refer to error detection results output from corresponding error detection circuits 145 through 147, and perform output to an interleaving circuit 1077 for bits for which an error was not detected.

The interleaving circuit 1077 again permutes input bit strings for bits for which an error was not detected, in accordance with a predetermined rule, and outputs the results to M-ary modulation section 1018. The interleaving circuit 1077 also outputs a signal indicating a symbol for which a replica is to be generated to the replica generation section 1019.

Error correction decoding circuits 162 through 164 in the second decoding section 1016 perform error correction decoding of bits after de-interleaving. Of the decoding results of error correction decoding circuits 162 through 164, corresponding switching circuits 1061 through 1063 output only bits for which an error was not detected in corresponding error correction decoding circuits 142 through 144 to error detection circuits 165 through 167 and a serialization circuit 168.

In a conventional communication system in which a data stream undergoes error correction coding before M-ary modulation, a replica cannot be generated unless detection of an error-free status is possible for all the bits composing a symbol. In this embodiment, on the other hand, as explained above, it is possible to generate a replica only for bits for which an error is not detected. Then, if an error is not detected in even one bit, interference energy can be reduced by subtracting the replica of bits for which an error is not detected from the received signal.

Figure 52A:
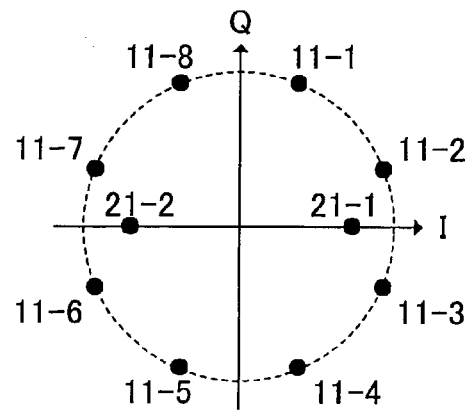
FIG. 52A is a signal arrangement diagram showing received signals, replicas, and signals after replica elimination of a receiving apparatus according to Embodiment 18 of the present invention.
Figure 52B:
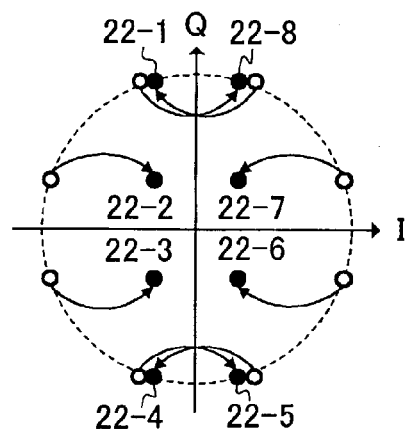
FIG. 52B is a signal arrangement diagram showing received signals, replicas, and signals after replica elimination of a receiving apparatus according to Embodiment 18 of the present invention.
Figure 53A:
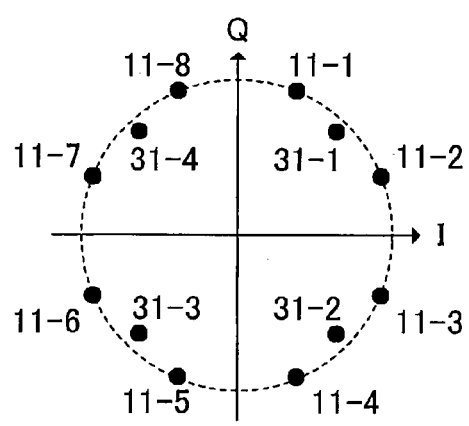
FIG. 53A is a signal arrangement diagram showing received signals, replicas, and signals after replica elimination of a receiving apparatus according to Embodiment 18 of the present invention.
Figure 53B:
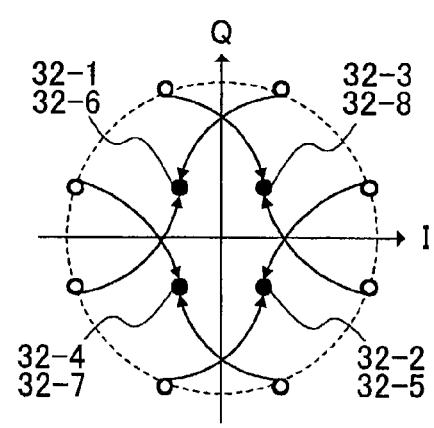
FIG. 53B is a signal arrangement diagram showing received signals, replicas, and signals after replica elimination of a receiving apparatus according to Embodiment 18 of the present invention.
Figure 54A:
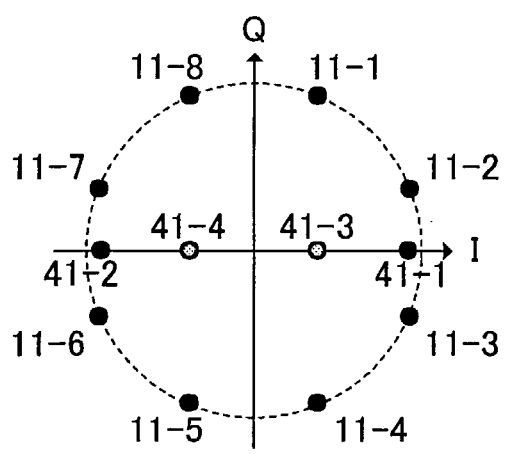
FIG. 54A is a signal arrangement diagram showing received signals, replicas, and signals after replica elimination of a receiving apparatus according to Embodiment 18 of the present invention.
Figure 54B:
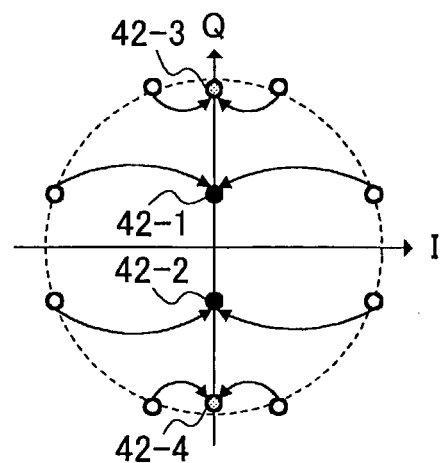
FIG. 54B is a signal arrangement diagram showing received signals, replicas, and signals after replica elimination of a receiving apparatus according to Embodiment 18 of the present invention.

FIG. 52 through FIG. 54 are signal arrangement diagrams for explaining the above. FIG. 52A and FIG. 52B show a case where an error is not detected for S0 only, FIG. 53A and FIG. 53B show a case where an error is not detected for S0 and S1, and FIG. 54A and FIG. 54B show a case where an error is not detected for S0 and S2. FIG. 52A, FIG. 53A, and FIG. 54A show received signals and replicas in 8PSK, and FIG. 52B, FIG. 53B, and FIG. 54B are signal arrangement diagrams showing signals after replicas have been subtracted from received signals in 8PSK.

In FIG. 52A, FIG. 53A, and FIG. 54A, signal points 11-1 through 11-8 indicate a received signal. Signal points 12-1 and 12-2 in FIG. 52A, signal points 31-1 through 31-4 in FIG. 53A, and signal points 41-1 through 41-4 in FIG. 54A, indicate replicas. In the case of FIG. 54, there are two replica possibilities-signal points 41-1 and 41-2, and signal points 41-3 and 41-4-according to S2, with a rather high probability of signal points 41-1 and 41-2 being the case.

Signal points 22-1 through 22-8 in FIG. 52B, signal points 32-1 through 32-8 in FIG. 53B, and signal points 42-1 through 42-4 in FIG. 54B indicate signals after replicas have been subtracted from received signals.

In FIGS. 52 through 54, the average symbol power, which is the root-mean-square of the distance from the origin to a signal point, is approximately 0.57 times, approximately 0.15 times, and approximately 0.15 times (in the case of signal points 42-1 and 42-2) or 0.85 times (in the case of signal points 42-3 and 42-4) on a before-and-after replica elimination basis.

Thus, according to this embodiment, interference can be effectively suppressed by generating a replica only for bits for which an error is not detected, and subtracting the replicas from the received signal. Demodulation processing can then be performed with high precision by carrying out demodulation processing based on the received signal in which interference has been suppressed.

Provision is made for interference power to be lowest when a replica is generated. This is equivalent to providing for average symbol power to be minimized. In order to consider such a replica, the least squares method is used. The least squares method is shown in Equation (1) below.

$$A = \frac{1}{N} \sum_{X=1}^{N} |S(X) - R|^2 \qquad \text{Equation (1)}$$

$$\frac{\partial A}{\partial R} = 0$$

In Equation (1), S(X) is a candidate signal, R is a replica, and N is the number of S (X)'s. When the average power after subtracting R for all S(X)'s that can conceivably be obtained is calculated, and a replica R is obtained such that this is differentiated and becomes 0, the real part thereof is the mean value of the real part of candidate S(X), and the imaginary part of the replica is the mean value of the imaginary part of candidate S(X).

For example, in FIG. 52A, if S0 is confirmed to be to the left of the Q-axis, the mean value of the 4 points to the left of the Q-axis is the optimal replica. Similarly, if S0 and S2 are confirmed as in FIG. 54A, there are 2 candidate points, and the mean value of the 2 points is the optimal replica. The above method of determining the optimal replica is the same for any kind of modulation method.

Figure 55:
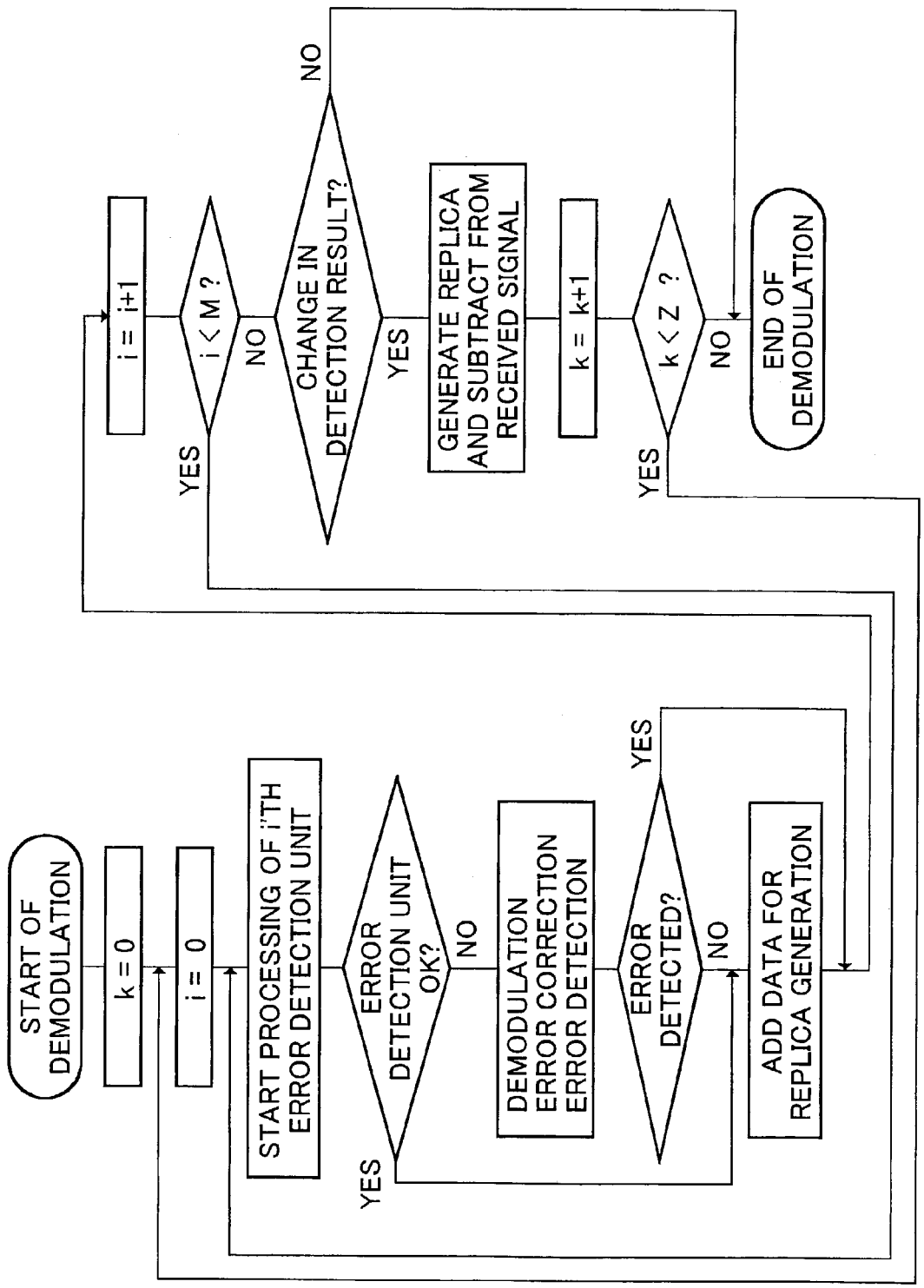
FIG. 55 is a flow chart showing the flow of a reception method of a receiving apparatus according to Embodiment 18 of the present invention.

Also, in the stage prior to subtracting a replica, there are cases where an error is corrected by subtracting a replica within a signal in which an error is detected. In such cases, interference power can be further reduced, and error correction coding capability improved, by generating a replica again after adding newly obtained bits for which an error was not detected, and performing demodulation again after subtracting this from the received signal. If there is a limit to the amount of computation, this may be discontinued after a certain number of times. The flow of this reception method is shown in the flowchart in FIG. 55. In FIG. 55, k indicates the number of repetitions, i indicates the error detection unit number, M indicates the total number of error detection units, and Z indicates the maximum number of repetitions.

Figure 56:
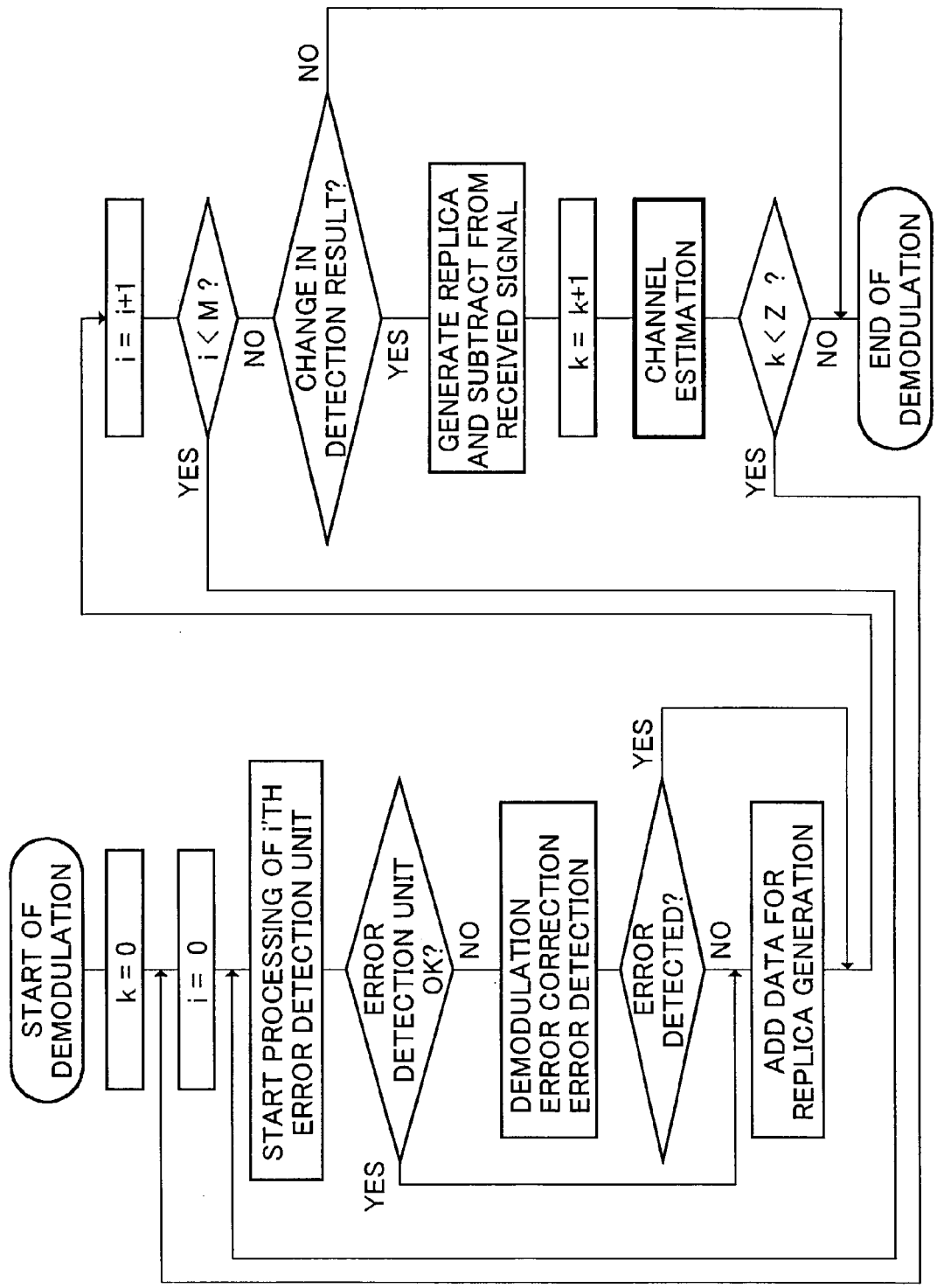
FIG. 56 is a flowchart showing the flow of a reception method of a receiving apparatus according to Embodiment 18 of the present invention.

By being able to reduce interference power by replica subtraction, when a pilot symbol is within the range of that interference, channel estimate precision is improved by performing channel estimation using the pilot symbol after replica subtraction. Capability can then be further improved by performing channel estimation and updating the channel estimate each time replica subtraction is performed. The flow of this reception method is shown in FIG. 56. In FIG. 56, a channel estimation function is added to the functions in FIG. 55, and whereas channel estimation is performed once only before the start of the processing flow in FIG. 55, in FIG. 56 channel estimation is also performed within the processing flow loop. In FIG. 56, k indicates the number of repetitions, i indicates the error detection unit number, M indicates the total number of error detection units, and Z indicates the maximum number of repetitions.

This embodiment can also be applied to modulation methods other than 8PSK. The case where this embodiment is applied to 16QAM is described below. When 16QAM is used, each block in FIG. 49 through FIG. 50 has 4 sequences.

Figure 57A:
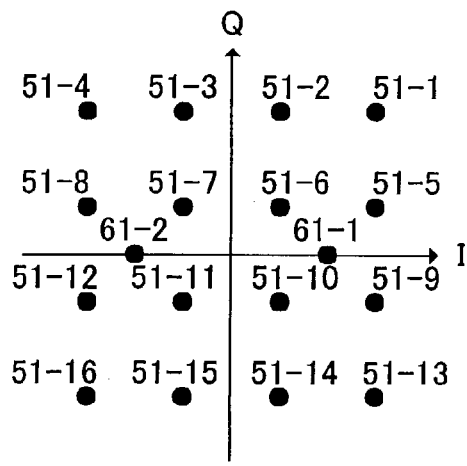
FIG. 57A is a signal arrangement diagram showing received signals, replicas, and signals after replica elimination of a receiving apparatus according to Embodiment 18 of the present invention.
Figure 57B:
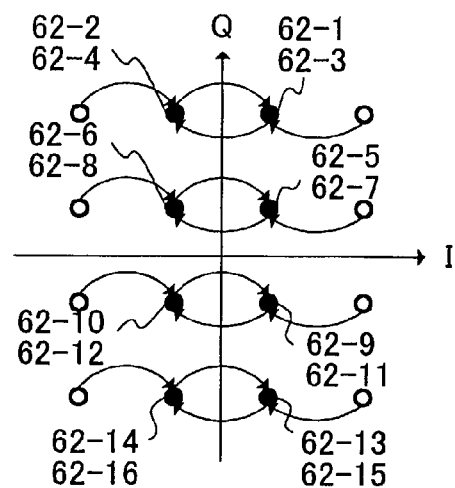
FIG. 57B is a signal arrangement diagram showing received signals, replicas, and signals after replica elimination of a receiving apparatus according to Embodiment 18 of the present invention.
Figure 58A:
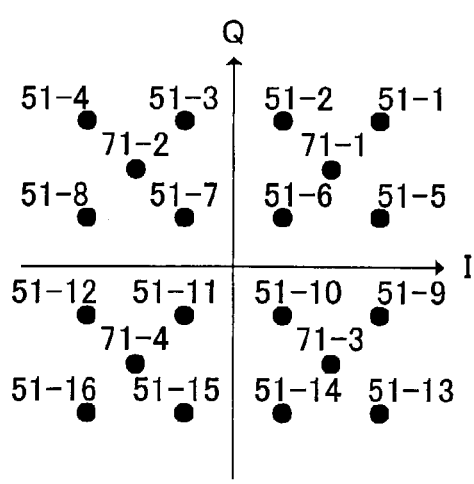
FIG. 58A is a signal arrangement diagram showing received signals, replicas, and signals after replica elimination of a receiving apparatus according to Embodiment 18 of the present invention.
Figure 58B:
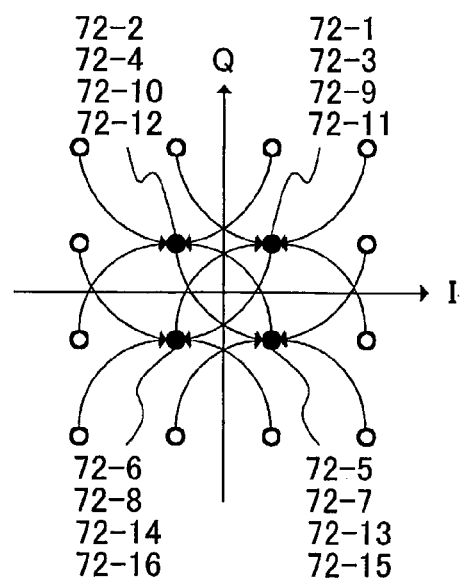
FIG. 58B is a signal arrangement diagram showing received signals, replicas, and signals after replica elimination of a receiving apparatus according to Embodiment 18 of the present invention.
Figure 59A:
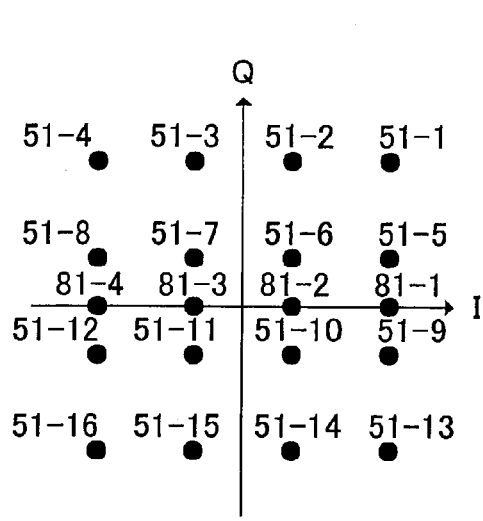
FIG. 59A is a signal arrangement diagram showing received signals, replicas, and signals after replica elimination of a receiving apparatus according to Embodiment 18 of the present invention.
Figure 59B:
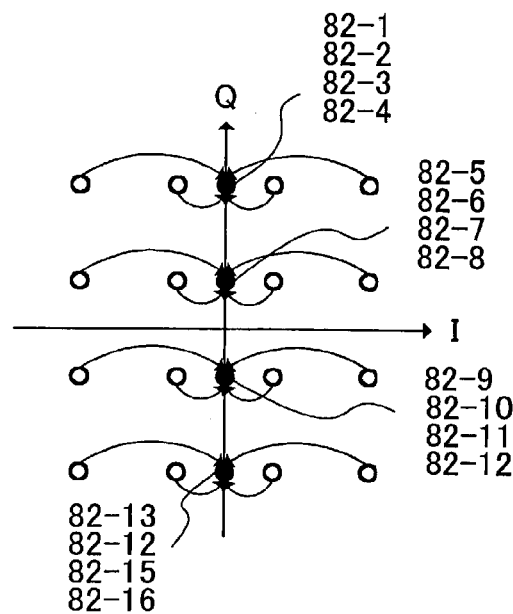
FIG. 59B is a signal arrangement diagram showing received signals, replicas, and signals after replica elimination of a receiving apparatus according to Embodiment 18 of the present invention.
Figure 60A:
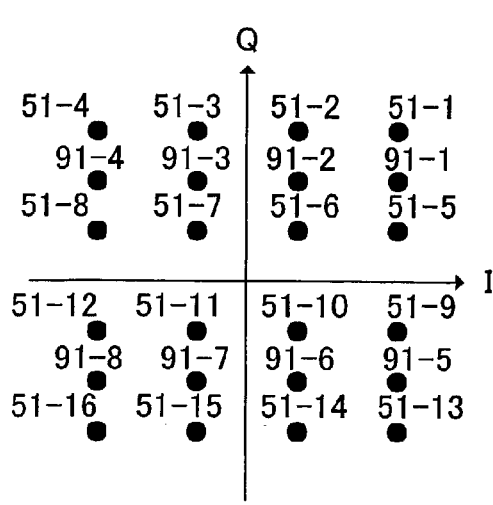
FIG. 60A is a signal arrangement diagram showing received signals, replicas, and signals after replica elimination of a receiving apparatus according to Embodiment 18 of the present invention.
Figure 60B:
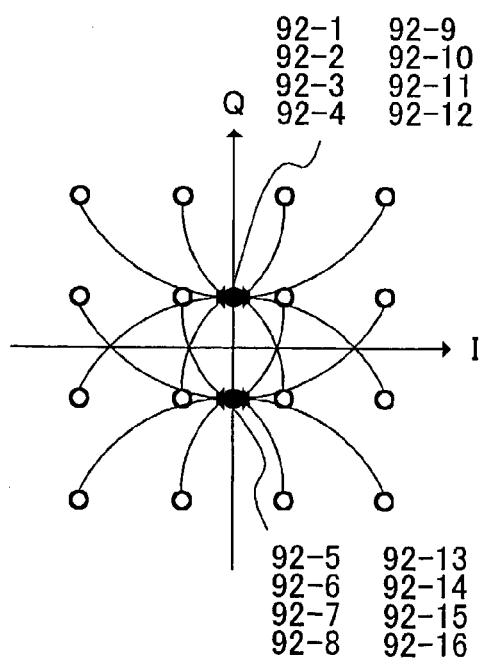
FIG. 60B is a signal arrangement diagram showing received signals, replicas, and signals after replica elimination of a receiving apparatus according to Embodiment 18 of the present invention.

FIG. 57 through FIG. 60 are signal arrangement diagrams for 16QAM. FIG. 57 shows a case where an error is not detected for S0 only, FIG. 58 shows a case where an error is not detected for S0 and S1, FIG. 59 shows a case where an error is not detected for S0 and S2, and FIG. 60 shows a case where an error is not detected for S0, S1, and S2. FIG. 57A, FIG. 58A, FIG. 59A, and FIG. 60A show receive signals and replicas in 16QAM, and FIG. 57B, FIG. 58B, FIG. 59B, and FIG. 60B are signal arrangement diagrams showing signals after replicas have been subtracted from received signals in 16QAM.

In FIG. 57A, FIG. 58A, FIG. 59A, and FIG. 60A, signal points 51-1 through 51-16 indicate a received signal. Signal points 61-1 and 61-2 in FIG. 57A, signal points 71-1 through 71-4 in FIG. 58A, signal points 81-1 through 81-4 in FIG. 59A, and signal points 91-1 through 91-8 in FIG. 60A indicate replicas.

Signal points 62-1 through 62-16 in FIG. 57B, signal points 72-1 through 72-16 in FIG. 58B, signal points 82-1 through 82-16 in FIG. 59B, and signal points 92-1 through 92-16 in FIG. 60B indicate signals after replicas have been subtracted from received signals.

In FIGS. 57 through 60, the average symbol power, which is the root-mean-square of the distance from the origin to a signal point, is 0.6 times, 0.2 times, 0.5 times, and 0.1 times on a before-and-after replica elimination basis.

(Embodiment 19)

Embodiment 19 of the present invention is a variant of Embodiment 18, differing from Embodiment 18 in that path combining is performed when receiving.

Figure 61:
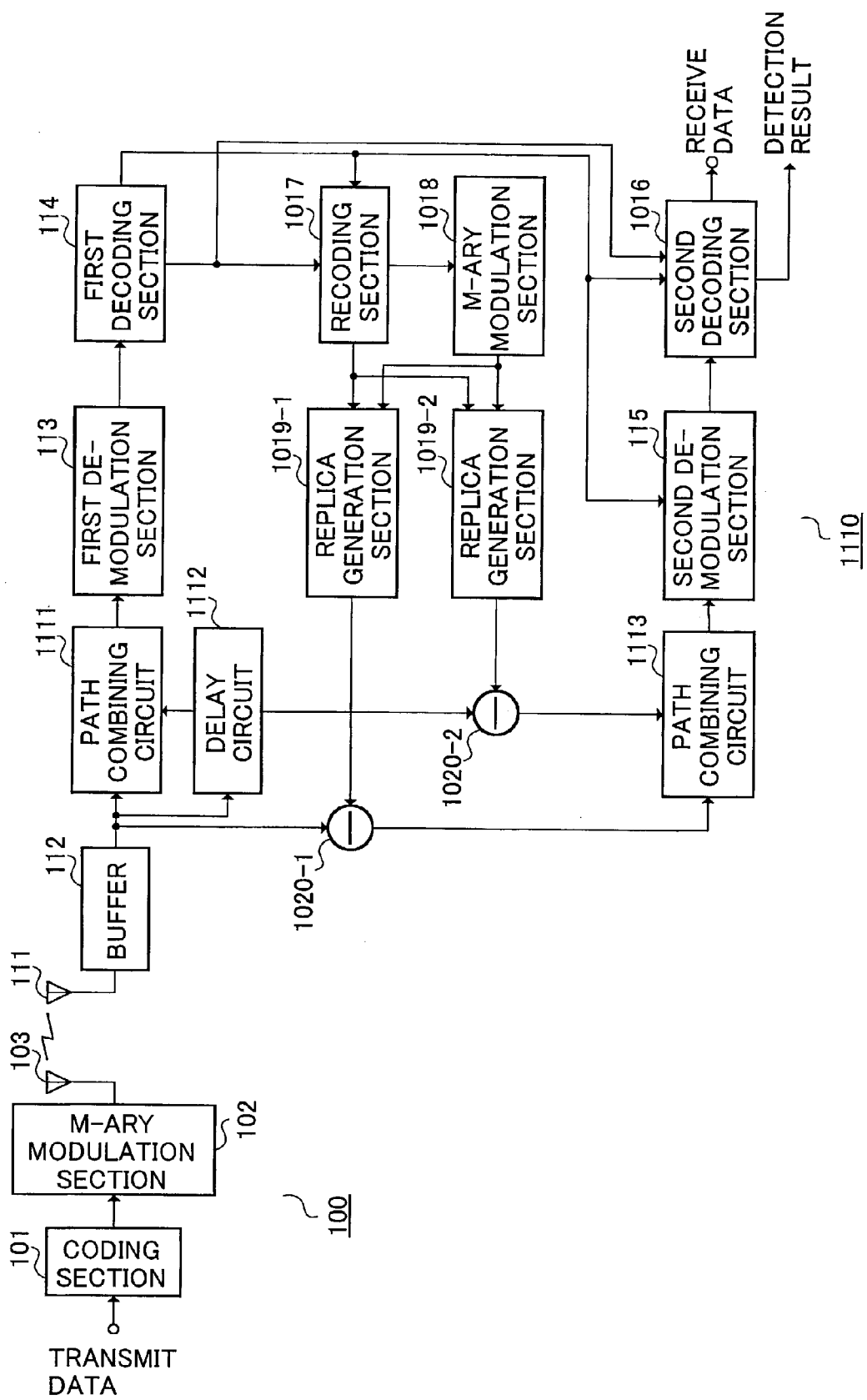
FIG. 61 is a block diagram showing the configuration of a radio communication system according to Embodiment 19 of the present invention.

FIG. 61 is a block diagram showing the configuration of a radio communication system according to Embodiment 19 of the present invention. In the radio communication system shown in FIG. 61, radio communications are performed between a transmitting apparatus 100 and receiving apparatus 1110. Parts in FIG. 61 identical to those in FIG. 49 are assigned the same codes as in FIG. 49 and their detailed explanations are omitted. The receiving apparatus 1110 in FIG. 61 has a configuration in which a path combining circuit 1111, delay circuit 1112, and path combining circuit 1113 have been added to the receiving apparatus 1010 shown in FIG. 49. The configuration of receiving apparatus 1110 also includes a replica generation section 1019 and two adders 1020.

Path combining circuit 1111 performs path combining of the main wave of a received signal output from a buffer 112 and a delayed wave output from delay circuit 1112. Replica generation circuit 1019-1 generates a replica for the main wave based on the output signal from an M-ary modulation section 1018, and replica generation circuit 1019-2 generates a replica for the delayed wave based on the output signal from M-ary modulation section 1018.

Adder 1020-1 subtracts the delayed wave replica generated by replica generation circuit 1019-1 from the main wave output from the buffer 112, and outputs the result to path combining circuit 1113. Adder 1020-2 subtracts the delayed wave replica generated by replica generation circuit 1019-2 from the delayed wave output from the buffer 112, and outputs the result to path combining circuit 1113. Path combining circuit 1113 combines the output signals from adders 1020-1 and 1020-2, and outputs the resulting signal to a second demodulation section 115.

Thus, according to this embodiment, when reception is performed by combining a plurality of paths, replicas are generated for the respective paths, and in each path, only replicas of paths other than the relevant path, among the generated replicas, are subtracted from the received signal. By this means, it is possible to prevent the determination rule in quadrature demodulation from being changed unintentionally by subtracting the replica of a path itself. Suppressing interference by subtracting replicas of mutually different paths from received signals, and combining the received signals of the paths in which interference has been suppressed in this way, enables reception quality to be improved.

(Embodiment 20)

Embodiment 20 of the present invention is a variant of Embodiment 18, differing from Embodiment 18 in that a replica is generated also using bits for which an error was detected.

Figure 62:
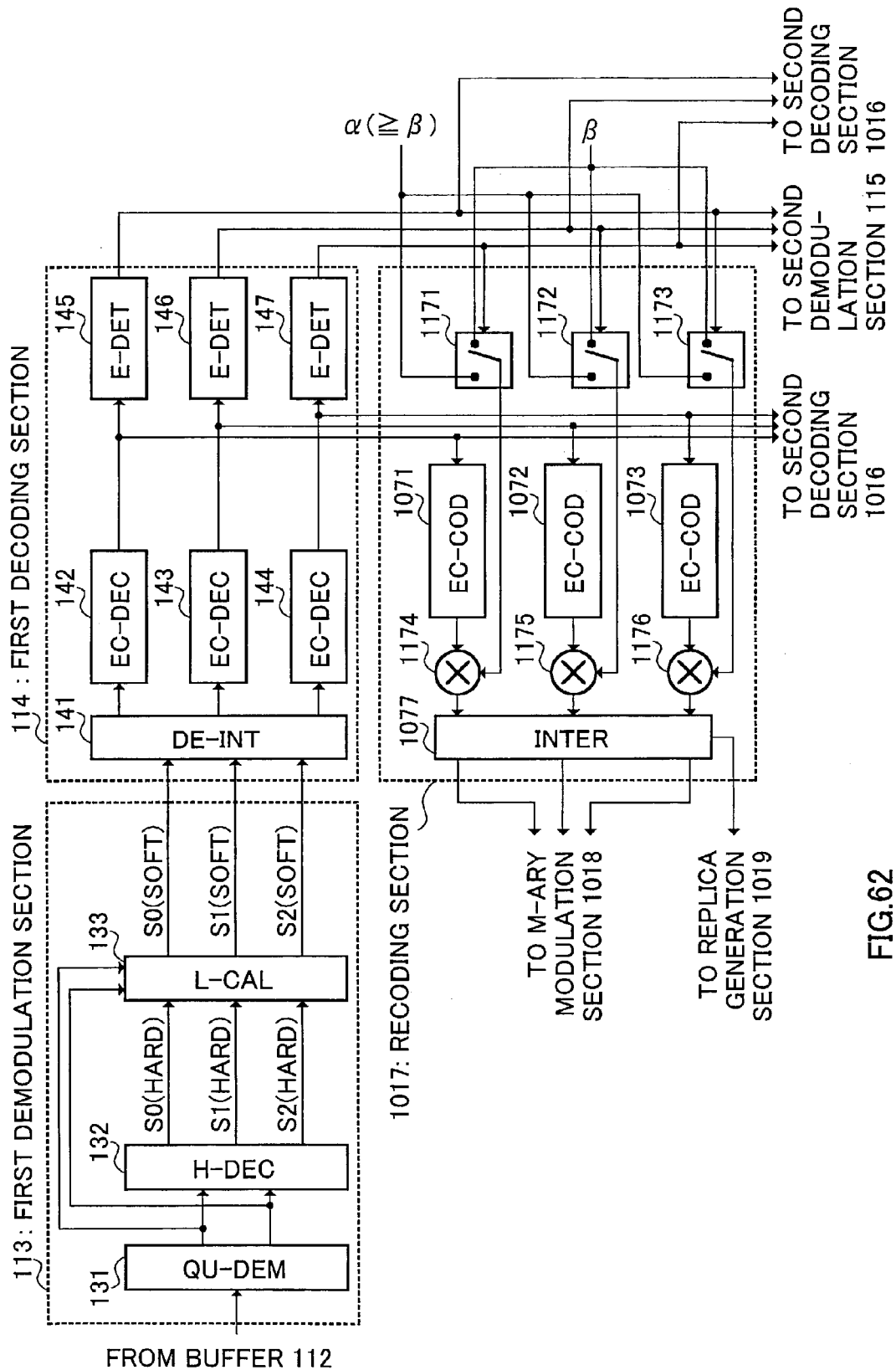
FIG. 62 is a block diagram showing the internal configuration of the first demodulation section, first decoding section, and recoding section of a receiving apparatus of a radio communication system according to Embodiment 20 of the present invention.

FIG. 62 is a block diagram showing the internal configuration of the first demodulation section 113, first decoding section 114, and recoding section 1017 of a receiving apparatus of a radio communication system according to Embodiment 20 of the present invention. Parts in FIG. 62 identical to those in FIG. 50 are assigned the same codes as in FIG. 50 and their detailed explanations are omitted.

When an error is not detected in an error detection circuit 145 through 147, corresponding switching circuit 1171 through 1173 outputs "α" to corresponding multiplier 1174 through 1176. When, on the other hand, an error is detected in an error detection circuit 145 through 147, corresponding switching circuit 1171 through 1173 outputs "β" to corresponding multiplier 1174 through 1176. Here, $\alpha \geq \beta$.

A multiplier 1174 through 1176 multiplies the output value from corresponding switching circuit 1171 through 1173 by the output bit from corresponding error correction coding circuit 1071 through 1073. By this means, multipliers 1174 through 1176 assign a weight according to whether or not there is an error in the coded bit strings generated by error correction coding circuits 1071 through 1073.

(Embodiment 21)

In Embodiments 18 through 20, if there is a bit for which an error is not detected in one symbol, a replica can be generated using that, and bits for which errors have been corrected are generated by subtracting the replica from the received signal. If more bit errors are corrected, a more accurate replica can be generated, and if this is repeated, many bit errors can be corrected.

Consequently, when a quality difference is assigned beforehand in an error detection unit in a transmitting apparatus, high-quality bits are decoded virtually error-free, and by generating a replica and subtracting it from the received signal, sequential errors can be expected to be corrected for low-quality bits too, and overall error correction capability can be improved. Therefore, assigning a quality difference beforehand to a plurality of error detection unit signals is extremely effective in improving error correction capability. Embodiment 21 describes a case where a quality difference is assigned beforehand to a plurality of error detection unit signals.

Figure 63:
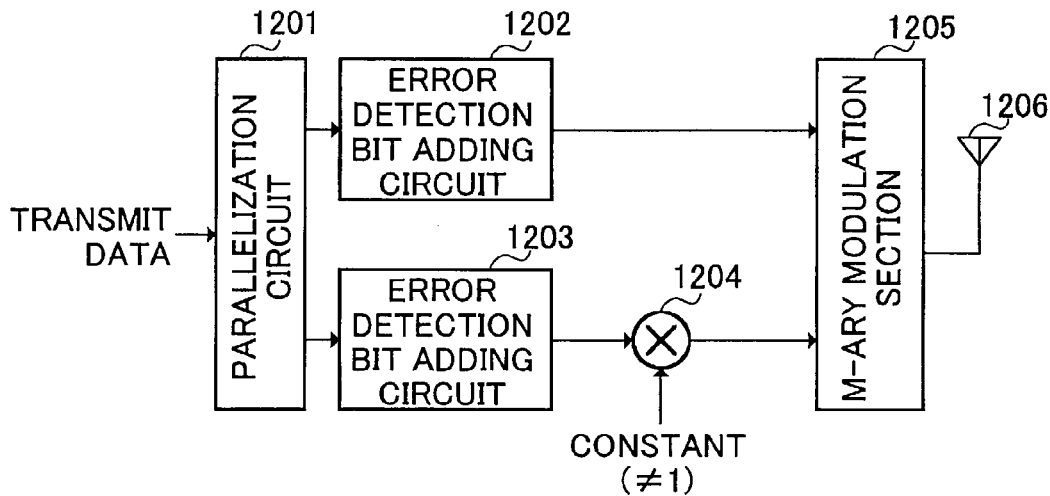
FIG. 63 is a block diagram showing a configuration of a transmitting apparatus according to Embodiment 21 of the present invention.

FIG. 63 is a block diagram showing a configuration of a transmitting apparatus according to Embodiment 21 of the present invention, and illustrates a case where a quality difference is assigned according to transmission power. In FIG. 63, transmit data is first input to a parallelization circuit 1201. The parallelization circuit 1201 parallelizes transmit data into two sequences, which it outputs to error detection bit adding circuits 1202 and 1203. Error detection bit adding circuits 1202 and 1203 add error detection bits to input bits from the parallelization circuit 1201 for each predetermined error detection unit. A multiplier 1204 amplifies the coded bit string output from error detection bit adding circuit 1202, and assigns a quality difference with respect to error detection bit adding circuit 1203. An M-ary modulation section 1205 performs M-ary modulation of the coded bit strings output from error detection bit adding circuit 1202 and the multiplier 1204, executes predetermined radio transmission processing, such as up-conversion and frequency conversion, on the modulated signal, and performs radio transmission of the resulting signal from an antenna 1206. By means of the above configuration, it is possible to assign a quality difference to transmit data according to transmission power.

Figure 64:
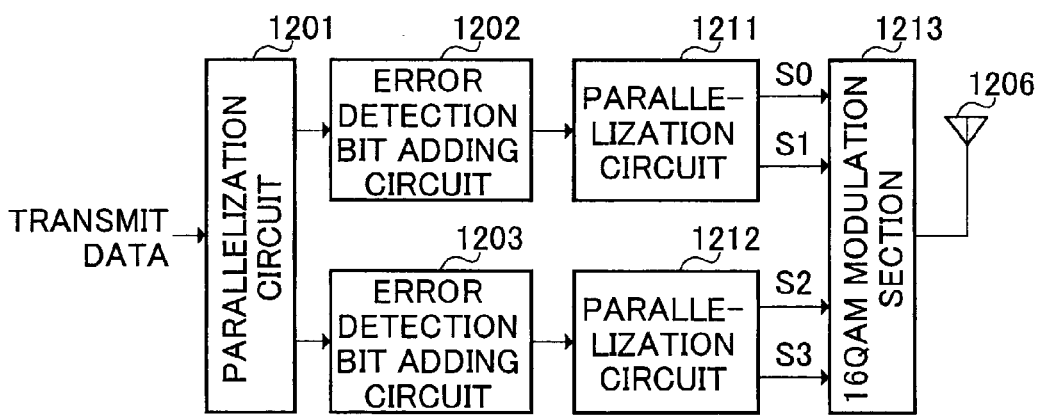
FIG. 64 is a block diagram showing a configuration of a transmitting apparatus according to Embodiment 21 of the present invention.

Here, when a modulation method such as 16QAM or 8PSK is used in which quality differs on a bit-by-bit basis, quality differs originally for each bit. FIG. 64 is a block diagram showing a configuration of a transmitting apparatus according to Embodiment 21 of the present invention, illustrating a case where signals of different error detection units are allocated to the high-order bits (S0, S1) and low-order bits (S2, S3) in 16QAM.

Parts in FIG. 64 identical to those in FIG. 63 are assigned the same codes as in FIG. 63 and their detailed explanations are omitted. A parallelization circuit 1211 parallelizes the high-order bits (S0, S1) of the coded bit string output from error detection bit adding circuit 1202 into two sequences, which it outputs to a 16QAM modulation section 1213. A parallelization circuit 1212 parallelizes the low-order bits (S2, S3) of the coded bit string output from error detection bit adding circuit 1203 into two sequences, which it outputs to the 16QAM modulation section 1213. The 16QAM modulation section 1213 modulates the coded bit strings output from parallelization circuit 1211 and parallelization circuit 1212 to 16QAM, executes predetermined radio transmission processing, such as up-conversion and frequency conversion, on the modulated signal, and performs radio transmission of the resulting signal from the antenna 1206.

In this case, quality is better for the error detection unit signals allocated to the high-order bits, and demodulation is possible to a certain degree for high-order bits even when using a channel estimate of poor precision, and in conditions in which there is major multipath interference. As long as an error is not detected in an error detection unit with high-order bits, replica generation is possible using this, and consequently there is also a possibility of error-free demodulation of bits in an error detection unit with low-order bits.

Figure 65:
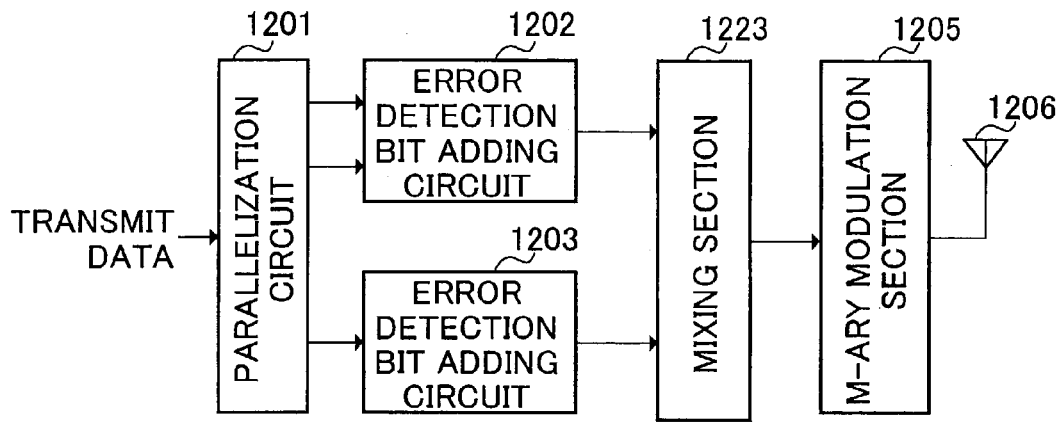
FIG. 65 is a block diagram showing a configuration of a transmitting apparatus according to Embodiment 21 of the present invention.

Also, the larger the error detection unit, the greater is the possibility of an error being detected, and a quality difference can be assigned for each error detection unit by setting up a plurality of error detection unit sizes. FIG. 65 is a block diagram showing a configuration of a transmitting apparatus according to Embodiment 21 of the present invention, illustrating a case where a quality difference is assigned by setting up a plurality of error detection unit sizes. Parts in FIG. 65 identical to those in FIG. 63 are assigned the same codes as in FIG. 63 and their detailed explanations are omitted.

In FIG. 65, error detection bit adding circuits 1221 and 1222 add error detection bits to input bits from the parallelization circuit 1201 for each predetermined error detection unit. However, the number of bits input to error detection bit adding circuit 1221 is twice the number of bits input to error detection bit adding circuit 1222. Therefore, bits input to error detection bit adding circuit 1222 have a lower probability of an error being detected. A mixing section 1223 mixes coded bit strings output from error detection bit adding circuit 1221 and error detection bit adding circuit 1222, and outputs the resulting bit string to the M-ary modulation section 1205. By means of the above configuration, it is possible to assign a quality difference to transmit data according to the error detection size.

Figure 66:
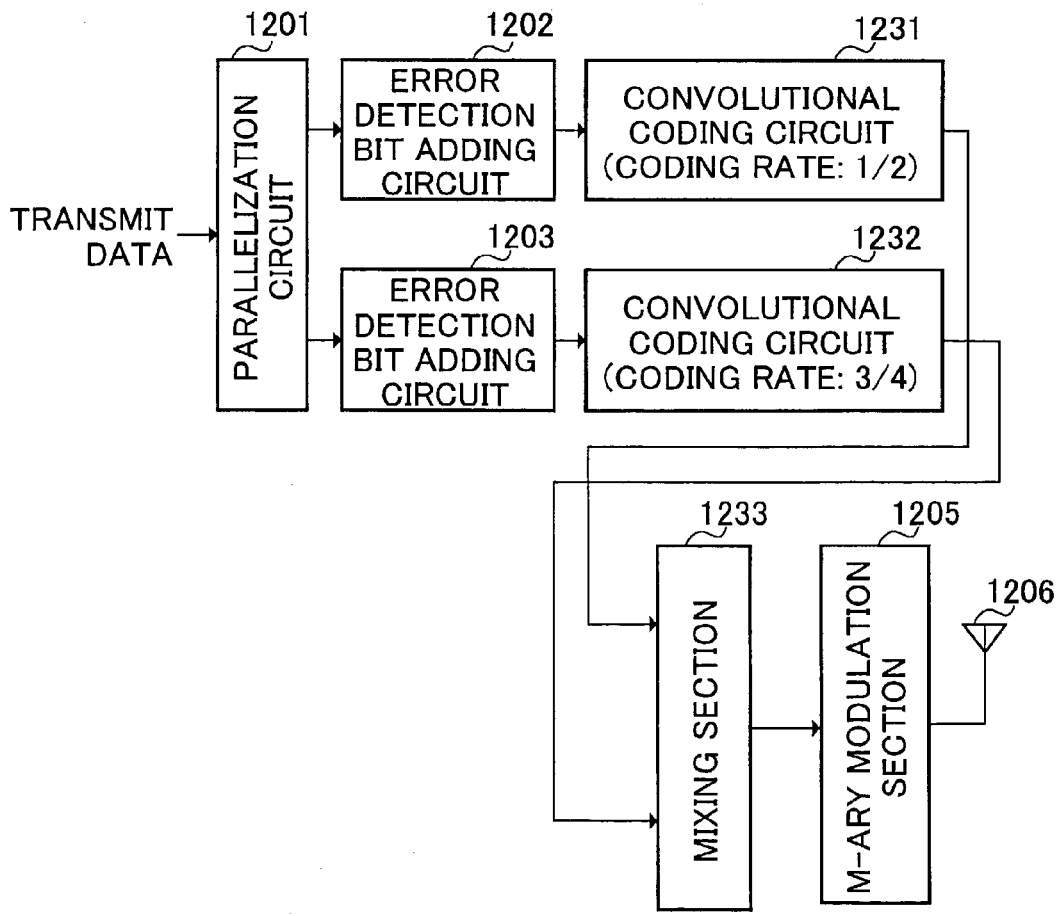
FIG. 66 is a block diagram showing a configuration of a transmitting apparatus according to Embodiment 21 of the present invention.

Also, in error correction coding processing, it is possible to assign a quality difference for each error detection unit according to the coding rate and code selection method. FIG. 66 is a block diagram showing a configuration of a transmitting apparatus according to Embodiment 21 of the present invention, illustrating a case where a quality difference is assigned according to the coding rate and code selection method. Parts in FIG. 66 identical to those in FIG. 63 are assigned the same codes as in FIG. 63 and their detailed explanations are omitted.

In FIG. 66, a convolutional coding circuit 1231 performs convolutional coding with a coding rate of 1/2 on the coded bit string output from error detection bit adding circuit 1202, and a convolutional coding circuit 1232 performs convolutional coding with a coding rate of 3/4 on the coded bit string output from error detection bit adding circuit 1203. The quality of convolutional coding circuit 1231 is therefore better than that of convolutional coding circuit 1232 since its coding rate is smaller. By means of the above configuration, it is possible to assign a quality difference by changing the coding rate for transmit data.

Figure 67:
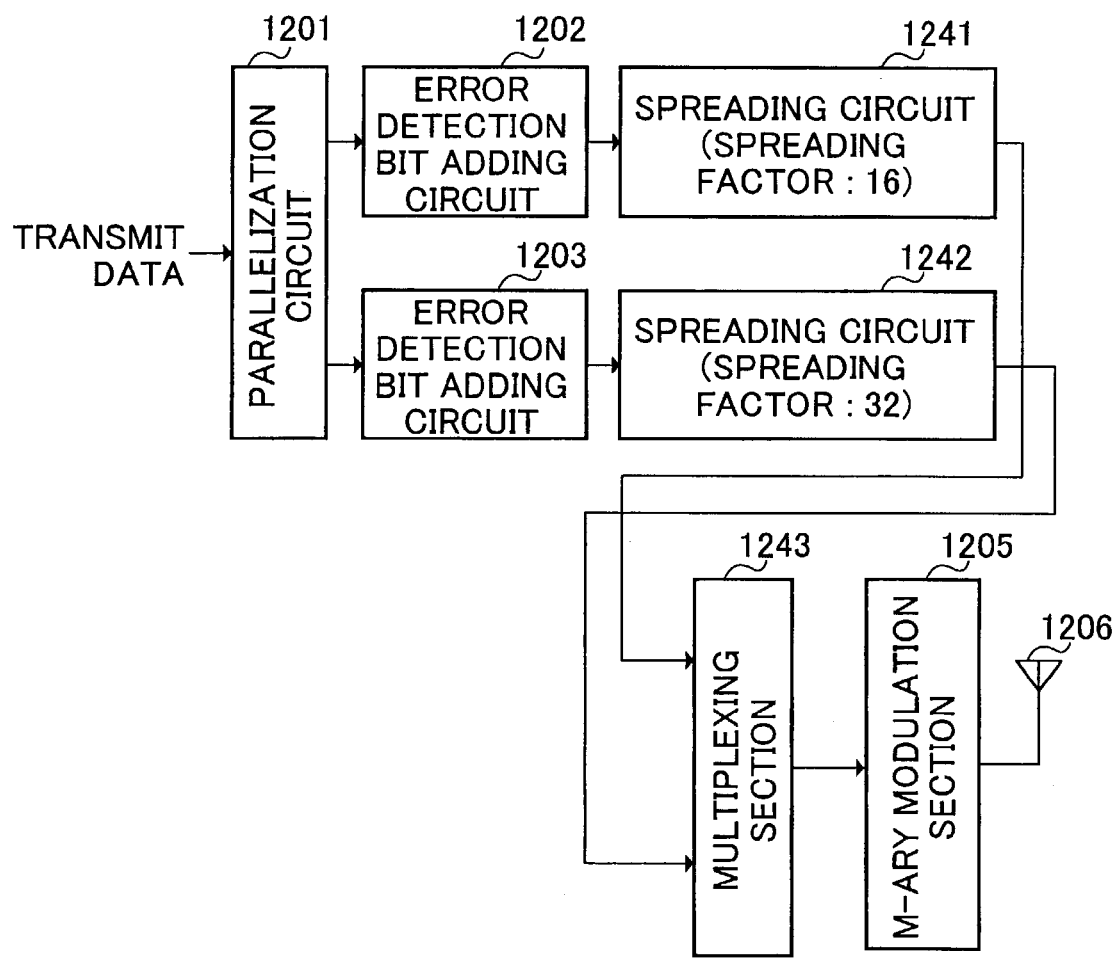
FIG. 67 is a block diagram showing a configuration of a transmitting apparatus according to Embodiment 21 of the present invention.

With CDMA, transmission quality can be finely controlled by means of the number of chips (spreading factor) and power (power ratio for each error correction unit). It is therefore possible to assign a quality difference for each error detection unit by controlling these factors. FIG. 67 is a block diagram showing a configuration of a transmitting apparatus according to Embodiment 21 of the present invention illustrating a case where a quality difference is assigned according to the spreading factor. Parts in FIG. 67 identical to those in FIG. 63 are assigned the same codes as in FIG. 63 and their detailed explanations are omitted.

In FIG. 67, a spreading circuit 1241 spreads the coded bit string output from error detection bit adding circuit 1202 using a spreading factor of 16, and a spreading circuit 1242 spreads the coded bit string output from error detection bit adding circuit 1203 using a spreading factor of 32. The quality of spreading circuit 1242 is therefore better than that of spreading circuit 1241 since its spreading factor is larger. By means of the above configuration, it is possible to assign a quality difference by changing the spreading factor for transmit data.

Thus, according to this embodiment, a predetermined quality difference can be assigned to a plurality of error detection unit signals in a transmitting apparatus, thereby enabling the error correction capability of a receiving apparatus to be improved.

(Embodiment 22)

Embodiment 22 of the present invention is a variant of Embodiment 18, in which, when canceling interference, interference is canceled only for bits whose quality is known beforehand to be good on average, regardless of error detection units. In the initial stage of interference cancellation, in particular, if a replica is generated with bits that are highly likely to be erroneous, interference will actually increase, and therefore this method is very effective. Knowing beforehand that quality is good includes cases, such as shown in Embodiment 21, where a slight quality difference is assigned, or where there is a natural quality difference due to M-ary modulation such as 16QAM, for instance.

Figure 68:
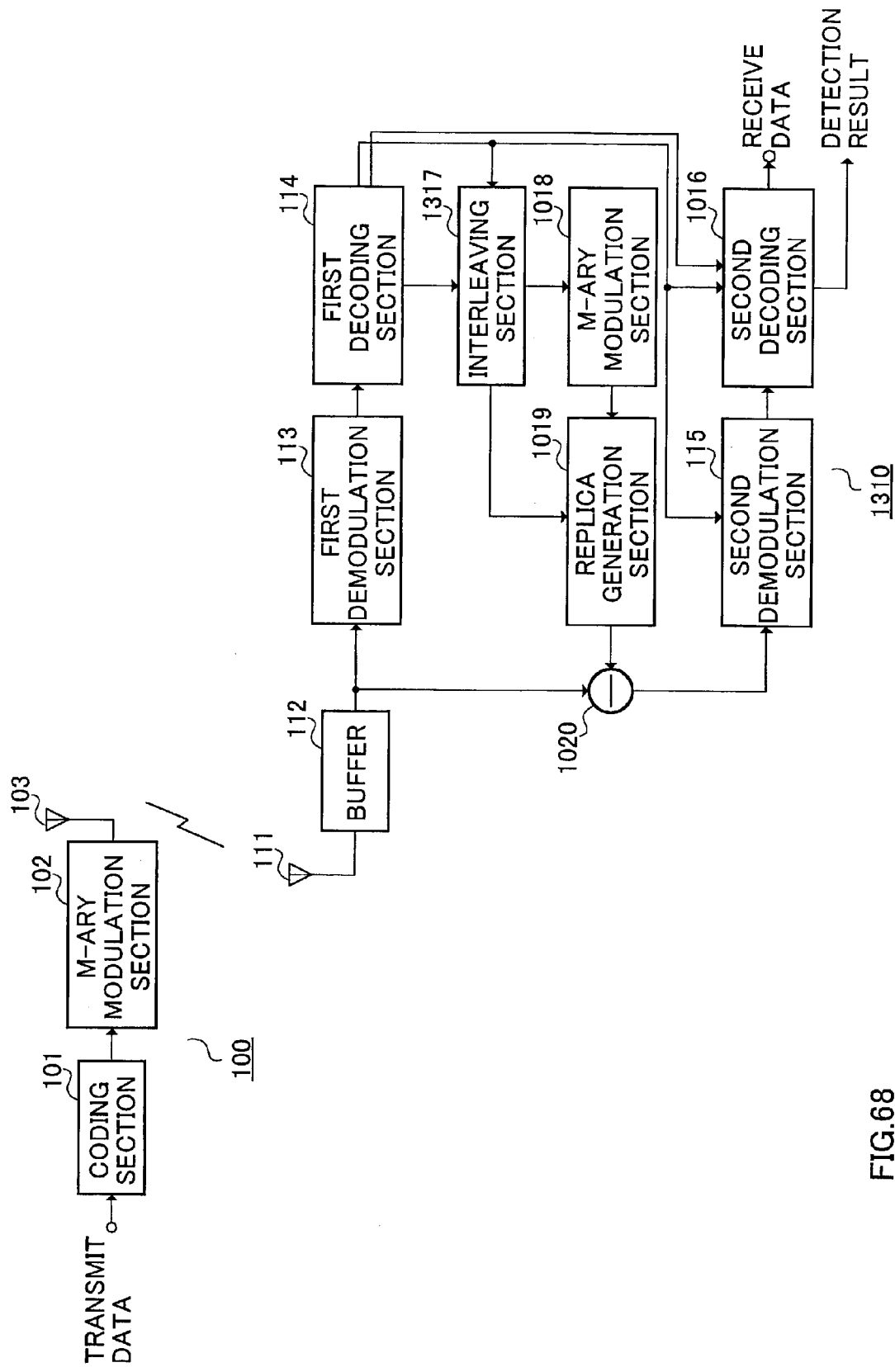
FIG. 68 is a block diagram showing the configuration of a radio communication system according to Embodiment 22 of the present invention.
Figure 69:
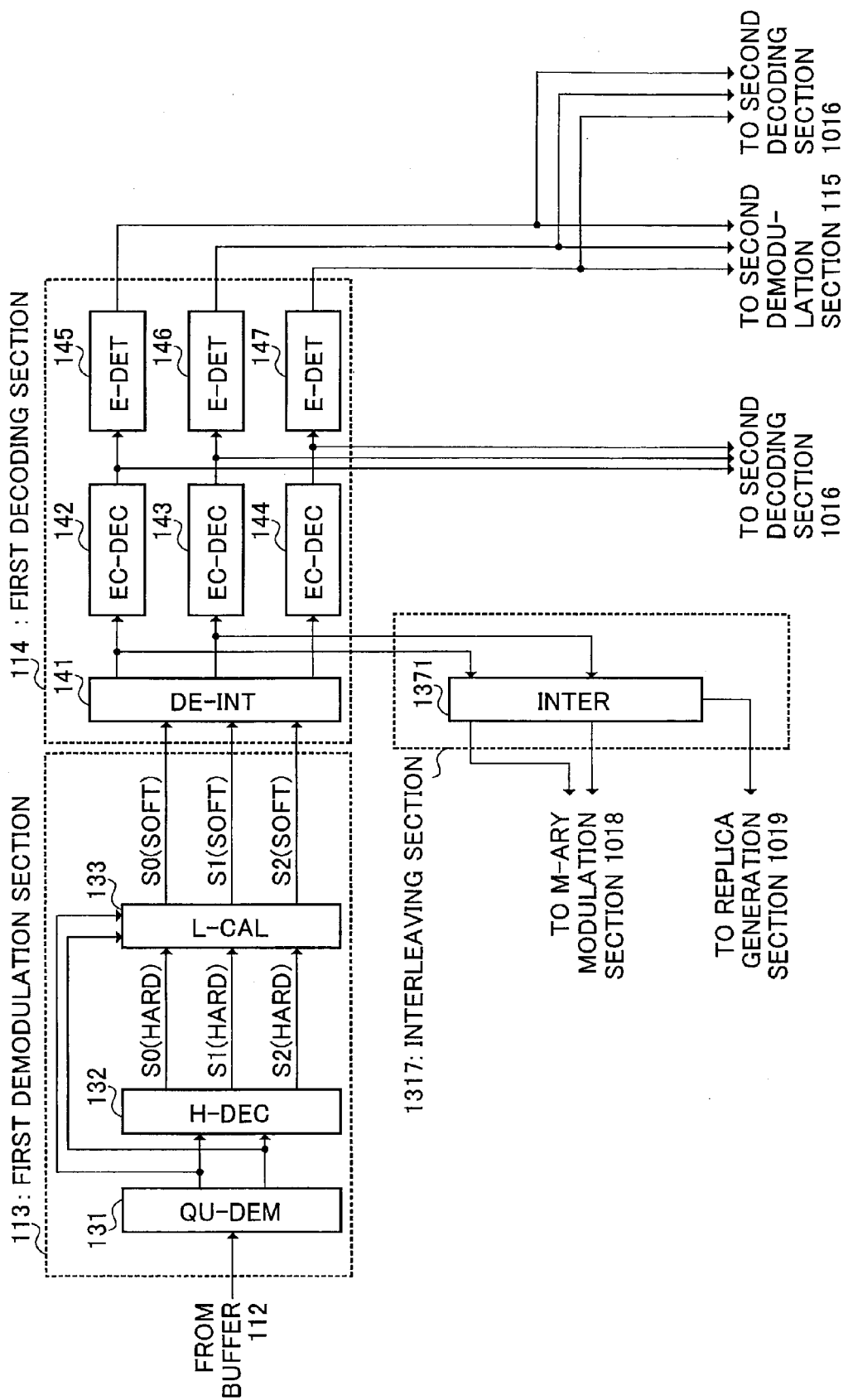
FIG. 69 is a block diagram showing the internal configuration of the first demodulation section, first decoding section, and interleaving section of the receiving apparatus shown in FIG. 68.

In this embodiment, 8PSK is described by way of example. FIG. 68 is a block diagram showing the configuration of a radio communication system according to Embodiment 22 of the present invention. In the radio communication system shown in FIG. 68, radio communications are performed between a transmitting apparatus 100 and receiving apparatus 1310. Parts in FIG. 68 identical to those in FIG. 49 are assigned the same codes as in FIG. 49 and their detailed explanations are omitted. The receiving apparatus 1310 in FIG. 68 has a configuration in which an interleaving section 1317 has been added instead of the recoding section 1017 of the receiving apparatus 1010 shown in FIG. 49. FIG. 69 is a block diagram showing the internal configuration of the first demodulation section 113, first decoding section 114, and interleaving section 1317 shown in FIG. 68. Parts in FIG. 69 identical to those in FIG. 50 are assigned the same codes as in FIG. 50 and their detailed explanations are omitted.

In 8PSK, it is known that S0 and S1 are of good quality on average, and S2 is of poor quality on average. Thus, in the receiving apparatus 1310 shown in FIG. 68, S0 and S1 output from a de-interleaving circuit 141 are also output to an interleaving circuit 1371 in interleaving section 1317.

Interleaving circuit 1371 permutes bit strings S0 and S1 using the same rule as an interleaving circuit 128 provided in the transmitting apparatus. An M-ary modulation section 1018 generates a symbol by executing the same modulation processing as an M-ary modulation section 102 provided in the transmitting apparatus, and outputs the generated symbol to a replica generation section 1019.

For a symbol input to the replica generation section 1019, only bits S0 and S1 are arranged in M-ary modulation section 1018. The replica generation section 1019 generates a replica of bits S0 and S1 by multiplying a symbol output from M-ary modulation section 1018 by an impulse response (channel estimate). It is also possible for switching to be performed so that this is carried out for all bits if quality has become good overall as stages proceed.

Thus, according to this embodiment, interference can be effectively suppressed by generating a replica only for bits whose quality is known beforehand to be good on average, and subtracting the replica from the received signal. High-precision demodulation processing can then be performed by executing demodulation processing based on the received signal in which interference has been suppressed.

Any kind of coding may be performed in the transmitting-side apparatus. Also, with 16QAM or the like, interference power can be reduced with high-order bits only, but interference power cannot be reduced with low-order bits only, and therefore use of S0 and S1 only is particularly effective. The same also applies to 64QAM, but as there are three quality levels in 64QAM, an effect can be expected by consecutively increasing the number of reflecting bits-in the pattern S0 and S1, S0 through S3, S0 through S5-each time a stage progression is made.

(Embodiment 23)

Embodiment 23 of the present invention is almost the same as Embodiment 22, but differs from Embodiment 22 in that a replica is generated after selecting only bits with a high likelihood even among high-quality bits. This is in consideration of the fact that, even with bits that are of good quality on average, not all bits are of the same quality. With 8PSK, for example, while S0 and S1 are of good quality on average, their quality differs depending on low-order bit S2.

Figure 70:
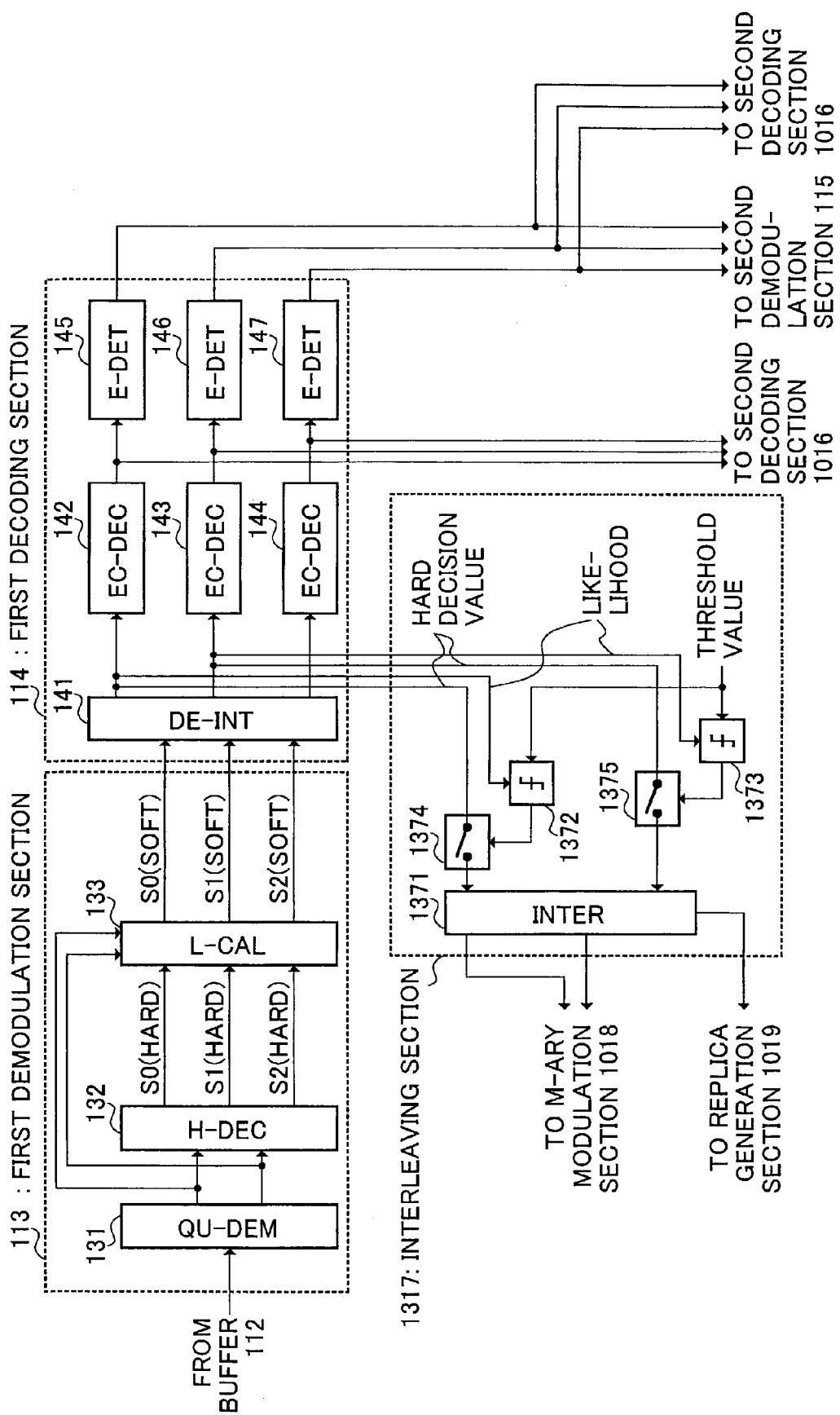
FIG. 70 is a block diagram showing the internal configuration of the first demodulation section, first decoding section, and interleaving section of a receiving apparatus of a radio communication system according to Embodiment 23 of the present invention.

FIG. 70 is a block diagram showing the internal configuration of the first demodulation section 113, first decoding section 114, and interleaving section 1317 of a receiving apparatus of a radio communication system according to Embodiment 23 of the present invention. Parts in FIG. 70 identical to those in FIG. 69 are assigned the same codes as in FIG. 69 and their detailed explanations are omitted.

In the interleaving section 1317 shown in FIG. 70, determination circuits 1372 and 1373 determine the size relationship between the likelihoods of S0 and S1 and a threshold value, and control switching circuits 1374 and 1375 so that an output signal from a de-interleaving circuit 141 is output to an interleaving circuit 1371 only for bits whose likelihood is greater than the threshold value.

By generating a replica after making a further selection based on likelihood from among bits of good quality in this way, and subtracting the replica from the received signal, interference can be effectively suppressed. High-precision demodulation processing can then be performed by executing demodulation processing based on the received signal in which interference has been suppressed.

Likelihoods are obtained based on the distance from a decision axis at the time of demodulation, etc., there being a basis whereby a number are selected from a higher level, and a basis as to whether or not a particular threshold value is exceeded, with selection by either method being possible.

(Embodiment 24)

Like Embodiment 23, Embodiment 24 of the present invention takes account of the fact that, even with bits that are of good quality on average, not all bits are of the same quality, but differs in that interference is canceled by generating a replica by further multiplication of bits of good quality.

Figure 71:
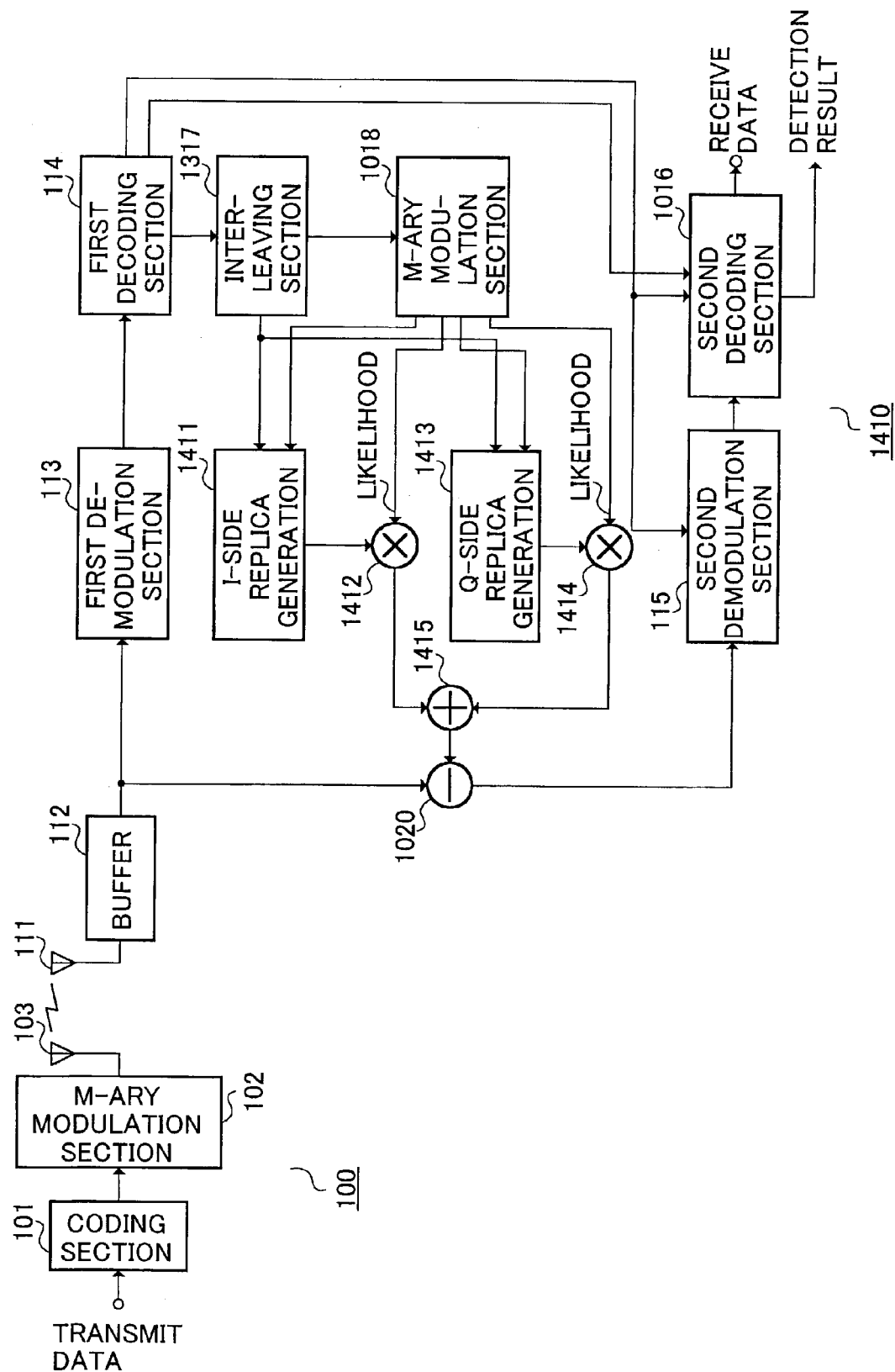
FIG. 71 is a block diagram showing the internal configuration of the first demodulation section, first decoding section, and interleaving section of a receiving apparatus of a radio communication system according to Embodiment 24 of the present invention.

In this embodiment, 16QAM is described by way of example. FIG. 71 is a block diagram showing the configuration of a receiving apparatus of a radio communication system according to Embodiment 24 of the present invention. In the radio communication system shown in FIG. 71, radio communications are performed between a transmitting apparatus 100 and receiving apparatus 1410. Parts in FIG. 71 identical to those in FIG. 69 are assigned the same codes as in FIG. 69 and their detailed explanations are omitted. In 16QAM, I-side and Q-side signals are independent, and therefore the receiving apparatus 1410 creates an I-side replica from S0 and a Q-side replica from S1.

In the receiving apparatus 1410 shown in FIG. 71, an I-side replica generating section 1411 generates a replica of S0, and a multiplier 1412 multiplies the output signal of the I-side replica generating section 1411 by the likelihood of S0. Similarly, a Q-side replica generating section 1413 generates a replica of S1, and a multiplier 1414 multiplies the output signal of the Q-side replica generating section 1413 by the likelihood of S1. Then an adder 1415 adds together the output signal from multiplier 1412 and the output signal from multiplier 1414, and outputs the resulting signal to an adder 1020.

By generating a replica by further multiplying a replica of a bit of good quality by its likelihood in this way, and subtracting the replica from the received signal, the greater the soundness of a bit, the greater is the interference cancellation effect, enabling interference to be effectively suppressed. High-precision demodulation processing can then be performed by executing demodulation processing based on the received signal in which interference has been suppressed. In the case of a replica generated from a bit with a low likelihood, its size is small and so is the interference cancellation effect, and therefore damage will be minor and the effect on demodulation precision small even if determination is erroneous.

(Embodiment 25)

This embodiment combines Embodiments 17 through 21 and Embodiments 22 through 24. As a signal of a unit in which an error is not detected is clearly correct, all signals for which an error is not detected are used for replica generation even if of poor quality. At this time, the kind of likelihood reflection in Embodiment 23 or Embodiment 24 may be performed. Moreover, it is also effective to lower the likelihood of a signal of a unit in which an error is detected.

Figure 72:
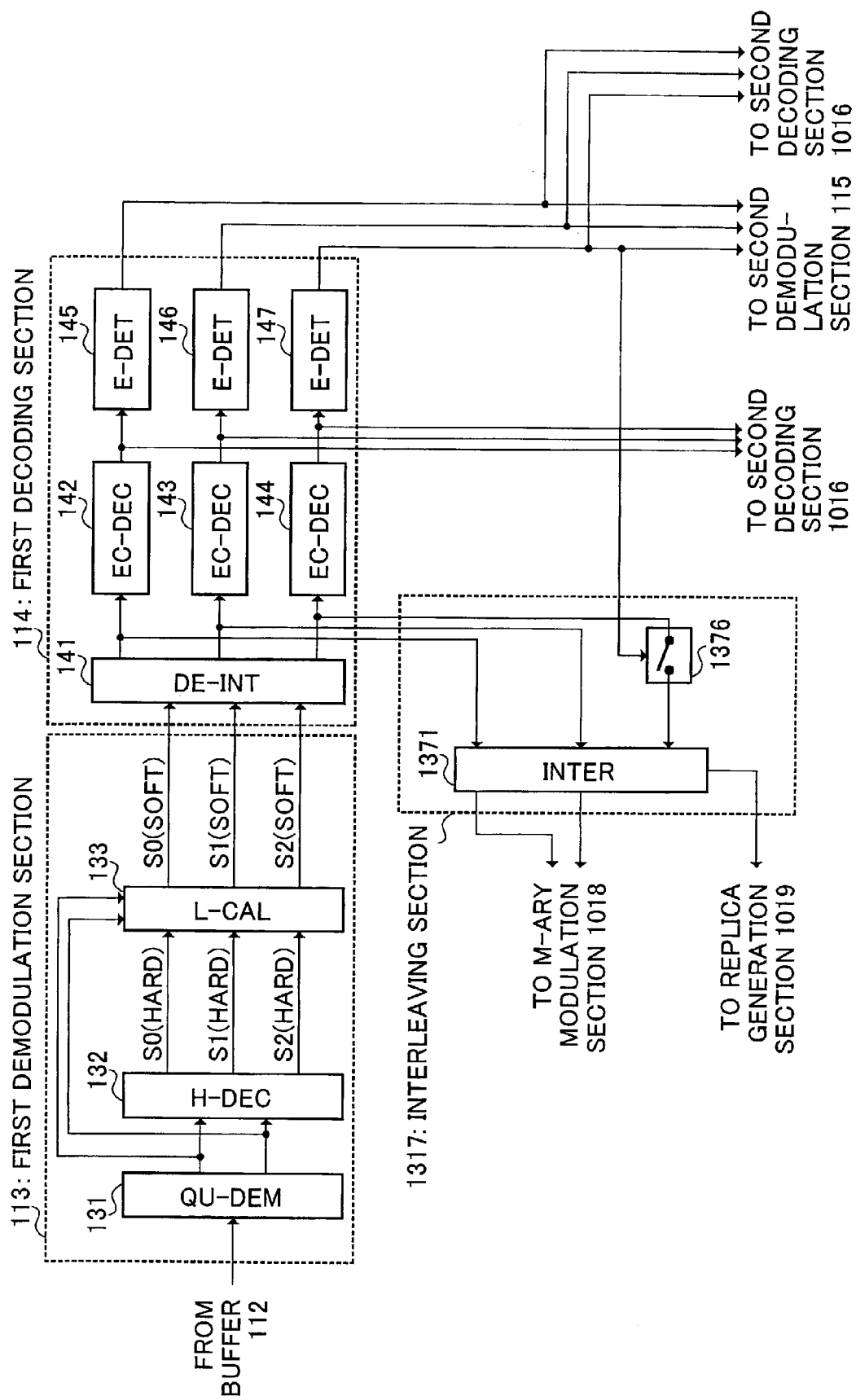
FIG. 72 is a block diagram showing the internal configuration of the first demodulation section, first decoding section, and interleaving section of a receiving apparatus of a radio communication system according to Embodiment 25 of the present invention.

FIG. 72 is a block diagram showing the internal configuration of the first demodulation section 113, first decoding section 114, and interleaving section 1317 of a receiving apparatus of a radio communication system according to Embodiment 25 of the present invention, and shows an example of the use of 8PSK modulation when Embodiment 18 and Embodiment 22 are combined. Parts in FIG. 72 identical to those in FIG. 69 are assigned the same codes as in FIG. 69 and their detailed explanations are omitted.

A switching circuit 1376 outputs to an interleaving circuit 1371 only S2's in which an error was not detected, based on the detection result of an error detection circuit 147.

The error suppression effect is further increased by using bits of poor quality for which an error was not detected in this way. If this is combined with Embodiment 19, the effect is further increased in that bits of a unit in which an error is not detected can be used for replica generation regardless of the size of the likelihood. If combined with Embodiment 20, the effect is further increased in that, since the soundness of bits of a unit in which an error is not detected is perfect, replica generation can be performed with a likelihood of 1 regardless of the reception likelihood.

(Embodiment 26)

In this embodiment, a description is given of a retransmission method in a digital radio communication system of the present invention in which a plurality of error detection units are set and data is subjected to error detection coding for each error detection unit, being a method whereby a bit of a unit in which an error is detected is retransmitted assigned to the same bit, and new transmit data is assigned to bits to which a bit of a unit in which an error is not detected was assigned. If there is no new data at this time, retransmission may be performed with the number of M-ary values decreased.

Figures 73A, 73B:
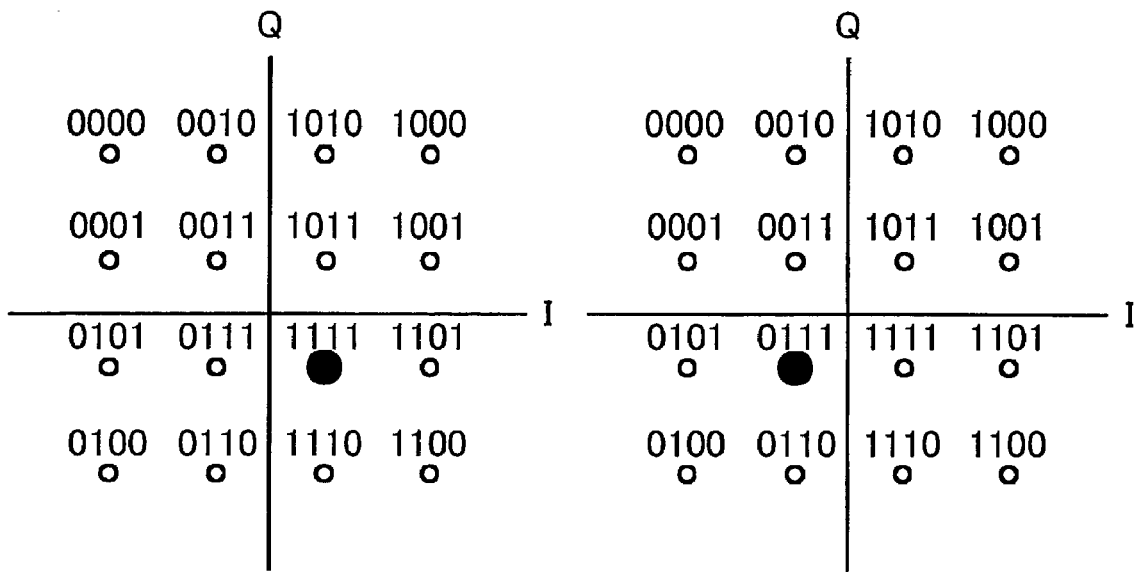
FIG. 73A is a signal arrangement diagram for explaining a retransmission method of Embodiment 26 of the present invention.
FIG. 73B is a signal arrangement diagram for explaining a retransmission method of Embodiment 26 of the present invention.
Figure 73C:
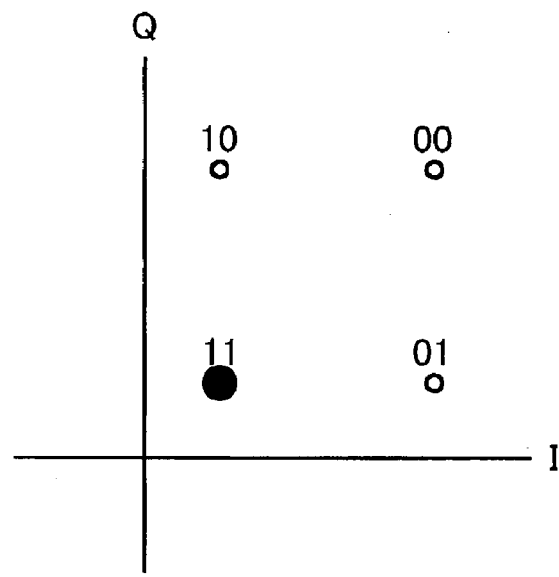
FIG. 73C is a signal arrangement diagram for explaining a retransmission method of Embodiment 26 of the present invention.

FIG. 73A, FIG. 73B, and FIG. 73C are signal arrangement diagrams for explaining a retransmission method of this embodiment. FIG. 73A, FIG. 73B, and FIG. 73C show a case where only S0 and S1 are units in which an error was not detected in 16QAM. FIG. 73A shows data transmitted initially (1,1,1,1), and FIG. 73B shows data newly transmitted with S0 and S1, and retransmitted with S2 and S3

(0,1,1,1). FIG. 73C shows the state in which retransmitted S2 and S3 (1,1) are combined.

It can be seen that the inter-signal distance is clearly greater in FIG. 73C than in FIG. 73A (the noise amplitude is increased by sqrt(2) times, but the inter-signal distance is doubled, and therefore the characteristic is improved by 3 dB). Also, since the bits are the least significant 2 bits, S2 and S3, it can be seen that they are represented by QPSK type mapping in the first quadrant. In the case of 16QAM, the storage rules are as shown below (where RI indicates the real part of the received signal, RQ the imaginary part of the received signal, MI the real part of the signal to be stored, and MQ the imaginary part of the signal to be stored.)

MI: if S0=0 then [if RI>0 then MI=0 else MI=−MI]
   else [if RI<0 then MI=0 else MI=MI]
MQ: if S1=1 then [if RQ>0 then MQ=0 else MQ=−MQ]
   else [if RQ<0 then MQ=0 else MQ=MQ]

When combining is performed, absolute values are first obtained for both the real part and the imaginary part of the received signal.

By performing combining by retransmitting bits of a unit in which an error was detected in this way, the possibility of quality improving and the error disappearing is increased. If an error is still detected, retransmission can be performed again, and can be performed any number of times. This can be considered as one kind of technology called hybrid ARQ.

FIG. 73A, FIG. 73B, and FIG. 73C show an example in which the size of a retransmitted signal is the same as the size of the initial signal, but use is still possible even if the sizes differ due to fading fluctuations or the like. Also, in the present invention, the modulation method and combining method are immaterial.

Furthermore, in FIG. 73A, FIG. 73B, and FIG. 73C, an example is shown of a case where an error is not detected in S0 and S1, but in the case of S0 only, signal points remain as 8 candidate points in the first quadrant and fourth quadrant, and decoding of S1, S2, and S3 can be performed with high precision. In the case of S1 only, signal points remain as 8 candidate points in the first quadrant and second quadrant, and demodulation of S0, S2, and S3 can be performed with high precision. And in the case of S0 and S2, 4 candidate points remain on the Q-axis, and demodulation of S1 and S3 can be performed with high precision. With 64QAM or a higher M-ary number, for low-order bits, a similar effect is obtained by calculating the absolute value of the received signal at the time of high-order bit demodulation, then converting this to a new received signal by subtracting a fixed value so that the decision axis passes through the origin, repeating this while progressing downward, and performing the same operations as described above when a stage is reached at which an error is detected.

Also, when retransmission is performed using the kind of interference cancellation shown in above Embodiments 17 through 25, by subtracting a unit for which an error is not detected within a received signal, then performing mapping conversion, storing the signal after conversion, and performing retransmitted signal combination, the quality of a signal after retransmission can be improved, and moreover, the receive buffer capacity can be reduced.

The reason for this is that, with a conventional system, if there is a mixture of bits to be retransmitted and bits not to be retransmitted within one symbol, analysis is performed on a bit-by-bit basis, and likelihoods are obtained for each bit, and these must be saved, whereas when this embodiment is used, it is only necessary to save a received symbol after interference has been canceled.

For example, with 16QAM, to consider the case of a unit in which an error has not been detected for S0 only, normally soft decision values are stored for each of S1, S2, and S3, and for the retransmission signal also, it is necessary to perform analysis on a bit-by-bit basis and then perform combining for the respective sequences, but it is possible to execute mapping conversion to a symbol excluding S0 and store this, and when retransmitting, place new information in S0, place the same signal as the first time in S1, S2, and S3, and combine the two signals, in which case only ⅓ of the buffer capacity of the normal storage method is required. For combining, maximal-ratio combining or the like may be used. In this example, the new S0 sent in the same signal as retransmission data can be demodulated using normal demodulation. Also, if there is a unit in which an error is not detected according to the post-combining signal, the kind of likelihood updating and interference cancellation in Embodiments 1 through 25 can be carried out using this.

(Embodiment 27)

Embodiment 27 is a variant of Embodiment 26, and describes a method whereby, when bits of different quality are assigned to different error detection units, and an error is not detected in a bit of good quality but an error is detected in a bit of poor quality, a bit of a unit in which an error was detected is retransmitted assigned to a good-quality bit, and new transmit data is transmitted assigned to a bit made vacant by that change of assignment. If there is no new data at this time, retransmission may be performed with the number of M-ary values decreased.

Figures 74A, 74B:
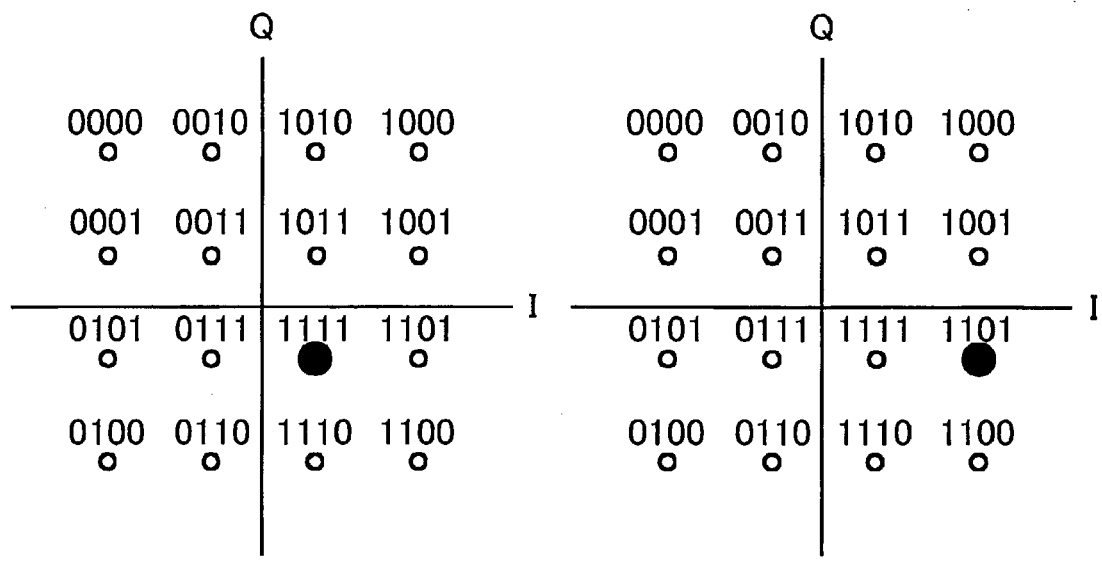
FIG. 74A is a signal arrangement diagram for explaining a retransmission method of Embodiment 26 of the present invention.
FIG. 74B is a signal arrangement diagram for explaining a retransmission method of Embodiment 26 of the present invention.
Figure 74C:
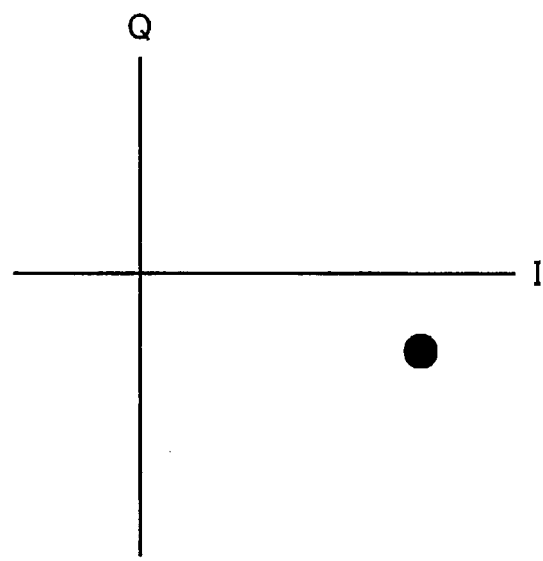
FIG. 74C is a signal arrangement diagram for explaining a retransmission method of Embodiment 26 of the present invention.

FIG. 74A, FIG. 74B, and FIG. 74C are signal arrangement diagrams for explaining a retransmission method of this embodiment. FIG. 74A, FIG. 74B, and FIG. 74C show a case where only S0 and S1 are units in which an error was not detected in 16QAM. FIG. 74A shows data transmitted initially (1,1,1,1), and FIG. 74B shows data retransmitted with S0 and S1, and newly transmitted with S0 and S1 (1,1,0,1) (the data that was in S2 and S3 in the first transmission is placed in S0 and S1). FIG. 74C shows the state in which retransmitted data are combined.

It can be seen that the inter-signal distance is clearly greater in FIG. 74C than in FIG. 74A (the noise amplitude is increased by sqrt (2) times, but assignment is changed to good-quality bits when retransmitting, so the signal amplitude is doubled or quadrupled, and performance is improved by 7 dB on average). Also, since the bits when retransmitting are the most significant 2 bits, S0 and S1, demodulation is possible with QPSK type mapping centered on the origin. In the case of 16QAM, the storage rules are as shown below (where RI indicates the real part of the received signal, RQ the imaginary part of the received signal, MI the real part of the signal to be stored, and MQ the imaginary part of the signal to be stored.) Also, rf indicates the reference size (distance between signal points).

MI: if S0=0 then MI=MI+rf
   else MI=−(MI−rf)
MQ: if S1=0 then MQ=MQ+rf
   else MQ=−(MQ−rf)

When combining is performed, the received signals themselves are combined.

By performing combining by retransmitting bits of a unit in which an error was detected assigned to good-quality bits in this way, the possibility of quality improving and the error disappearing is further increased. If an error is still detected, retransmission can be performed again, and can be performed any number of times. This can be considered as one kind of technology called hybrid ARQ.

FIG. 74A, FIG. 74B, and FIG. 74C show an example in which the size of a retransmitted signal is the same as the size of the initial signal, but use is still possible even if the sizes differ due to fading fluctuations or the like. Also, in the present invention, the modulation method and combining method are immaterial.

Furthermore, in FIG. 74A, FIG. 74B, and FIG. 74C, an example is shown of a case where an error is not detected in S0 and S1, but in the case of S0 only, the information that was in S2 the first time is in S0 the second time, and high-precision demodulation is possible by means of the same kind of combining as described above; and as regards S1 and S3, two identical items are added, and therefore 3 dB high-precision demodulation is possible and there is new information in S2. In the case of S1 only, the information that was in S3 the first time is in S1 the second time, and high-precision demodulation is possible by means of the same kind of combining as described above; and as regards S2 and S4, two identical items are added, and therefore 3 dB high-precision demodulation is possible and there is new information in S3. And in the case of S0 and S2, as regards S1 and S3, two identical items are added, and therefore 3 dB high-precision demodulation is possible and there is new information in S0 and S2. With 64QAM or a higher M-ary number, for low-order bits, a similar effect is obtained by calculating the absolute value of the received signal at the time of high-order bit demodulation, then converting this to a new received signal by subtracting a fixed value so that the decision axis passes through the origin, repeating this while progressing downward, and performing the same operations as described above when a stage is reached at which an error is detected.

Also, as in Embodiment 26, when retransmission is performed using the kind of interference cancellation shown in above Embodiments 17 through 25, by subtracting a unit for which an error is not detected within a received signal, then performing mapping conversion, storing the signal after conversion, and performing retransmitted signal combination, the quality of a signal after retransmission can be improved, and moreover, the receive buffer capacity can be reduced.

For example, with 16QAM, to consider the case of a unit in which an error has not been detected for S0 only, normally soft decision values are stored for each of S1, S2, and S3, and for the retransmission signal also, it is necessary to perform analysis on a bit-by-bit basis and then perform combining for the respective sequences, but it is possible to execute mapping conversion to a symbol excluding S0 and store this, and when retransmitting, place new information in S0, place in S0 the information that was placed in S2, place the same signal as the first time in S1 and S3, place new information in S2, and combine the two signals, in which case only ⅓ of the buffer capacity of the normal storage method is *required. For combining, maximal-ratio* combining or the like may be *used. In* this *example,* the new S2 sent in the same signal as retransmission data can be demodulated using normal *demodulation. Also,* if there is a unit in which an error is not detected according to the *post-combining signal,* the kind of likelihood updating and interference cancellation in E*mbodiments* 1 through 25 can be carried out using this.

(Embodiment 28)

This embodiment relates to a method of sending a feedback value when signals of individual error detection units are transmitted placed in signal sequences with quality differences. For example, if it is assumed that there are seven quality differences and that there are also seven error detection units corresponding thereto, a 7-bit feedback value is necessary in order to indicate whether or not an error has been detected in the respective error detection units. However, if there are considerable quality differences, the probability of an error being detected for a good-quality error detection unit but not being detected for a poor-quality error detection unit is low. Furthermore, when an interference canceller is used as in above Embodiments 17 through 25, it may happen that lower-quality bits cannot be retrieved if higher-quality bits are not known. In such cases, it is sufficient simply to indicate up to what point from a higher-quality item there was no error. Thus, 3-bit information is sufficient even if there are seven error detection units (it is sufficient to indicate eight cases, from "total destruction" to "OK up to 7th item").

Figure 75:
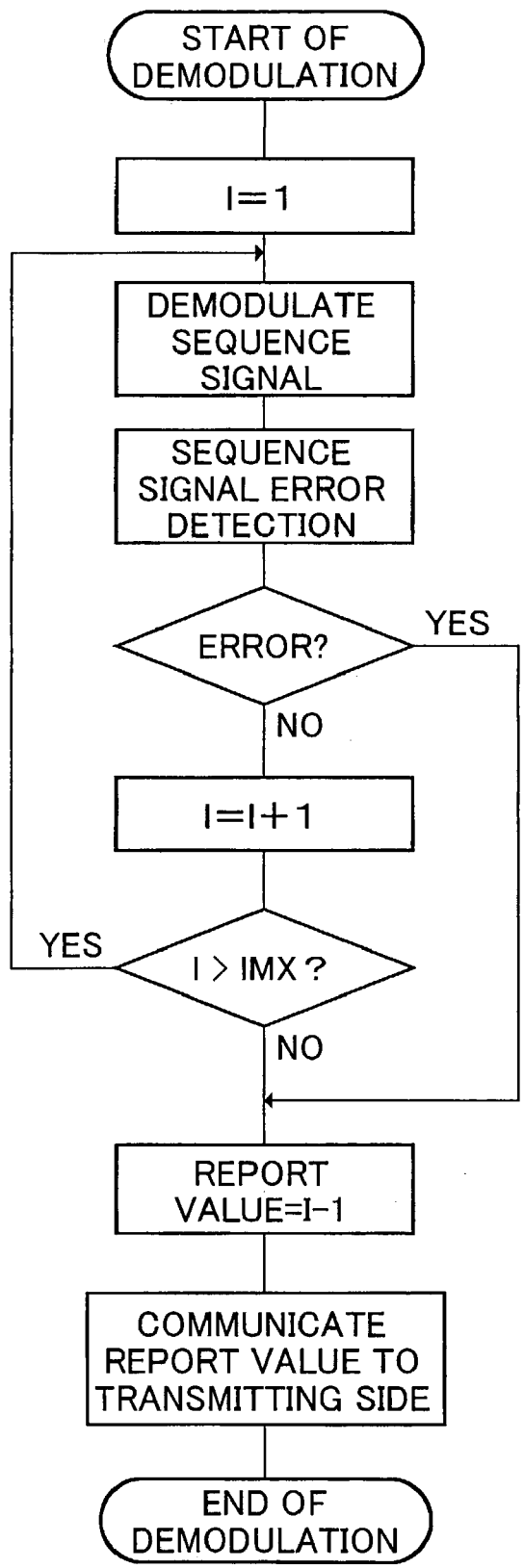
FIG. 75 is a flowchart showing the demodulation procedure of a receiving-side apparatus according to Embodiment 26 of the present invention.

FIG. 75 is a flowchart showing the demodulation procedure of a receiving-side apparatus according to this embodiment, in which demodulation proceeds from a higher-quality item, and demodulation is halted when an error is detected. As demodulation can thus be discontinued at the point at which an error is detected, this avoids the wasted effort of executing computation when there is little likelihood of being able to perform demodulation, enabling power consumption to be reduced. In FIG. 75, I indicates the signal sequence number and IMX indicates the maximum value of the signal sequence number.

If the kind of hybrid ARQ in Embodiments 26 and 27 is also used, received signals can be combined when retransmitting even if computation is discontinued midway, preventing wasted effort. Also, even if it is not known how many error detection units are actually being transmitted, only signals in which an error was not detected are demodulated, and superfluous processing is performed only once. Combination is also possible with the kind of interference cancellation used in Embodiments 17 through 25.

As described above, according to the present invention a transmitting apparatus performs transmission with data error-correction-coded as a plurality of independent error detection units arranged in one transmission unit, and therefore likelihoods can be calculated with high precision by having a receiving apparatus perform error detection on decoded data for each independent error detection unit, and modify the likelihood of each bit according to the error detection result. Reception quality can be raised by performing error correction decoding using likelihoods obtained in this way. Moreover, combining the present invention with ARQ also improves transmission efficiency.

This application is based on Japanese Patent Application No.2001-106494 filed on Feb. 27, 2001, Japanese Patent Application No.2001-153098 filed on May 22, 2001, and Japanese Patent Application No.2001-176368 filed on Jun. 11, 2001, entire contents of which are expressly incorporated by reference herein.

INDUSTRIAL APPLICABILITY

The present invention is suitable for use in a digital radio communication system that uses M-ary modulation.

What is claimed is:
1. A digital radio communication system comprising:
   a transmitting-side apparatus that includes:
   an error detection coding section that sets a plurality of error detection units for each of a plurality of transmission units and performs error detection coding of data for each error detection unit;

an M-ary modulation section that, for each transmission unit, arranges the error detection coded data of the error detection units into the corresponding transmission unit and modulates the transmission unit; and a transmitting section that radio transmits the modulated transmission units in a signal; and a receiving-side apparatus that includes:

a receiving section that receives the signal transmitted from said transmitting-side apparatus;

a first decoding section that decodes the received signal;

an error detecting section that detects, for each error detection unit in the received signal, the occurrence of a decoding error in said first decoding section;

a replica generating section that generates a replica of a part of the received signal using a bit, belonging to an error detection unit, for which an error was not detected;

an interference canceling section that subtracts the replica from the received signal to produce an interference cancelled signal;

a likelihood generating section that demodulates the interference cancelled signal to generate a candidate likelihood value of a bit corresponding to an error detection unit having a detected error;

a likelihood modifying section that modifies said candidate likelihood value in accordance with a result of error detection in said error detecting section; and a second decoding section that performs error correction decoding of the interference cancelled signal using the modified candidate likelihood value.

2. The digital radio communication system according to claim 1, wherein said likelihood modifying section modifies a candidate likelihood value of a high-order bit of a demodulated transmission unit in accordance with a decision value for a low-order bit.

3. The digital radio communication system according to claim 1, wherein said likelihood modifying section modifies a candidate likelihood value of a high-order bit of a demodulated transmission unit in accordance with a decision value for a low-order bit when said Mary modulation section modulates the transmission unit using a phase modulation scheme having 2 m (where m is a natural number) signal points.

4. The digital radio communication system according to claim 3, wherein said likelihood modifying section modifies a candidate likelihood value of a most significant bit of a demodulated transmission unit and a candidate likelihood value of a second most significant bit in accordance with a decision value of a third most significant bit so that one of the likelihood values becomes larger and the other likelihood value becomes smaller.

5. The digital radio communication system according to claim 1, wherein said likelihood modifying section modifies a candidate likelihood value of a high-order bit of a demodulated transmission unit in accordance with a decision value for a low-order bit when said M-ary modulation section modulates the transmission unit using a phase amplitude modulation scheme having 2 m (where m is a natural number) signal points.

6. The digital radio communication system according to claim 5, wherein said likelihood modifying section, when said M-ary modulation section modulates the transmission unit using 16QAM as a modulation method, modifies a candidate likelihood value of a most significant bit of a demodulated transmission unit in accordance with a decision value for a third most significant bit, and modifies a candidate likelihood value of a second most significant bit in accordance with a decision value for a fourth most significant bit.

7. The digital radio communication system according to claim 1, wherein said replica is the mean value of all candidate constellation points that the transmission unit, whose error detection unit was used to generate the replica, may potentially represent.

8. The digital radio communication system according to claim 1, wherein:

a difference signal is obtained by subtracting the replica from a corresponding transmission unit of the received signal, the difference signal is examined to determine the number of error detection units having errors, if fewer errors are detected in the difference signal than in the transmission unit from which the replica was generated, then a new replica is generated from the difference signal using a bit, belonging to the difference signal, for which an error has ceased to be detected.

9. The digital radio communication system according to claim 1, wherein said receiving-side apparatus updates an estimate of the transmission channel according to a difference signal obtained by subtracting the replica from the received signal.

10. The digital radio communication system according to claim 1, wherein the data corresponding to each error detection unit of a transmission unit has different communication quality.

11. The digital radio communication system according to claim 10, wherein the communication quality is determined by the transmission power.

12. The digital radio communication system according to claim 10 wherein, when the transmission units are modulated such that the communication quality of the data differs on a bit-by-bit basis, the communication quality of the data for each error detection unit is set independently on a bit-by-bit basis.

13. The digital radio communication system according to claim 10, wherein the communication quality of the data for each error detection unit is set in accordance with the size of the error detection unit.

14. The digital radio communication system according to claim 10, wherein the communication quality of the data for each error detection unit is set in accordance with a corresponding error correction code.

15. The digital radio communication system according to claim 10, wherein the communication quality of the data for each error detection unit is set in accordance with a corresponding spreading ratio.

16. The digital radio communication system according to claim 1, wherein:

the data corresponding to each error detection unit of a transmission unit has different communication quality;

the transmission units are modulated such that the communication quality of the data differs on a bit-by-bit basis; and the replica is generated using a bit of high quality among the bits of the corresponding transmission unit.

17. The digital radio communication system according to claim 1, wherein:

the data corresponding to each error detection unit of a transmission unit has different communication quality;

the transmission units are modulated such that the communication quality of the data differs on a bit-by-bit basis;

the replica is generated using a bit of high quality among
the bits of the corresponding transmission unit; and
the bit used to generate the replica has a high likelihood
of correct decoding among the high quality bits of the
transmission unit.

18. The digital radio communication system according to claim 1, wherein:
the data corresponding to each error detection unit of a transmission unit has different communication quality;
the transmission units are modulated such that the communication quality of the data differs on a bit-by-bit basis;
the replica is generated using a selected bit of high quality among the bits of the corresponding transmission unit; and
the size of the generated replica is proportional to a likelihood of correctly decoding the selected bit.

19. The digital radio communication system according to claim 1, wherein said replica generating section generates a replica of a bit of good quality and a bit belonging to an error detection unit for which an error was not detected of a modulation method composed of a plurality of bits of different qualities.

20. The digital radio communication system according to claim 1, wherein:
said transmitting-side apparatus assigns a bit of an error detection unit for which an error was detected by said receiving-side apparatus to the same error detection unit of a subsequent transmission unit;
assigns new information to an error detection unit of the subsequent transmission unit that corresponds to an error detection unit for which no error was detected by said receiving-side apparatus; and
transmits the subsequent transmission unit.

21. The digital radio communication system according to claim 20 wherein said receiving-side apparatus:
converts to a first symbol the data corresponding to the error detection units for which an error was not detected in a received transmission unit;
stores the first symbol;
converts to a second symbol the data of the received transmission unit that is subsequently re-transmitted; and
combines the first and second symbols.

22. The digital radio communication system according to claim 1, wherein said transmitting-side apparatus transmits re-transmission data by:
reassigning a bit of an error detection unit for which an error was detected by said receiving-side apparatus to a higher-order bit for which an error was not detected,
assigning new information to the bit for which the error was detected, and
transmitting data according to the bit assignments.

23. The digital radio communication system according to claim 22, wherein said receiving-side apparatus:
converts to a first symbol the data corresponding to the error detection units for which an error was not detected in a received transmission unit;
stores the first symbol;
receives the re-transmission data as a second symbol; and
combines the first and second symbols directly.

24. The digital radio communication system according to claim 1, wherein:
the error detection units of each transmission unit have different communication qualities and the error detection units are arranged in the transmission unit according to their respective communication qualities;
said receiving-side apparatus reports to said transmitting-side apparatus how many error detection units of a received transmission unit have been received correctly in the order of highest to lowest communication quality.

25. A receiving apparatus comprising:
a receiving section that receives a signal containing data that has been subjected to error detection coding for each of a plurality of error detection units and has been arranged in one transmission unit;
a first decoding section that decodes the received signal;
an error detecting section that detects, for each error detection unit in the received signal, the occurrence of a decoding error in said first decoding section;
a replica generating section that generates a replica of a part of the received signal using a bit, belonging to an error detection unit, for which an error was not detected;
an interference canceling section that subtracts the replica from the received signal to produce an interference cancelled signal;
a likelihood generating section that demodulates the interference cancelled signal to generate a candidate likelihood value of a bit corresponding to an error detection unit having a detected error;
a likelihood modifying section that modifies said candidate likelihood value in accordance with a result of error detection in said error detecting section; and
a second decoding section that performs error correction decoding of the interference cancelled signal using the modified candidate likelihood value.

26. A data transmission method comprising:
in a transmittingside apparatus:
setting a plurality of error detection units for each of a plurality of transmission units;
error detection coding data for each error detection unit;
arranging, for each transmission unit, the error detection coded data of the error detection units into the corresponding transmission unit;
modulating the transmission units; and
transmitting the modulated transmission units in a signal; and
in a receiving-side apparatus:
receiving the transmitted signal;
decoding the received signal;
detecting, for each error detection unit in the received signal, the occurrence of a decoding error;
generating a replica of a part of the received signal using a bit, belonging to an error detection unit, for which an error was not detected;
interference canceling the replica from the received signal to produce an interference cancelled signal;
demodulating the interference cancelled signal to generate a candidate likelihood value of a bit corresponding to an error detection unit having a detected error;
modifying said candidate likelihood value in accordance with a result of the error decoding detection; and
error correction decoding the interference cancelled signal using the modified candidate likelihood value.

* * * * *